United States Patent [19]
Gardner

[11] 3,744,124
[45] July 10, 1973

[54] MACHINE TOOL RETRIEVAL AND INTERCHANGE SYSTEM

[75] Inventor: Louis T. Gardner, Cincinnati, Ohio

[73] Assignee: Le Blond Incorporated, Cincinnati, Ohio

[22] Filed: Sept. 12, 1969

[21] Appl. No.: 857,531

[52] U.S. Cl............ 29/568, 214/16.4 R, 340/146.2, 29/26 A
[51] Int. Cl............................................. B23q 3/155
[58] Field of Search............................. 29/568, 264; 214/11 AS, 16.4 P; 340/146.2, 149

[56] References Cited
UNITED STATES PATENTS

| | | | |
|---|---|---|---|
| 2,825,476 | 3/1958 | Muller | 214/11 AS |
| 3,049,247 | 8/1962 | Lemelson | 214/16.4 X |
| 3,443,310 | 5/1969 | Burroughs et al. | 29/568 |
| 3,543,392 | 12/1970 | Perry et al. | 29/568 X |
| 3,576,540 | 4/1961 | Fair et al. | 29/568 X |

Primary Examiner—Andrew R. Juhasz
Assistant Examiner—Z. R. Bilinsky
Attorney—Wood, Herron and Evans

[57] ABSTRACT

A machine tool including, a rotatable turret having oppositely disposed tool holders for alternatively positioning one of the tool holders in an active or cutting position relative to a workpiece and the other of the tool holders in an inactive or idle position, a magazine having a plurality of tool holding devices successively movable past a tool interchange station, tool transfer means for transferring tools between the magazine and the inactive turret tool holder, and means for retrieving a desired tool from the magazine. The retrieving means includes a stationary memory bank mounted independent of the magazine tool holding devices. The memory bank has a memory element allocated to each of the magazine tool holding devices which is susceptive of storing the arbitrary identifier of a tool positioned in the magazine tool holder to which it is allocated, and an accessing circuit for successively accessing the magazine tool holder memory elements as the tool holders to which they are respectively allocated successively move past the interchange station. A comparison circuit successively compares the identifiers stored in the successively accessed memory elements with the identifier of a desired tool, producing an output when the identifier of the desired tool is located at the interchange station. The contents of the memory elements allocated to the magazine tool storage devices, as well as certain additional memroy elements allocated to the turret tool holders, are updated when a tool is transferred between the magazine and the inactive turret tool holder or between the active and inactive turret tool holders.

12 Claims, 72 Drawing Figures

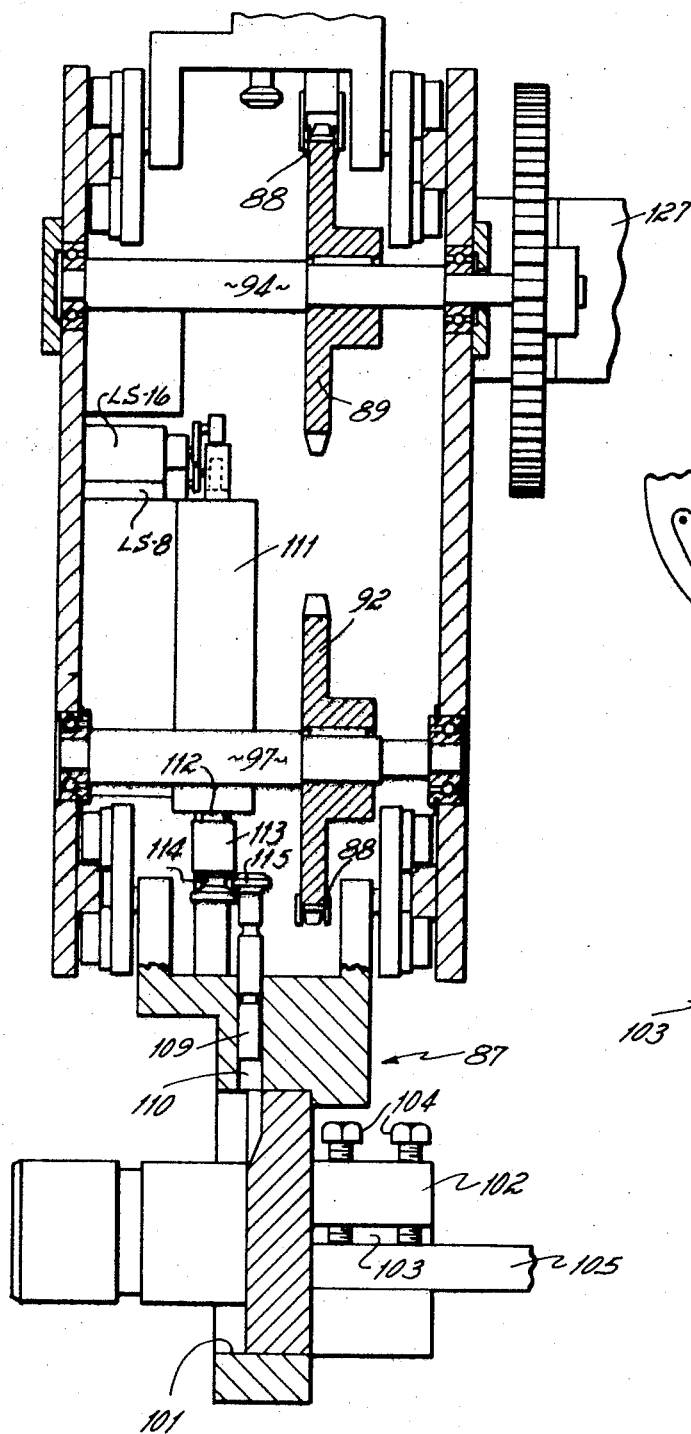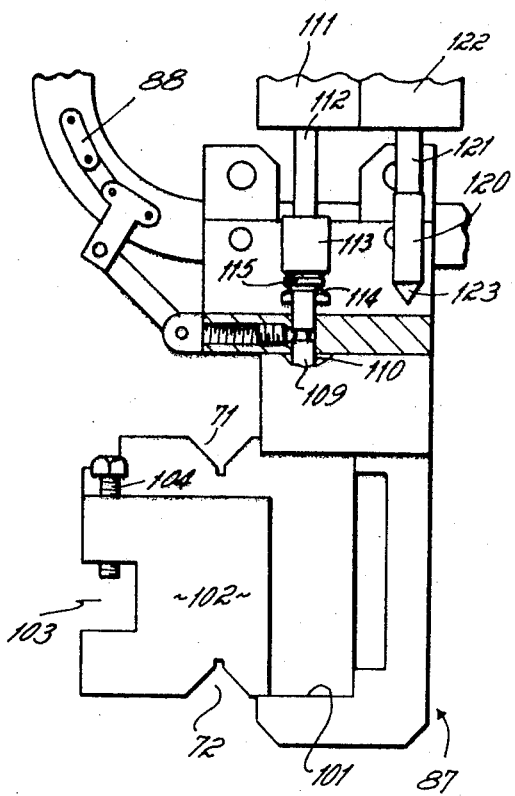
Fig. 8
Fig. 9

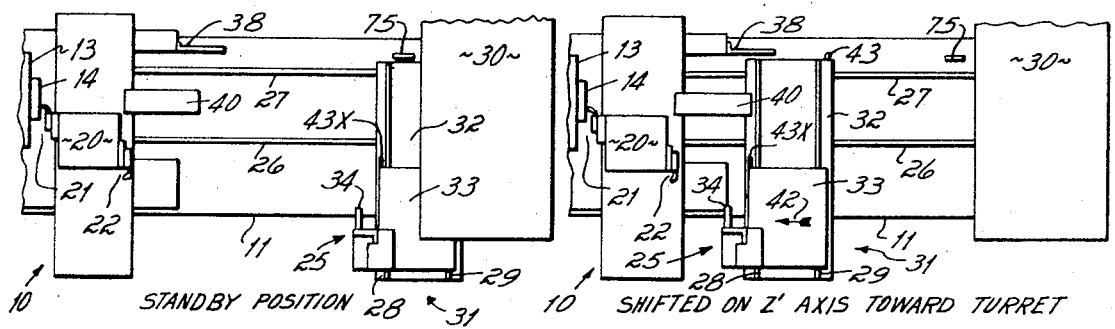
FIG. 11 — STANDBY POSITION
FIG. 12 — SHIFTED ON Z' AXIS TOWARD TURRET
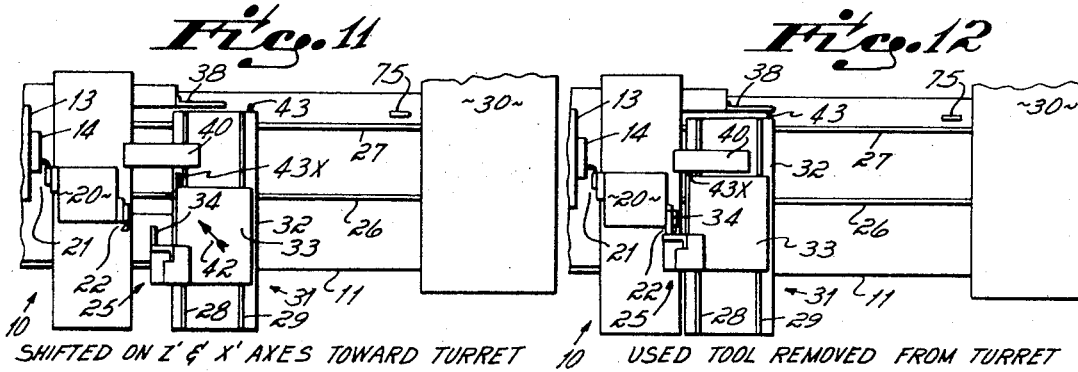
FIG. 13 — SHIFTED ON Z' & X' AXES TOWARD TURRET
FIG. 14 — USED TOOL REMOVED FROM TURRET
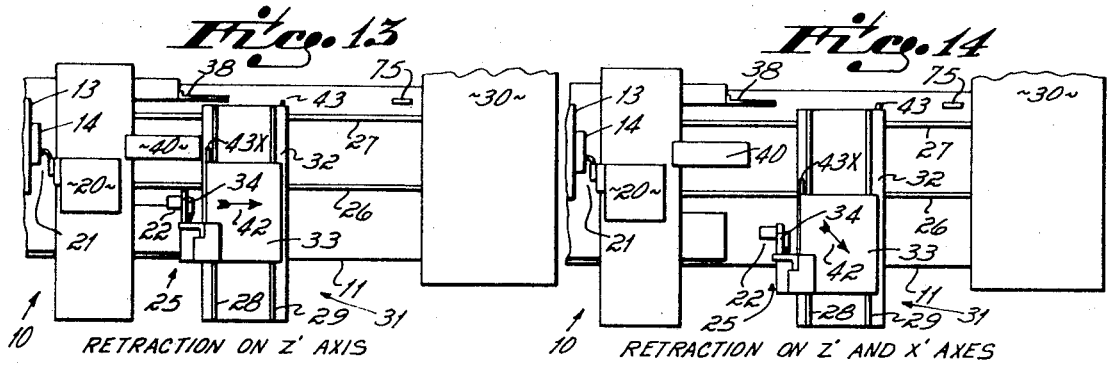
FIG. 15 — RETRACTION ON Z' AXIS
FIG. 16 — RETRACTION ON Z' AND X' AXES
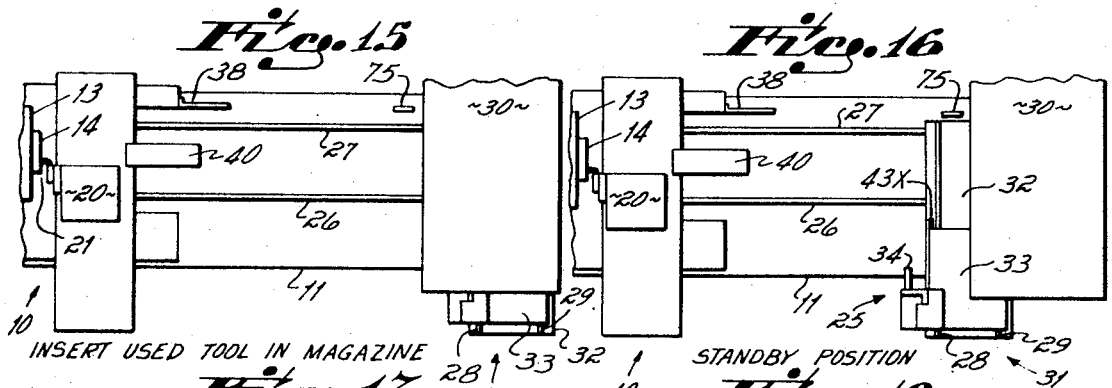
FIG. 17 — INSERT USED TOOL IN MAGAZINE
FIG. 18 — STANDBY POSITION
INVENTOR.
Louis T. Gardner
BY
Wood, Herron & Evans
ATTORNEYS

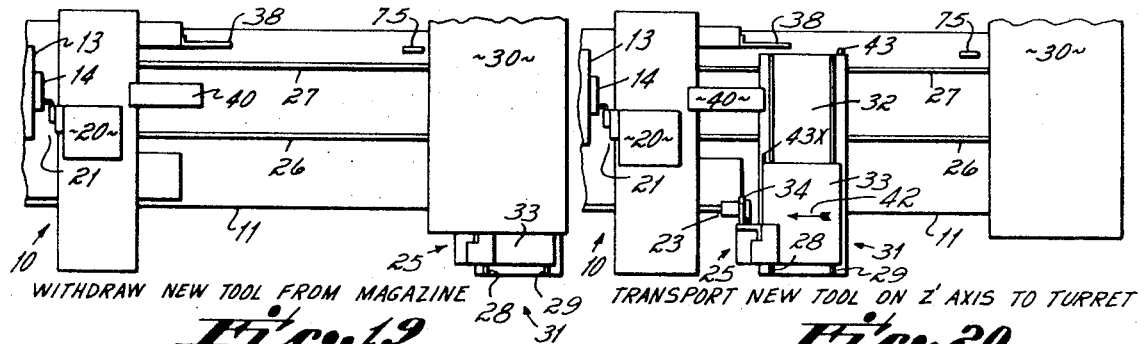
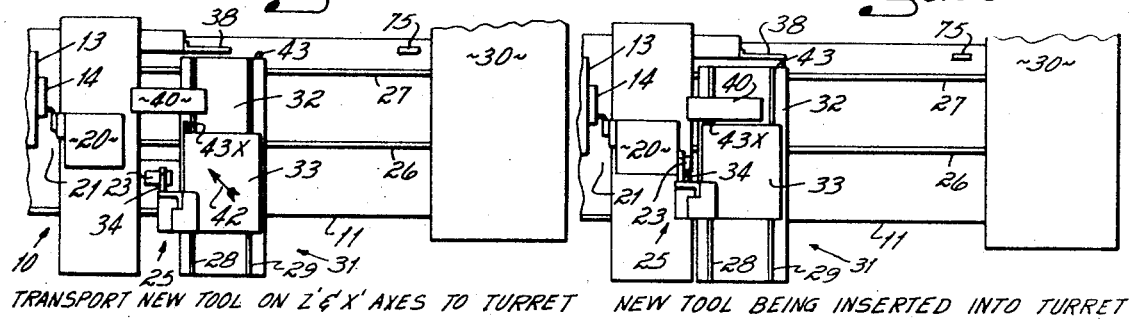
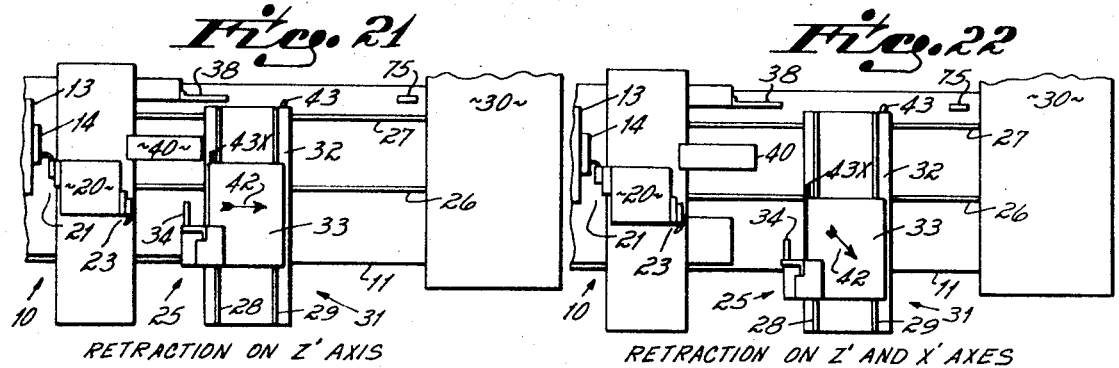
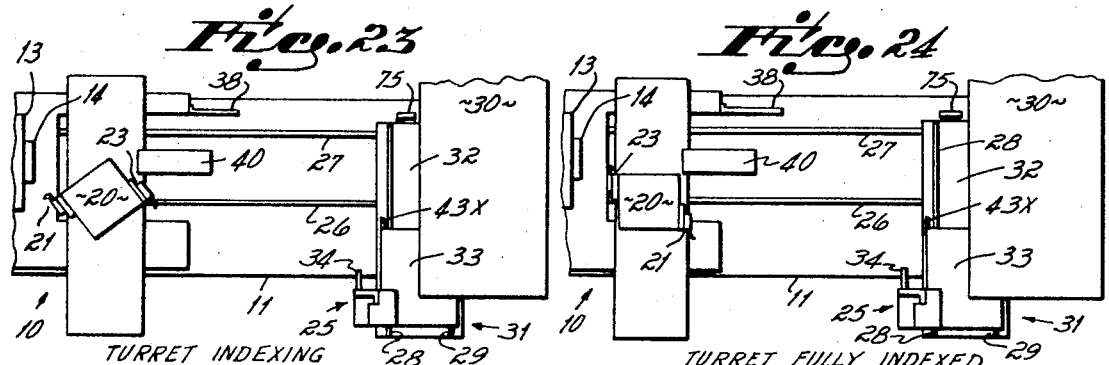

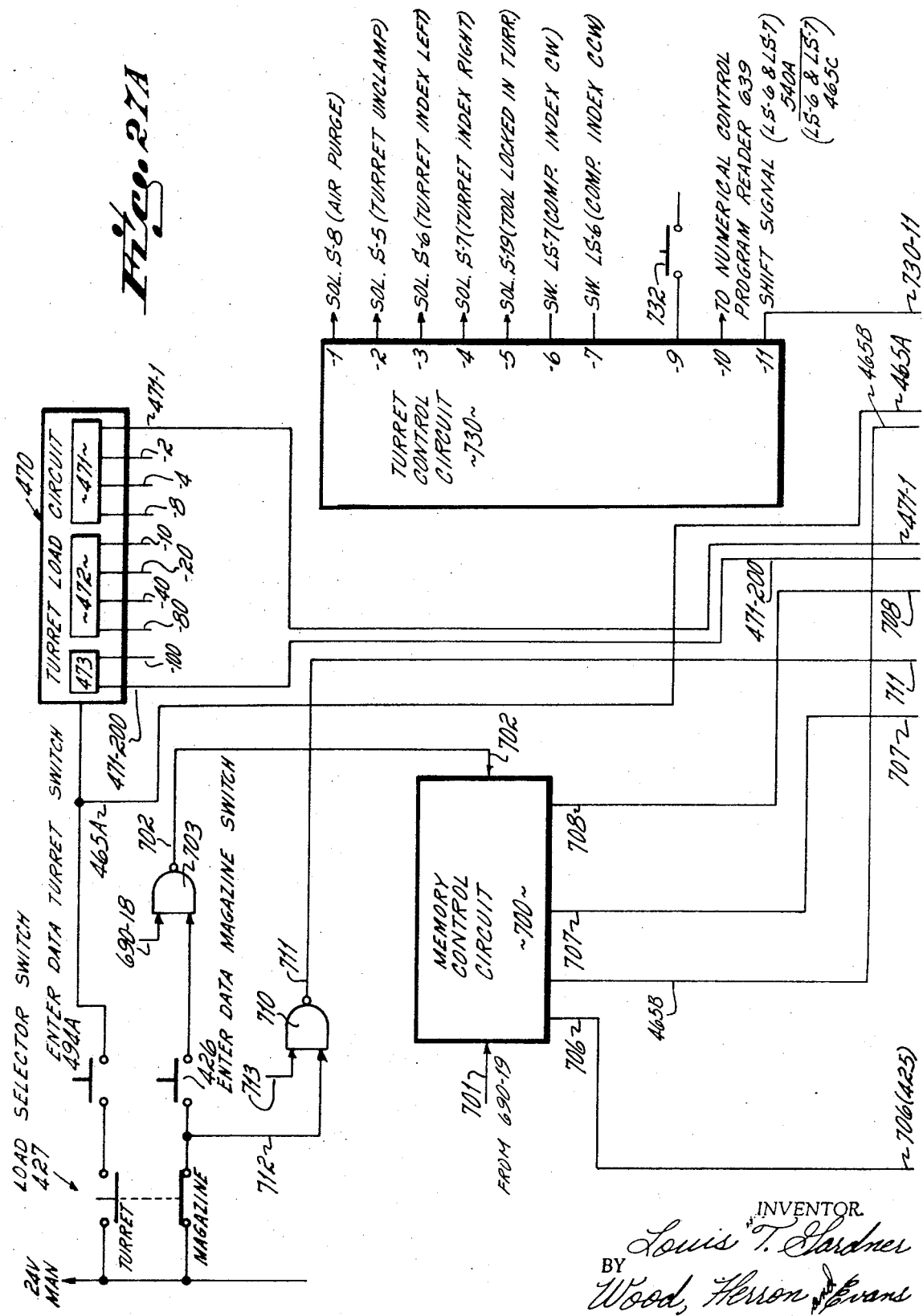

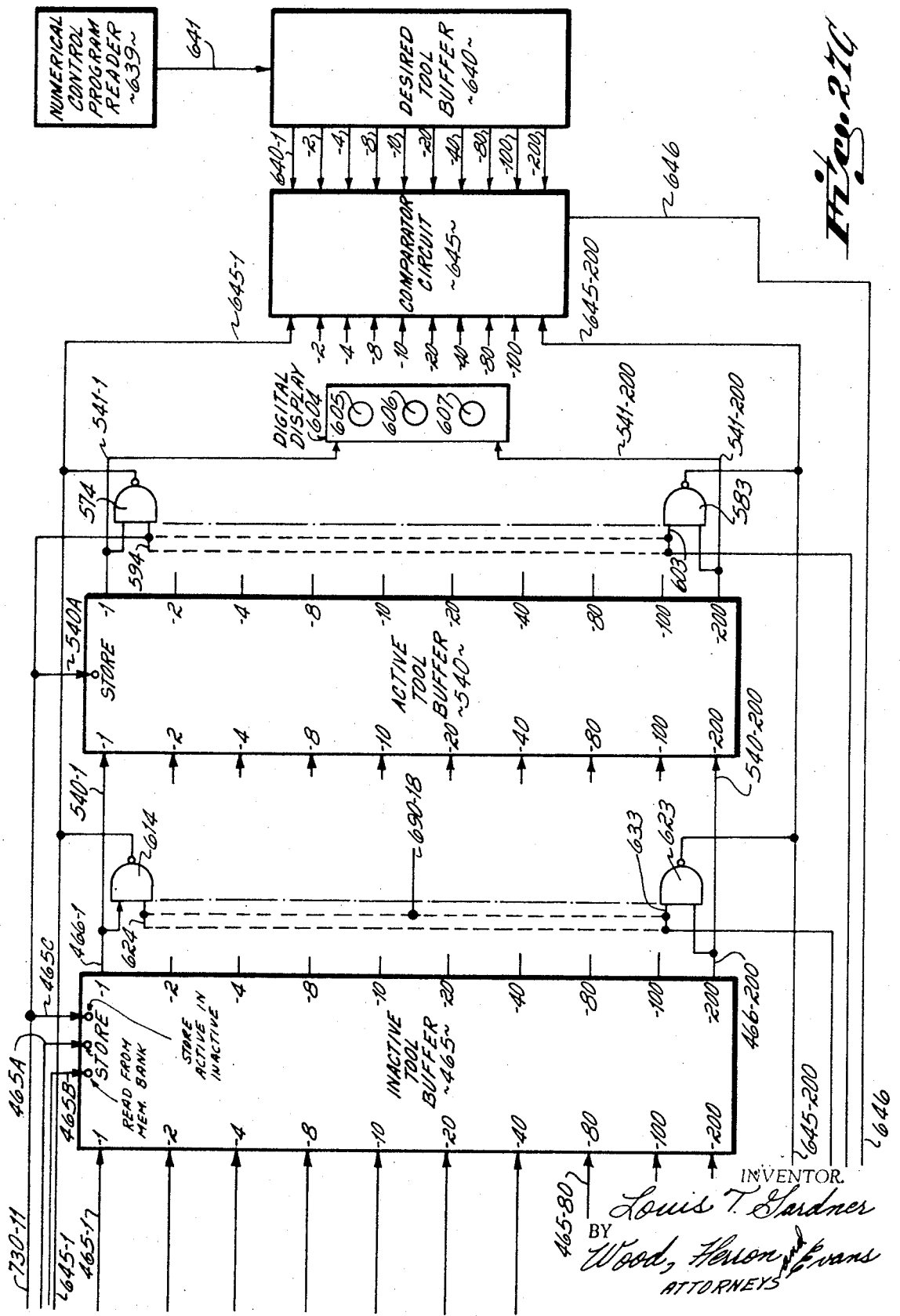

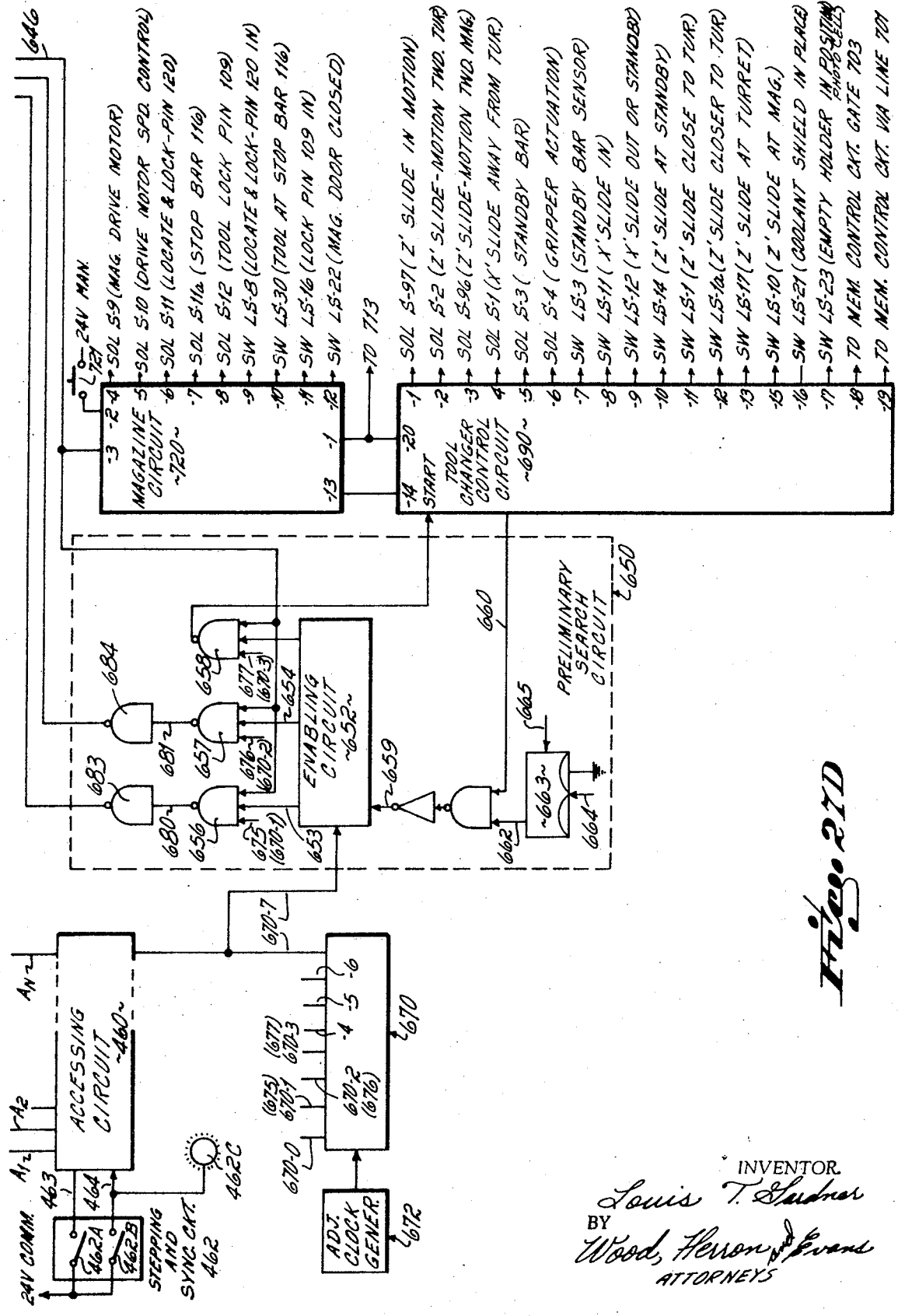

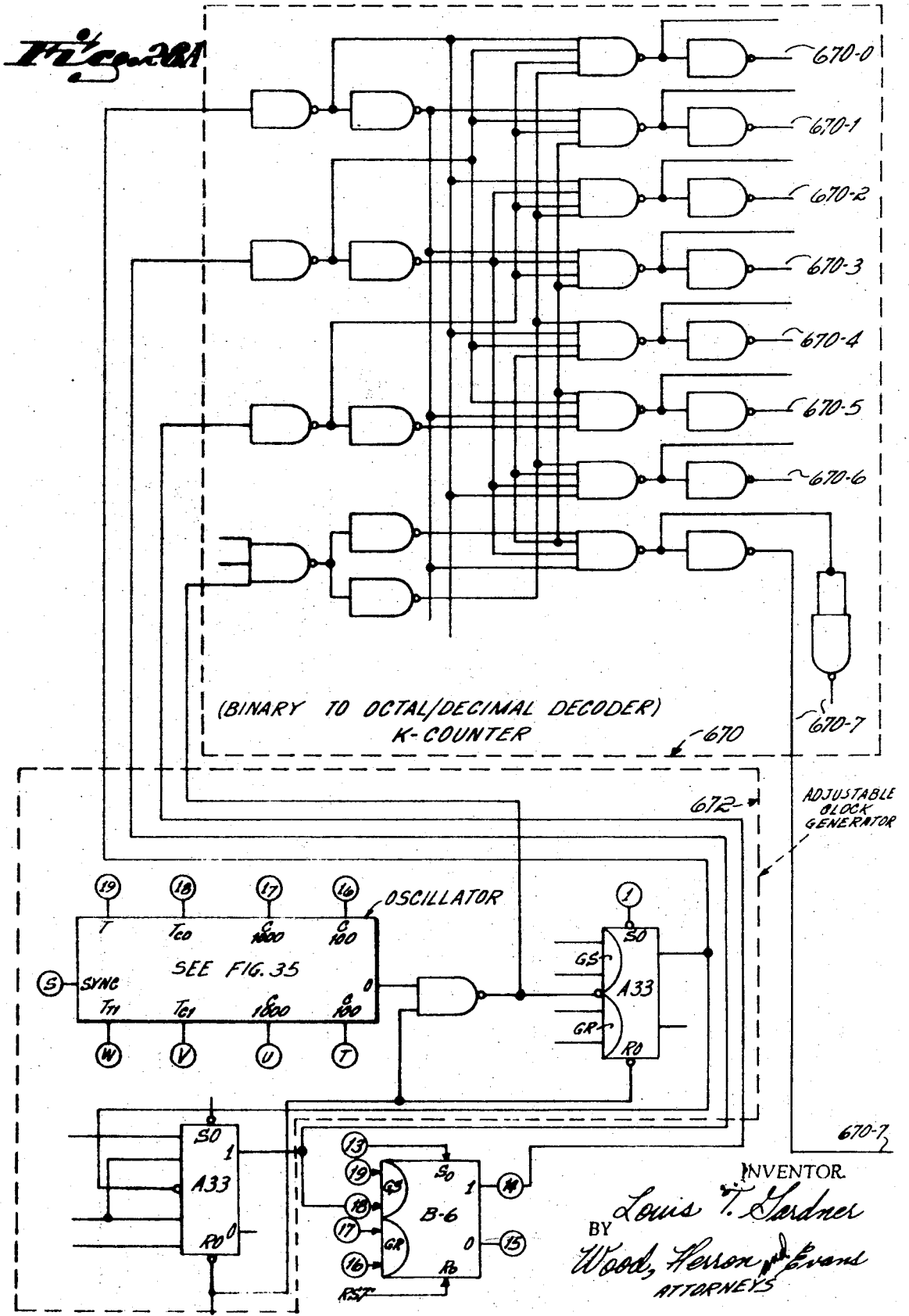

TOOL CHANGER CONTROL
CKT. 690 EXCEPT FOR
BLOCKED IN PORTIONS

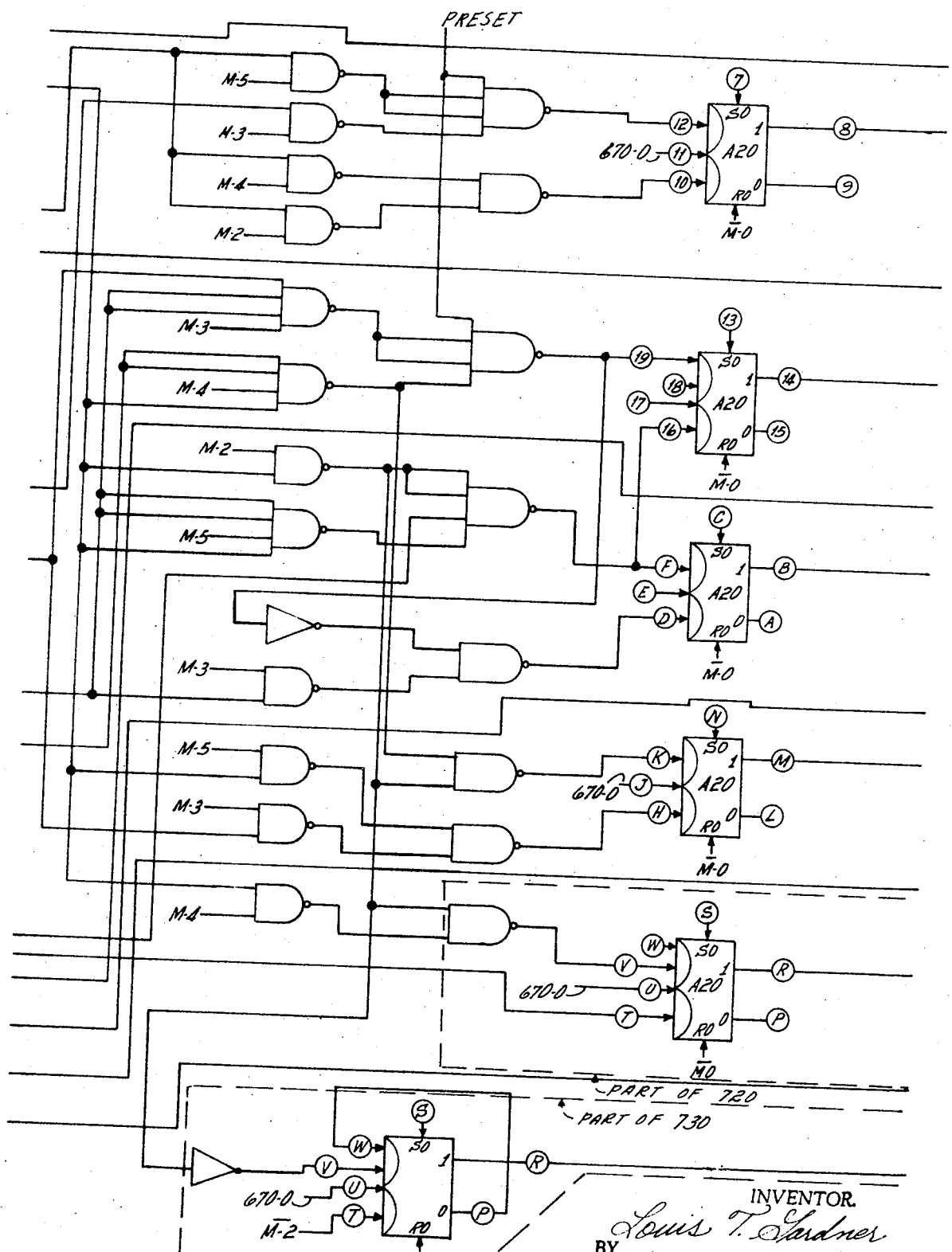
Fig. 29B TOOL CHANGER CONTROL CK'T EXCEPT FOR BLOCKED IN PORTIONS

TOOL CHANGER CONTROL CKT. 690 EXCEPT FOR BLOCKED IN PORTIONS

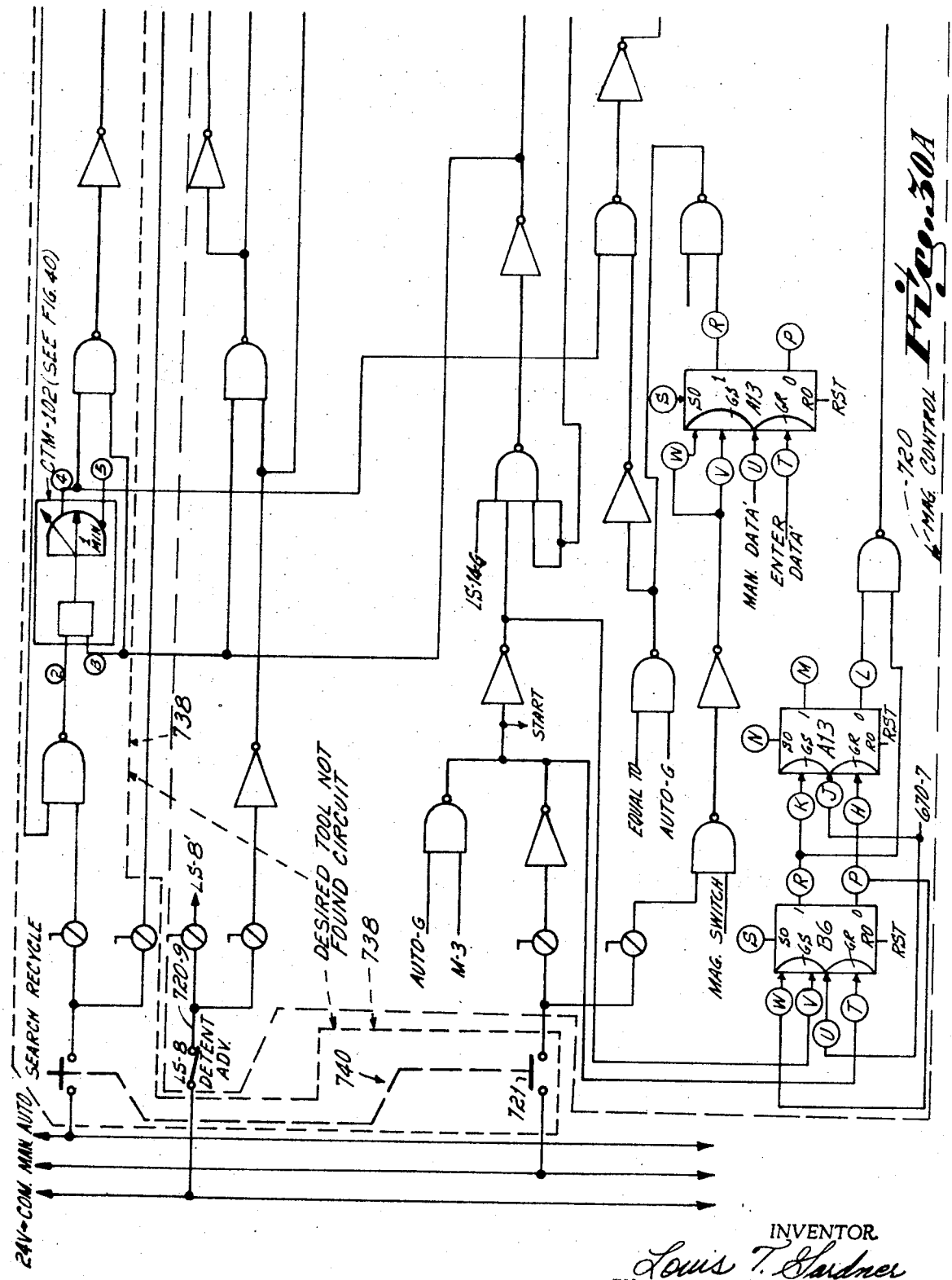

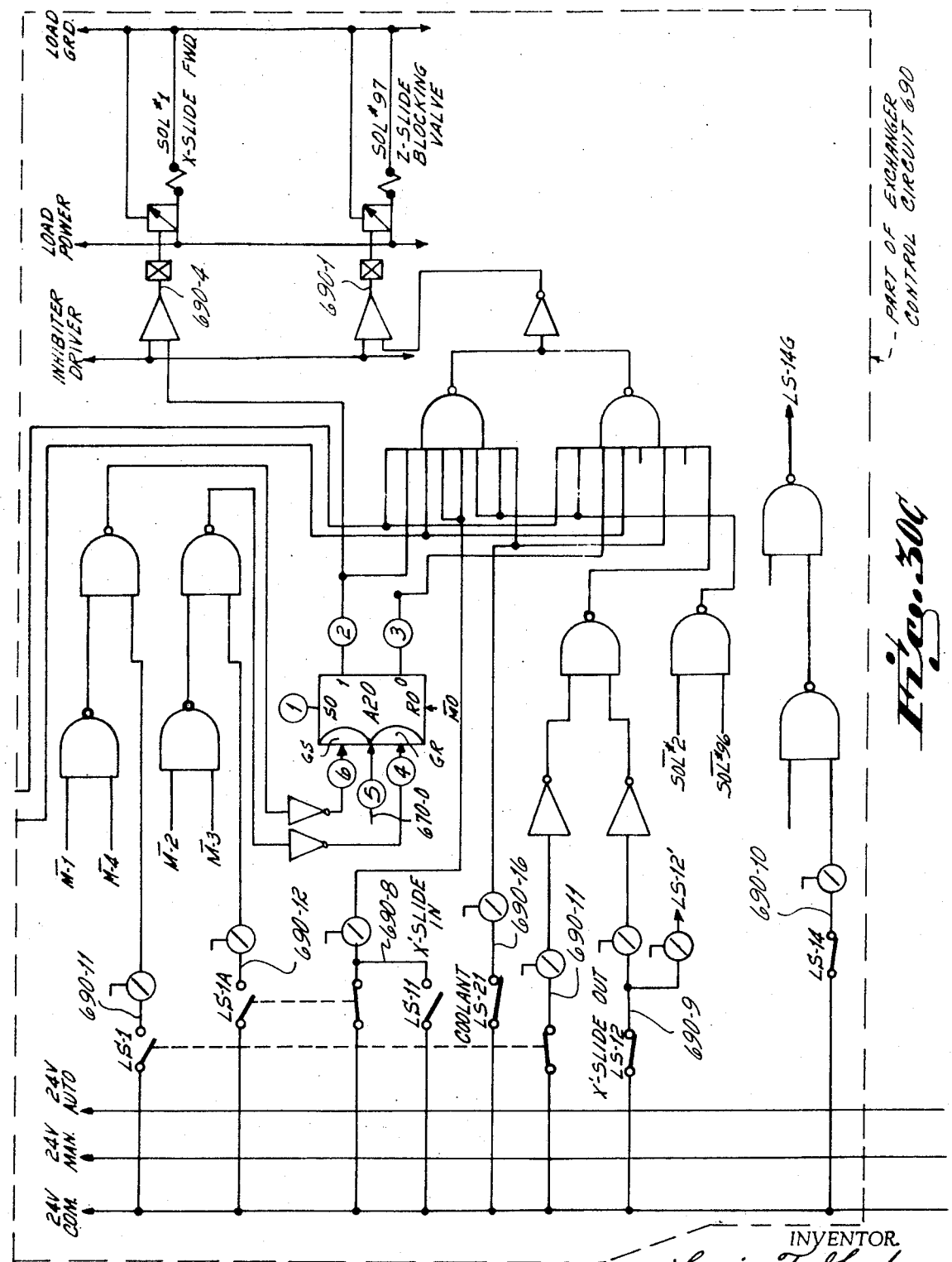

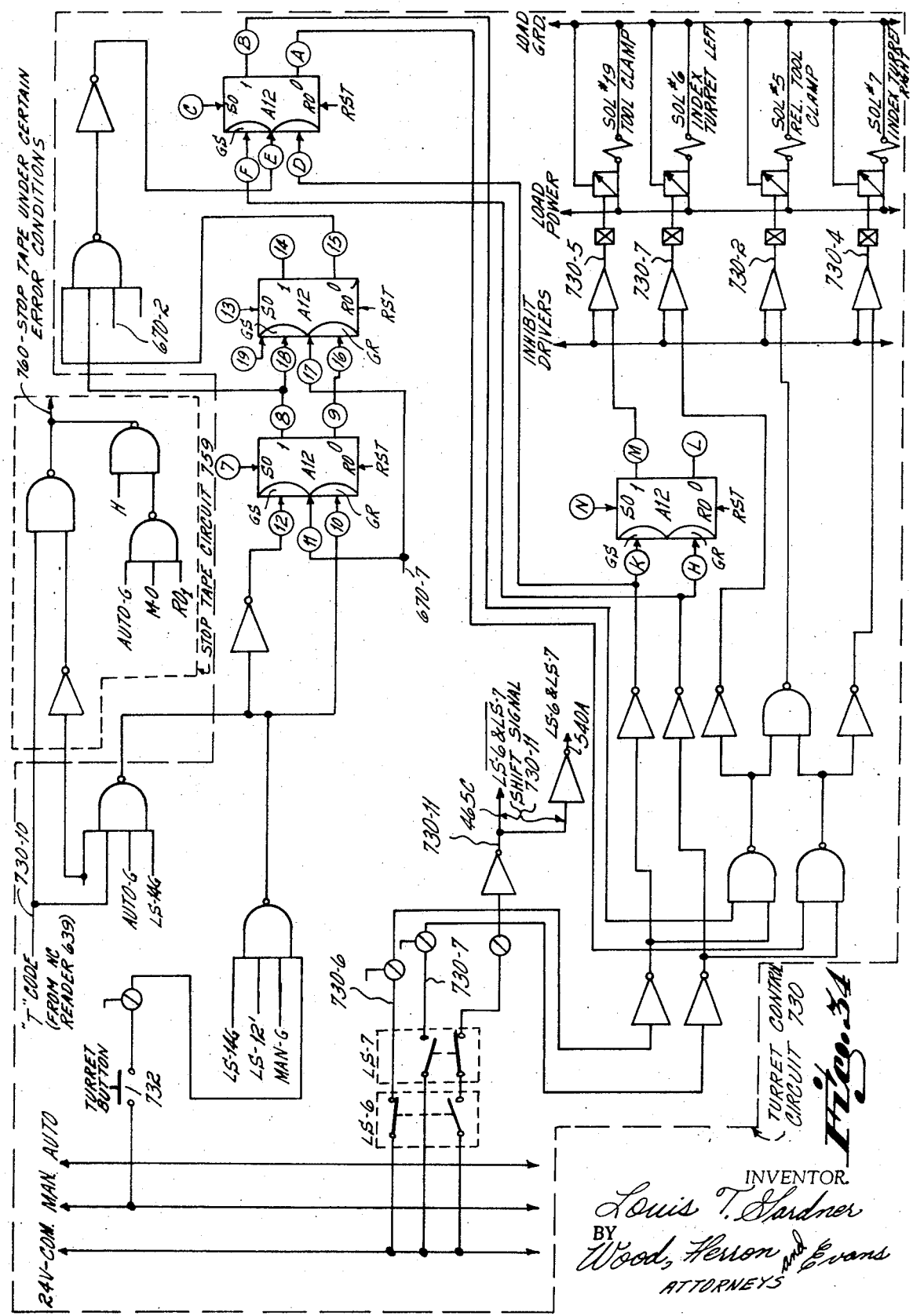

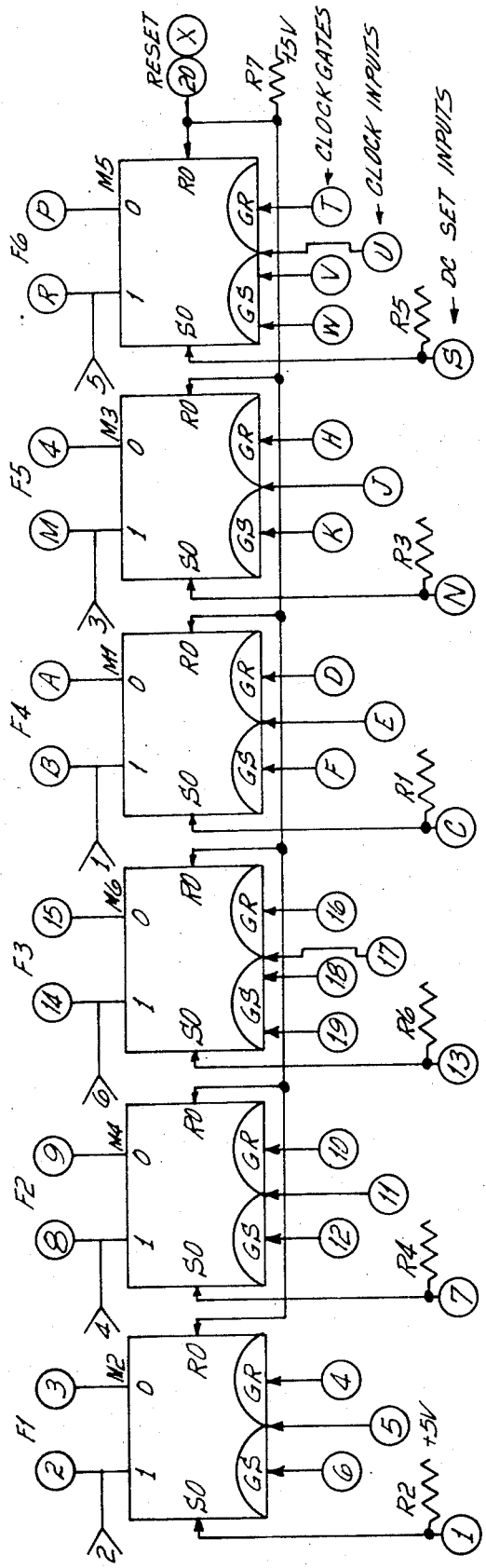
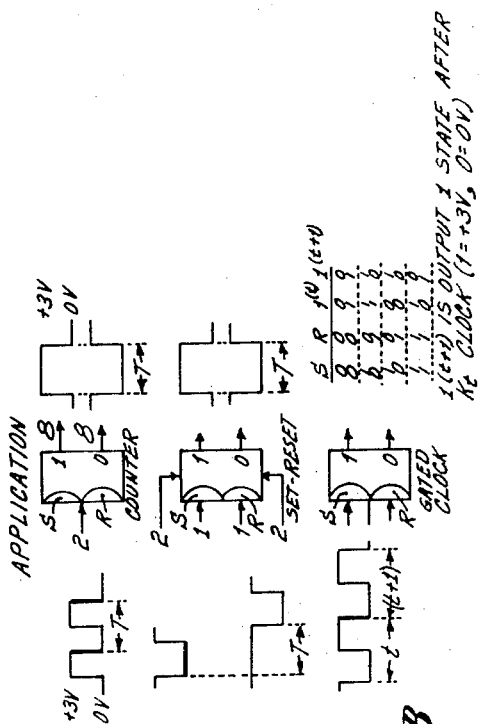
Fig. 37A
Fig. 37B

INVENTOR.
Louis T. Gardner
BY
Wood, Herron & Evans
ATTORNEYS

MACHINE TOOL RETRIEVAL AND INTERCHANGE SYSTEM

This invention relates to machine tools, and more particularly to machine tools having means for automatically retrieving tools from a multi-tool magazine and interchanging the retrieved tool with the tool last used to machine the workpiece.

Machine tools of the general type to which this invention relates typically include a work holder for holding a workpiece which is to be subjected to sequence of machining operations using a variety of separate tools, a magazine for storing the tools which are to be used in the machining operation sequence, and retrieval and interchange means responsive to a command from a numerical control program reader for successively selecting the needed tools from the magazine and positioning them in operative association with the workpiece. Depending upon the particular type or class of machine tool involved, the various elements of the machine tool can take different forms.

For example, if the machine tool is of the punch press type, the workpiece holder is a non-rotatable clamping device which moves the workpiece relative to a punching station and the magazine is a rotatable disc or drum having circumferencially arranged punch holders which are angularly indexed relative to the punch station where selected punches are urged against the workpiece. In another type or class of machine tool, known as boring machines, the work holder is a non-rotatable clamp which holds the workpiece stationary relative to a work station, and the magazine is an endless drum, disc or conveyor which positions selected tools at an interchange station where the selected tools are transferred by a suitable transfer carriage to a rotating spindle operatively associated with the workpiece. In still another form of machine tool, known as the turret lathe, the work holder is in the form of a rotating chuck, and the magazine is a disc, drum or endless conveyor which moves selected tools to an interchange station where they are transferred to a tool holder of a turret operatively positionable relative to the workpiece.

In connection with machine tools of the foregoing and similar types, three principal approaches have been proposed for selecting, in response to the command of the numerical control program reader, the desired tool for any given machining operation from among the plurality of tools stored in the magazine. In accordance with a first of these proposals, the tool holders of the magazine are consecutively numbered, and a suitable motor control means provided for selectively indexing the magazine a pre-determined number of tool holder increments, the particular number depending upon the number of the tool holder in which the desired tool is known to be stored. The difficulty with such an approach is that the tools cannot be inserted into the magazine tool holders on a random basis, but rather must be inserted into the numbered tool holders in accordance with pre-conceived tool holder locations, or addresses, given to each of the tools at the time the numerical control program is developed. Thus, when a tool is removed from the magazine for a machining operation it must be placed back into the exact and same tool holder from which it came, rather than be returned to any tool holder which may at that time be empty, which in many cases is significantly more convenient and expedient.

In a second proposal, which overcomes the random storage limitation of the above-described tool retrieval scheme, each of the tools stored in the magazine is given a tool number, and the tool number physically recorded on the tool in the form of mechanically sensible code rings, magnetically readable code data, etc. As the magazine indexes, the tools move past a reader associated therewith, enabling the code-bearing portions of the tools to be read. When the code number of the tool required for the next operation is sensed, suitable magazine stopping means are actuated, positioning the desired tool at the tool interchange station.

A third approach, similar to the second approach, and also overcoming the random storage limitation of the consecutively number magazine proposal, involves physically encoding each of the tool holders, rather than the tool itself, with machine sensible data representing the number of the tool located in that tool holder. When the magazine is then rotated to present the various tools to the interchange station, the sensible indicia physically recorded on the tool holders are read by a suitably located reader. When the sensible number read from a magazine tool holder corresponds to the number of the desired tool, the magazine is stopped to position that magazine tool holder, and hence the desired tool, at the interchange station.

Each of the two foregoing proposals, although they are not subject to the random storage limitation of the first-mentioned scheme, is subject to a number of other operational disadvantages which adversely affect the speed and/or reliability with which they can select tools. For example, the use of sensible records and readers in an environment exposed to chips, dirt, and other foreign matter typically found in and around a machining operation introduces errors into the record reading process, reducing reliability. Mounting the records on moving tools or tool holders also introduces reading errors since the tools or tool holders frequently do not move at uniform speed as is necessary for accurately reading certain types of records, particularly magnetic records. Finally, the mere fact that the records are mounted on tools or tool holders introduces reading errors due to vibrational disturbances and dimensional variations which inherently exist in such a record-mounting arrangement.

It has been an objective of this invention to provide a system for retrieving tools from a multi-tool magazine which permits the tools to be randomly inserted into the magazine, and yet does not require that either the tools or their holders be physically encoded with identifying numbers thereby introducing into the reading operation the reliability and speed limitations inherent with such prior art tool and/or holder coding proposals. This objective has been accomplished in accordance with certain principles of this invention by utilizing a fundamentally different and unobvious approach to the tool retrieval problem. This approach is predicated on the novel concept of providing a bank of stationary memory elements mounted independent of the tools and/or holders which are allocated to different ones of the tool holders and in which identifiers arbitrarily assigned to tools for retrieval purposes may be stored when the tools are stored in the tool holders to which the respective memory elements are allocated, and accessing means for successively accessing the memory elements as the tool holders to which they are allocated move past a tool interchange station. In accordance with this concept, as the tool holders of the magazine are indexed through a tool interchange station, the contents of the stationary memory elements are accessed and available for comparison with the identifier of the desired tool. When a comparison between the contents of an accessed memory element and the identifier of the desired tool is favorable, a control signal is produced to position the desired tool at the interchange station.

An advantage of the tool retrieval system of this invention, in which a stationary memory element bank is used having memory elements mounted independent of the movement of the tools and/or tool holders, is that neither the tools nor the tool holders in which the tools are located need be physically encoded with sensible tool identifying data. Hence, problems associated with reading sensible data recorded on moving tools and/or tool holders, such as environmental dust and dirt, non-uniformities in tool and/or holder movement, vibration and dimensional variations, are not present.

In accordance with a preferred use, the tool retrieval system of this invention is applied to a turret lathe which includes a rotating chuck for revolving a workpiece, a turret with at least two tool holders alternatively positionable in operative relationship to the workpiece, an endless magazine conveyor mounting tool holders for movement past a magazine interchange station, and a tool transfer carriage for transferring tools between the turret and the magazine. When the retrieval system of this invention is so used, a stationary memory bank is provided having as many individual memory elements as there are tool holders in the magazine conveyor, each memory element being allocated to a different tool holder and capable of storing the identifier of the tool stored in its respectively allocated tool holder. In addition to the magazine tool holder memory elements, two turret tool holder memory elements are provided for storing the identifiers of the tools positioned in the turret tool holders.

In operation, an accessing circuit responsive to the indexing of the magazine tool holders past the interchange station successively accesses the various magazine memory elements as the tool holders to which they are allocated pass the interchange station. The identifier of a desired tool, as provided by a numerical control program data reader, is successively compared with the contents of the successively accessed memory elements. When a favorable comparison results a control signal is generated to stop magazine indexing movement, thereby positioning the desired tool at the interchange station for transfer by the carriage to the inactive side of the turret.

The preferred embodiment also includes means for up-dating the contents of the magazine memory elements, as well as the contents of the turret memory elements, when tools are inserted and/or withdrawn from the magazine and/or turret tool holders, thereby insuring that the various memory elements reflect, at any given time, the current location of all tools in the system.

These and other advantages and objectives of the invention will become more readily apparent from a detailed description of a preferred embodiment taken in conjunction with the drawings in which:

FIG. 1 is a perspective view of a turret lathe into which can be incorporated the tool retrieval system of this invention, FIG. 2 is a semi-diagrammatic top elevational view of the lathe of FIG. 1, FIG. 3 is a semi-diagrammatic front elevational view of the lathe of FIG. 1, FIG. 4 is a cross-sectional view through the tool turret taken along line 4—4 of FIG. 1, FIG. 5 is a cross sectional view through the tool turret taken along line 5—5 of FIG. 4, FIG. 6 is a cross-sectional view of the gripper of the tool transfer carriage, FIG. 7 is a cross-sectional view through the tool storage magazine taken along line 7—7 of FIG. 1, FIG. 8 is a cross-sectional view through the tool storage magazine taken along line 8—8 of FIG. 7, FIG. 9 is an enlarged cross-sectional view of the tool transfer station portion of the tool storage magazine of FIG. 7, particularly illustrating the conveyor structure and the mechanism for locking a tool in a tool holding module of the magazine, FIG. 10 is a schematic chart illustrating the function and operation, during various operational stages, of certain of the electrical components of a control circuit designed for implementing the tool retrieval system of this invention in a turret lathe, FIG. 11 is a diagrammatic top plan view showing the tool transfer carriage in its standby position, FIG. 12 is a diagrammatic top plan view showing the tool transfer carriage being shifted along the Z' axis toward the tool turret, FIG. 13 is a diagrammatic top plan view showing the tool transfer carriage as it continues to move toward the tool turret along the Z' axis and showing the tool transfer cross-slide being shifted toward the turret along the X' axis, FIG. 14 is a diagrammatic top plan view showing a previously used tool being removed from the turret by the tool changer, FIG. 15 is a diagrammatic top plan view showing the tool transfer carriage being retracted along the Z' axis, FIG. 16 is a diagrammatic top plan view showing the continued movement of the tool transfer carriage along the Z' axis and movement of the tool transfer slide along the X' slide, FIG. 17 is a diagrammatic top plan view showing the tool transfer carriage in its tool interchange position in which the previously used tool is being deposited in a module of a magazine, FIG. 18 is a diagrammatic top plan view showing the tool transfer carriage returned to the standby position, FIG. 19 is a diagrammatic top plan view showing the tool transfer carriage returned to its tool interchange position in which it is picking up a new tool retrieved from another module of the magazine in accordance with the principles of this invention, FIG. 20 is a diagrammatic top plan view showing the tool transfer carriage transporting a new tool along the Z' axis toward the tool turret, FIG. 21 is a diagrammatic top plan view showing continued movement of the tool transfer carriage along the Z' and X' axes toward the tool turret, FIG. 22 is a diagrammatic top plan view showing a new tool being inserted into the tool turret, FIG. 23 is a diagrammatic top plan view showing the tool transfer carriage being retracted along the Z' axis toward its standby position, FIG. 24 is a diagrammatic top plan view showing the continued movement of the tool transfer carriage along the Z' axis and movement of the tool transfer slide along the X' axis, FIG. 25 is a diagrammatic top plan view showing the tool turret being rotated to present the new tool to the workpiece with the tool transfer carriage returned to its standby position, FIG. 26 is a view similar to FIG. 11 except that the turret is fully rotated to present the new tool to the workpiece and the previously used tool toward the gripper for subsequent replacement in the manner described above, FIGS. 27A-27D are schematic circuit diagrams in block diagram format of a preferred electrical circuit useful in implementing the retrieval system of this invention in a turret lathe, FIG. 27 is a layout diagram showing the manner in which FIGS. 27A-27D are related, FIGS. 28A-28C are a detailed circuit diagram of a portion of the circuit of FIGS. 27A-27D, FIG. 28 is a layout diagram showing the manner in which FIGS. 28A-28C are related, FIGS. 29A-29C are a detailed circuit diagram of a portion of the circuit of FIGS. 27A-27D, FIG. 29 is a layout diagram showing the relation of FIGS. 29A-29C, FIGS. 30A-30C are a detailed circuit diagram of a portion of the circuit of FIGS. 27A-27D, FIG. 30 is a layout diagram showing the relation of FIGS. 30A-30C, FIGS. 31A-31C are a detailed circuit diagram of a portion of the circuit of FIGS. 27A-27D, FIG. 31 is a layout diagram showing the relation of FIGS. 31A-31C, FIGS. 32A-32C are a detailed circuit diagram of a portion of the circuit of FIGS. 27A-27D, FIG. 32 is a layout diagram showing the relation of FIGS. 32A-32C, FIGS. 33A-33B is a detailed circuit diagram of a portion of the circuit of FIGS. 27A-27D, FIG. 33 is a layout diagram showing the relation of FIGS. 33A-33B, FIG. 34 is a detailed circuit diagram of a portion of the circuit of FIGS. 27A-27D, FIG. 35 is a detailed circuit diagram of an oscillator useful in the oscillator circuit of FIG. 28A, FIG. 36 is a detailed logic circuit diagram of one DC set/reset flip-flop stage of the desired tool buffer of FIG. 32A, FIG. 37A is a circuit diagram of six independent interconnected JK flip-flops mounted on a single circuit card.

FIG. 37B shows a JK flip-flop of FIG. 37A in counter, set/reset, and gated clock modes, FIG. 38 is a detailed circuit diagram of a signal converter, FIGS. 39 and 40 are detailed circuit diagrams of variable delay circuits useful in the circuits of FIG. 29 and FIGS. 28B and 30A, respectively, FIG. 41 is a detailed logic circuit diagram of a 12-stage shift register of the type used in the active and inactive tool buffers of FIG. 33A, FIGS. 42-50 are conventional symbols for various logical functions used in the circuits of FIGS. 27-34.

GENERAL DESCRIPTION OF MACHINE TOOL

Shown in FIGS. 1-9 and 11-26 is a lathe of the type disclosed in Burroughs et al. U.S. Pat. No. 3,443,310, which constitutes one of the many different types of machine tools with which the tool retrieval and interchange system of this invention can advantageously be utilized, but which itself forms no part of this invention. The system of this invention is not limited to use only in connection with lathes, but rather can be used in any machine tool wherein different tools normally stored in a tool magazine are selectively retrieved for operating on a workpiece. Illustrative of other types of machine tools with which the system of this invention can be utilized are punch presses of the general type disclosed in Sulzer U.S. Pat. No. 2,363,208, milling machines of the general type disclosed in Hutchens et al U.S. Pat. No. 3,073,024, jig boring machines of the general type disclosed in Morgan U.S. Pat. No. 2,901,927, and the like.

A detailed description of the lathe with which the tool retrieval and interchange system of this invention can be advantageously used is disclosed in Burroughs et al. U.S. Pat. No. 3,443,310, issued May 13, 1969, entitled Tool Changing Apparatus, assigned to the assignee of this application. The entire disclosure of the Burroughs et al. patent is expressly incorporated herein by reference.

As shown best in FIGS. 1, 2, and 3, the lathe comprises a tool carriage 10 and a headstock 12 mounted upon a bed 11. The headstock 12 is a conventional geared transmission operable to drive a spindle (not shown) on the end of which is mounted a chuck 13 for rotatably supporting a workpiece 14. Ways 15, 16 on the top of the bed 11 slideably support a Z axis slide 17 of the carriage 10 for movement longitudinally of the bed along the Z axis of the machine. A saddle or X axis cross-slide 18 is slideably supported upon ways (not shown) of the Z axis slide 17 for movement transversely of the bed 11 or along the X axis of the machine. A tool turret 20 is mounted upon the cross-slide 18 and supports a pair of tools 21, 22 which may be alternately moved into engagement with the rotating workpiece 14 to effect the desired machining operation of the workpiece.

The tool changer 25 is also included and comprises a tool storage magazine 30 mounted on the rear of the machine bed 11 and a tool transfer carriage 31 transporting tools between the magazine and the turret 20. The transfer carriage 31 includes a Z' axis slide 32 movable along the Z' axis of the machine over ways 26, 27 mounted upon the bed 11. A tool carriage cross-slide 33 or X' slide is laterally movable over ways 28, 29 fixed to the Z' slide 32. The tool transfer carriage 31 supports a tool gripper 34 which is operable to grasp and support a tool during transfer between the turret 20 and magazine 30.

For purposes of clarifying this description, the Z axis of the machine has been labeled the Z' axis when referring to the axis of movement of the tool transfer carriage 31 and the X axis has been labeled the X' axis when referring to the axis of movement of the cross-slide 33 of the tool transfer carriage 31.

TURRET

A detailed description of the structural and operational details of the turret 20 is described in previously-referenced Burroughs et al. U.S. Pat. No. 3,443,310 (see columns 8-12). For the purposes of understanding the structure and operation of the tool retrieval and interchange system of this invention, a brief description of the turret 20 is provided. The turret 20, as best seen in FIGS. 4 and 5, comprises a rotatable tool block 45 and a stationary turret base 46. The tool block 45 mounts two oppositely disposed tool holders 47 and 48 which selectively mount tools 21 and 22, respectively. The base 46 is fixedly secured to the turret X cross-slide 18. A curvic coupling 49 selectively movably interconnects the tool block 49 and the turret base 46 to permit indexing of the tool block, and hence the tool holders 47 and 48 relative to the base, between at least two different angulated positions which are 180° apart. These positions correspond to the turret position depicted in FIG. 1 as well as a turret position rotated 180° therefrom.

To index the turret between the positions shown in FIG. 1 and a position 180° rotated therefrom, a hydraulic indexing motor (not shown) is provided. The indexing motor is capable of bi-directionally rotating the turret 20, and to accomplish such bi-directional motion solenoids S-6 and S-7 (see FIG. 34) which operate valves in the indexing motor hydraulic circuit are provided. Solenoids S-6 when energized indexes the turret in one direction to position the tool holder 47 at the work station, i.e., to position tool 21 in operative relation to workpiece 14. Solenoid S-7 when energized indexes the turret in the other direction to position the tool holder 48 at the work station.

The turret also includes suitable tool clamps means in the form of hydraulic motors 50 and 51 which operate tool-engaging fingers 52 and 53 and thereby clamping the particular one of the tools 21 or 22 located at the work station in its associated tool holder 47 or 48 when tool finger hooks 54 and 55 engage inwardly extending flange 60 or 61 of tools 21 or 22. The tool clamp motors 50 and 51 are controlled by a solenoid S-19 (FIG. 34) in the hydraulic circuit of the motors which when energized operates the motors 50 and 51 associated with the tool clamp fingers 52 and 53 respectively to clamp the tool 21 or 22 located at the work station in its respective tool holder 47 or 48.

A limit switch LS-6 (FIG. 34) is also provided to determine completion of a counterclockwise turret indexing operation. The limit switch LS-6 is closed when indexing of the turret in a counterclockwise direction is complete. A second limit switch LS-7 (FIG. 34) is provided to sense completion of a clockwise turret indexing operation. The limit switch LS-7 is closed when a clockwise turret indexing operation is complete.

Suitable air purge means including air exit ports 62 are also provided in each tool holder socket or cavity 47, 48 of the turret 20 for purging the socket of the tool holder located in the inactive turret position when inserting or withdrawing a tool from the inactive turret tool holder. The air purging insures that debris such as chips and the like does not interfere with the proper positioning and seating of a tool in the inactive turret tool holder, as well as provides a hydrostatic bearing to guide the shank of a tool being transferred to or from the inactive turret tool holder. To operate the air purging means three solenoids S-8, S-14 and S-98 are provided. Solenoids S-14 and S-98 are in the main air line. Solenoid S-14 must be energized during a tool change cycle, while solenoid S-98 must be energized whenever the machine tool is in its energized or on condition. Solenoid S-8 is energized only during that portion of a machine tool cycle immediately prior to and during the insertion or withdrawal of a tool into or from the inactive turret tool holder. Suitable hydraulic means are also provided to clamp the tool block 45 and base 46 upon completion of a turret indexing operation. The clamping means includes a hydraulic valve controlled by a solenoid S-5 which when energized unclamps the turret.

As used herein the term inactive or idle tool or tool holder refers to tool or tool holder located remote from the workpiece 14, such as tool holder 48 and tool 22 depicted in FIG. 1. Similarly, the terms active tool or tool holder refer to the tool or tool holder located adjacent the workpiece 14, such as tool holder 47 and tool 21 depicted in FIG. 1.

TOOL CHANGER

Gripper

The tool changer includes a gripper 34, a detailed structural and operational description of which is provided in the above-referenced Burroughs et al. application (see columns 15–17). For the purpose of understanding the tool interchange and retrieval system of this invention a brief description of the gripper is provided. Specifically, and as best shown in FIGS. 1–3 and 6, the gripper 34 is mounted on the X' cross-slide 33 and includes a pair of pivotally mounted gripper arms 65 and 66. Arms 65 and 66 are disposed transversely to the axis of a tool stored in the inactive turret tool holder 48, such as tool 22, as well as transversely to the axis of the tools stored in the magazine 30. When the arms 65, 66 are moved to their inner, closed position by suitable hydraulically actuated toggle linkage means 67, a tool 68 located therebetween is clamped by the arm ends 69 and 70 relative to the X' cross-slide with its axis parallel to the Z and Z' axes by engagement of arm ends 69 and 70 with V-notches 71 and 72 formed in the tool 68.

When the gripper arms 65 and 66 are moved to their outer position a tool previously gripped between arm ends 69 and 70 is released. To control the movement of gripper arms 65 and 66 between their inner tool gripping position and their outer tool releasing position appropriate a hydraulic actuating means 73 is provided. The hydraulic actuating means 73 is controlled by a solenoid S-4 (FIG. 29C) which when energized causes the gripper arms 65 and 66 to move to their outer, tool release position. De-energization of the solenoid S-4 causes the gripper arms 65 and 66 to move to their inner gripping position.

The tool changer includes the Z' slide 32 and X' slide 33. The X' slide moves between a standby position wherein the gripper 34 is aligned with the magazine interchange station to facilitate inserting or withdrawing a tool from magazine 30 as the Z' slide moves to the magazine, and an active or turret tool change position wherein the gripper is aligned with the inactive tool holder 48 for inserting or withdrawing a tool from the turret as the Z' slide moves to the turret. The Z' slide and X' slide are driven by suitable hydraulic means (not shown). Control of such hydraulic means is effected through solenoids S-13, S-97, S-2, S-96, and S-1. Solenoid S-13 operates a valve in the main hydraulic supply line and must be energized for motion of either or both Z' slide 32 or X' cross-slide 33. Solenoid S-97 controls a blocking valve in the hydraulic line which powers the Z' slide 32, and must be energized if the Z' slide is to be moved. Solenoid S-2 controls a valve in the hydraulic line which powers the Z' slide 32 for movement towards the turret 20 and must be energized if the Z' slide is to move toward the turret. Solenoid S-96 controls a valve in the hydraulic line which powers the Z' slide 32 for movement toward the magazine 30, and must be energized if the Z' slide is to move toward the magazine. A solenoid S-1 controls a two-way valve in a hydraulic supply line and is normally de-energized to power the X' slide 33 for movement away from the turret 20. The solenoid S-1 when energized causes the X' slide 33 to move toward the turret 20.

The tool changer 25 also includes a standby position stop or bar 75. The standby bar 75 is selectively movable between a lower and an upper position. In the lower position the standby bar is in the path of travel of the Z' slide 32 and stops all movement of the tool transfer carriage 31 along the Z' axis, holding the carriage 31 in a standby position clear of the turret and magazine. In the upper position of the standby 75, Z' slide 32 is free to move in the Z' direction. To position the standby bar 75 between its upper and lower positions, a solenoid S-3 is provided. The solenoid S-3 controls a valve in the hydraulic line which powers the standby bar shifting mechanism. When the solenoid S-3 is energized the standby bar is elevated to a position wherein it does not interfere with movement of the tool transfer carriage 31 in the Z' direction. When the solenoid S-3 is de-energized the standby bar is lowered to a position wherein it prevents movement of the tool transfer carriage 31.

To indicate the position of the standby bar 75, the X' tool transfer cross-slide 33 and the Z' tool transfer slide 32 during a tool change cycle a number of limit switches are provided. A limit switch LS-3 is responsive to the position of the standby bar 75, and is adapted to close when the standby bar 75 is in its lower position wherein it blocks movement of the Z' slide 32. A limit switch LS-14 is mounted on the standby bar 75 and when the standby bar is in its lower position is responsive to the presence of the Z' slide 32 at the standby position and is adapted to close when the Z' tool transfer slide is so positioned. A limit switch LS-17 is provided which closes in response to the presence of the Z' tool transfer slide 32 at a position adjacent the turret 20 where tool transfer to and from the inactive side of the turret occurs. A limit switch LS-10 is provided and closes when the Z' tool transfer slide 32 is positioned adjacent the magazine 30 wherein tools are transferred to the magazine.

Limit switches LS-11 and LS-12, are provided which are responsive to the movement of the X' tool transfer cross-slide 33. Limit switch LS-11 is adapted to close when the X' tool transfer cross-slide 33 is in its inner position, while the limit switch LS-12 is adapted to close when the X' tool transfer cross-slide is in its outer or standby position.

A limit switch LS-1 is responsive to the presence of the Z' tool transfer slide 32 when the slide is a predetermined distance from the turret. The switch LS-1 closes when the Z' tool transfer slide 32 is a predetermined distance from the turret 20 and functions to initiate movement of the X' tool transfer cross-slide 33 from its outer standby position to its inner tool transfer position. A limit switch LS-1a is responsive to the presence of the Z' slide tool transfer 32 when the slide is a specified distance from the turret, which distance is less than the distance associated with the limit switch LS-1. The limit switch LS-1a closes when the Z' tool transfer slide 32 reaches its associated predetermined distance from the turret 20, and functions when the Z' tool transfer slide is moving toward the turret to stop movement of the Z' slide 32 if the X' tool transfer slide 33 has not moved into a position such that gripper 34 is in alignment with the inactive tool holder 48 of the tool turret 20 and the limit swich is tripped.

Limit switches LS-1 and LS-1a also perform a function when a transfer to the turret 20 is complete and the Z' tool transfer slide 32 is moving away from the turret. Specifically, when the Z' tool transfer slide 32 is moving away from the turret 20, limit switch LS-1a is tripped by the Z' tool transfer slide, initiating movement of the X' tool transfer slide from its inner tool transfer position to its outer standby position. When the Z' tool transfer slide 32 moves further away from the turret and trips the limit switch LS-1, the limit switch LS-1 prevents the Z' slide from continuing movement unless the X' slide 33 has reached its outer standby position and tripped limit switch LS-12. In this way, the Z' slide 32 cannot move the magazine 30 to insert a tool therein without the gripper 34 having aligned itself with the empty tool holder at the magazine.

A limit switch LS-23 is provided in association with the tool magazine 30. Limit switch LS-23 is responsive to the presence of an empty tool holder at the interchange station of the tool magazine 30, and when closed indicates that an empty tool holder is present and that a tool removed from the inactive side of the turret can be inserted into the magazine. A limit switch LS-21 is responsive to the position of a shield which shields the coolant applied to the workpiece 14. The limit switch LS-21 is adapted to close when the shield is properly positioned. If the limit switch LS-21 is not closed, indicating that the coolant shield is not properly positioned, the solenoid S-97 is de-energized to prevent the application of power to the Z' tool transfer slide 32.

Tool Storage Magazine

As may be seen most clearly in FIGS. 1, 3, and 7–9, and as described in detail in the above-referenced Burroughs et al. patent (see columns 13–15), the tool storage magazine 30 is mounted on the top of a platform 80 which is supported by a vertical extension 81 of a machine pedestal 82. The platform 80 is located above and is spaced from the horizontal plane of the Z' ways 26 and 27 so that the tool transfer Z' slide 32 may be moved beneath the platform 80 and magazine 30 to the magazine tool interchange station. As the Z' tool transfer slide 32 is moved beneath the magazine the tool gripper 34 on the top of the X' passes into the magazine 30 through an opening 83 on the bottom and front of a magazine housing 84.

The tools in the magazine 30 are located in individual tool holding modules 87 suspended from an endless chain conveyor 88 which travels in an endless rectangular path about sprockets 89, 90, 91 and 92 mounted on horizontal shafts 94, 95, 96, and 97, respectively. Each of the modules 87 supported by the chain conveyor 88 includes a socket 101 which removably receives a tool adapter 102. Adapter 102 has a cavity 103 in which is secured by clamp screws 104 a tool bit 105. Each module 87 includes a vertically shiftable tool lock pin 109 slideable within an aperture 110 for selectively locking the tool adapters 102 in their respective modules.

The tool locking pins 109 reside in their upper position illustrated in FIG. 8 when the modules 87 are located at the interchange station and are empty. Whenever a tool adapter 102 is inserted into a module 87 located at the magazine interchange station, the pin 109 of that module is lowered into the position shown in FIG. 9 to lock the tool adapter in the module. Thereafter the pin 109 remains in this lowered tool locking position throughout the travel of the module 87 on the conveyor 88 until such time as the module is again stopped at the interchange station. The pin 109 is then raised to the unlocked position so that the tool adapter 102 can be freely removed by the gripper 34.

The mechanism for raising or lowering the pins 109 comprises a fluid motor 111 having a selectively vertically reciprocal piston rod 112 provided with an enlarged head 113. The enlarged head 113 of the piston rod 112 is provided with a horizontal recess 114 engageable with a headed end 115 of each of the pins 109. When the head 115 of a pin 109 is vertically aligned with the recess 114 of the head 113 of piston rod 112, the motor 111 may be actuated so as to move the pin 109 downwardly into locking engagement with the tool module 87 at the interchange station, or the motor 111 may be actuated so as to raise the pin 109 and thereby disengage it from the adapter 102 so that the adapter may be removed from the module.

To control operation of the motor 111 a solenoid S-12 in the motor hydraulic line is provided which when energized functions to cause the motor 111 to move upwardly and disengage the lock pin 109 and adapter 102, and when de-energized causes the motor 111 to move to its lower position and engage the lock and adapter. A limit switch LS-16 responsive to the presence of the lock pin 109 in its lower position is also provided. The limit switch LS-16 is adapted to close when the lock pin 109 moves to its lower position, locking adapter 102 in the module 87.

A positive stop bar 116 shiftable between a conveyor motion arresting position and a conveyor motion permitting position is provided. The positive stop bar 116 is advanced to its magazine motion arresting position when a tool retrieval operation, to be described, locates a desired tool at the tool interchange station. The stop bar 116 when so advanced functions to arrest conveyor motion and approximately locate the desired tool at the interchange station. To control movement of the magazine stop bar 116 a solenoid S-11a in the hydraulic circuit of the bar shifting mechanism is provided which when energized advances the stop bar 116 to the magazine stopping position and when de-energized permits the magazine stop bar to return to its magazine motion non-interferring position. A limit switch LS-30 is mounted on the stop bar 116 and is responsible to the presence of the desired tool abutting the magazine stop bar. The limit switch LS-30 closes when the desired tool is at the magazine interchange station, abutting the magazine stop bar in its stop position.

To accurately locate and lock a module 87 at the magazine tool interchange station which has been roughly or approximately located at the interchange station by the magazine stop bar, a module locating and locking pin 120 is provided. The module locating and locking pin 120 is fixed to the lower end of a piston rod 121 of a fluid motor 122. The module locating and locking pin 120 has a conical lower end 123 adapted, when the module locating pin 120 is driven to its lower position by the motor 122, to engage a tapered recess 124 formed in the upper surface of the module 87. Engagement of the tapered recess 124 and the conical tip 123 of the module locating and locking pin 120 functions to positively locate and lock at the interchange station the module 87 carrying the desired tool.

To control the operation of the motor 122 which selectively reciprocates the locking and locating pin 120 a solenoid S-11 which operates a valve in the hydraulic circuit of the motor is provided. The solenoid S-11 when energized, causes the motor 122 to withdraw the locating and locking pin 120, and when de-energized causes the motor 122 to lower the pin 120 and thereby positively lock and locate a module at the interchange station. A limit switch LS-8 responsive to the presence of the locating and locking pin 120 in its lower position is provided. The limit switch LS-8 is adapted to close when the locking and locating pin 120 is in its lower position locking and locating a module 87 at the interchange station.

A rotary hydraulic motor 127 is provided to drive the conveyor 88 at a high rate of speed until the desired tool approaches the interchange station whereafter the motor drives the conveyor at a low rate of speed. To control energization of the rotary hydraulic motor 127 a solenoid S-9 operating a valve in the motor hydraulic circuit is provided which when energized causes the hydraulic motor to be operative to drive the conveyor. To facilitate control of the selection of the speed at which the hydraulic motor 127 drives the conveyor 88 a solenoid S-10, is provided which also operates a valve in the motor hydraulic circuit. Solenoid S-10, when energized, causes the hydraulic motor 127 to drive the conveyor 88 at a high rate of speed, and when de-energized causes the motor to drive the conveyor at a low rate of speed.

As used herein the term tool refers to a cutting tool such as tool 21 or 22, or the combination of a cutting tool and its associated adapter 102.

TOOL CHANGER OPERATION

Before describing the operation of the tool changer 25 in connection with FIGS. 11-26, reference is made to FIG. 10 which depicts with respect to time the path of travel of the Z' tool transfer slide 32 relative to the turret 20, magazine 30 and its associated limit switches during the course of a tool interchange cycle. FIG. 10 also depicts the movement of the X' tool transfer slide 33 relative to the movement of the Z' tool transfer slide and its associated limit switches during the course of a tool exchange cycle.

The tool changer 25 is usually programmed to interchange the idle tool 22 in the turret 20 with a new tool found in the magazine while the active tool 21 continues its cutting operation on the workpiece 14 and the turret 20 continues moving along both the X and Z axes as is necessary to operatively position the cutting tool 21 relative to the workpiece 14.

As may be best seen in FIG. 11 while the active tool 21 is engaged with the workpiece 14, the idle tool 22 on the opposite side of the turret 20 is available for a tool change.

Referring now to FIGS. 11-26 and FIG. 10 there is illustrated a tool changing sequence. This sequence is begun with the tool transfer carriage 31, as illustrated in FIG. 11, in the standby or park position. In this position of the carriage 31, the Z' axis transfer slide 32 is parked near the rear extent of its movement along the Z' axis and the X' tool transfer cross-slide 33 is located at its outer limit of travel along the X axis. With reference to the upper portion of the FIG. 10 the location of the Z' tool transfer slide 32 is in the standby or park position is indicated by point 1 of the Z' path. The location of the X' tool transfer cross-slide 33 in the lower portion of FIG. 10 is at its outer or standby position and is represented by point 1 of the X' path.

Upon initiation of a transfer cycle, and as depicted in FIG. 12, the tool transfer carriage 31 is first moved toward the turret 20 along the Z' axis shown by arrow 42. Such motion is produced by energizing solenoid S-2 and S-97. Energization of solenoids S-2 and S-97 which drives the Z' slide 32 toward the turret 20 only occurs if previous to such energization the X' slide 33 is in its outer or standby position and has tripped limit switch LS-12 and the Z' slide is in its standby position tripping limit switch LS-14. At the same instant that the Z' slide 32 is moving toward the turret 20 the gripper 34 is released moving the gripper arm 65 and 66 to their outer open position. Release of the gripper 34 is effected by energizing solenoid S-4. With the gripper released and its arms 65 and 66 in their outer open position the gripper is in a position when the Z' slide reaches the turret 20 to grip the idle tool 22 in the inactive turret position.

Travel of the Z' slide 32 toward turret 20 continues. When the Z' slide 32 is a pre-set distance from the Z slide 17 and the turret, the X' cross-slide 33 begins moving toward the turret. At this point both the X' and Z' slides 33 and 32 are moving toward the turret, as is the tool gripper 34, as indicated by the arrow 42 or FIG. 13. Relating the foregoing initiation motion of the X' slide 33 to FIG. 10, the point in the Z' path wherein the Z' slide reaches the pre-determined distance from the Z axis slide 17 and turret 20 and initiates X' slide motion is indicated as point 1a in the Z' and X' paths. At point 1a, the Z slide 32 strikes limit switch LS-1 energizing solenoid 1 which causes the X' slide 33 to move toward turret 20 from its outer or standby position depicted in FIGS. 11 and 12.

When the X' slide 33 advances to a position wherein it is aligned with the idle tool 22 a stylus 43X attached to the X' slide 33 engages an X' reference wing 40 attached to the X axis cross-slide 18. This stops relative movement between the wing 40 and X' cross-slide 33 and causes the tool transfer cross-slide 33 to thereafter move in synchronism along the X' axis with the wing 40 and thus with the X axis cross-slide 18. Limit switch LS-11 is tripped when the X' slide 33 is in its inner position.

After movement of the cross-slide 33 has been synchronized with the movement of turret slide 18, the Z' slide 32 continues to move toward the turret. When the Z' slide 32 arrives at point 1b of the Z' path (FIG. 10) corresponding to a specified distance from the Z axis slide 17 and turret 20, the Z' slide actuates limit switch LS-1a. If the X' slide 33 has not already moved into its tool change position aligning the gripper 34 with the idle tool 22 and tripping limit switch LS-11, the Z' slide 32 stops when it actuates limit switch LS-1a. If the X' slide 33 has properly aligned itself with the idle tool 22 and tripped limit switch LS-11, the Z' slide 32 continues moving towards the turret 20 notwithstanding arrival at point 1b and tripping of limit switch LS-1a.

The Z' slide continues to move toward the turret until a stylus 43 on the slide 32 engages a Z' reference stop or wing 38 attached to the Z axis slide 17 (FIG. 14). Thereafter, the stylus 43 controls all movement of the Z' tool transfer carriage 32 along the Z' axis and maintains the tool transfer carriage 31 synchronized with movement of the turret carriage 17.

At this point the tool grasping arms 65 and 66 of the tool gripper 34 are positioned properly about the idle tool 22 contained in the inactive tool holder 48 of the turret 20 so the arms may be closed to securely clamp the tool 22 in the gripper.

The relative speeds of the X' slide 33 and Z' slide 32 of the tool transfer carriage 31 are such that the stylus 43X of the X' slide always engages the X' reference wing 40 before the stylus 43 of the Z' slide engages a Z' reference wing 38. As a consequence the movement of the X' slide is always synchronized with the movement of the tool turret along the X axis prior to synchronization of the Z' slide along the Z axis. This insures that the last increment of the movement of the Z slide 32 along the Z axis always occurs while there is no relative movement between the tool gripper 34 and tool turret 20 along the X axis. Thus, the gripper 34 is always moved over the tool or a tool contained in the gripper 34 is always moved into the inactive tool holder of the turret at a time when the only relative movement between the tool gripper 34 and the turret 20 is along the Z' axis as shown in FIG. 14.

The point in the Z' path of FIG. 10 in which the Z' slide has reached its left-most point of travel and the gripper 34 engaged the idle tool 22 is designated point 2. At this point limit switch LS-17 is actuated. A time delay of up to 2 seconds is initiated at the end of which the solenoid S-4, which is now energized and holding the gripper arms 65 and 66 in their open tool release position, may be de-energized to cause the arms 65 and 66 to close and grip the inactive tool 22. The end of the 2 second time delay when solenoid S-4 is de-energized and the idle tool 22 gripped by the gripper 34 is depicted as point 2a in the Z' path of FIG. 10.

At point 2a in the Z' path, in addition to de-energizing solenoid S-4 to cause the gripper 34 to clamp the idle tool 22, a second time delay of up to 2 seconds is initiated at the end of which solenoid S-2, which is now energized biasing the Z' slide 32 towards the turret 20, is de-energized. Upon expiration of the 2 second delay initiated at point 2a designated point 3, solenoid S-2 is de-energized, removing power from Z' slide 32 in the direction of the turret 20. Additionally solenoid 96 is energized to apply power to the Z' 32 in a direction to move it towards the magazine 30.

Also, at point 3, solenoid S-3 which controls the standby bar 75, is energized to elevate the bar and permit the Z' slide 32 to move through the standby position to the magazine. Solenoid S-12 which controls the tool lock pin actuating motor 111 is energized to retract the tool lock pin 109 of the empty module 87 at the magazine interchange station and permit the idle tool 22 removed from the inactive turret tool holder 48 to be inserted into the empty module. Solenoid S-8 which controls the air purge means of the turret is also energized to clear chips and other debris, as well as facilitate friction free removal of the idle tool 22, from the inactive tool holder 48.

The Z' slide 32 moves in the Z' direction toward the magazine, the initial movement functioning to remove from inactive turret tool holder 48 the inactive tool 22 gripped by gripper 34 (FIG. 14). The Z' slide 32 continues moving (FIG. 15) along the Z' axis. When it reaches limit switch LS-1a at point 3a (FIG. 10) in the Z' path, this limit switch is tripped. Tripping of limit switch LS-1a by the Z' slide 32, de-energizes solenoid S-1, causing the X' slide 33 to move from its inner tool change position to its outer standby position. At this point both the X' and Z' slides 33 and 32 are moving away from the turret (FIG. 16). When the X' slide 33 reaches its outer standby position, limit switch LS-12 is tripped. Movement of the Z' slide 32 continues until the Z' slide reaches limit switch LS-1, corresponding to point 3b in the Z' path of FIG. 10, at which time the Z' slide 32 trips limit switch LS-1. If the X' slide 33 is not in its outer or standby position as evidenced by it having tripped limit switch LS-12 then the Z' slide 32 terminates movement toward the magazine 30 until such time as the X' slide does reach its outer or standby position and trips limit switch LS-12. Assuming the X' slide has reached its outer or standby position and tripped limit switch LS-12, the Z' slide continues moving toward the magazine notwithstanding tripping of limit switch LS-1a at point 3b.

The Z' slide 32 continues moving toward the magazine and in the course of such movement moves into and through the standby position and into the magazine 30 (FIG. 18 and point 3c of FIG. 10). The limit switch LS-14 is not activated by the Z' slide 32 at point 3c inasmuch as the standby bar 75 upon which the limit switch LS-14 is mounted is in its elevated position and does not interfere with the movement of the Z' slide. Movement of the Z' slide 32 continues causing the Z' slide to move beyond the standby position passing through point 3d in the Z' path. However, no action occurs at point 3d.

It is significant to note that at this point, the X' slide 33 is in the standby position, the tool gripped by the gripper 34 is aligned with an empty module 87 at the interchange station of the magazine 30.

When the Z' slide 32, with its gripper 34 aligned with the empty module 87 of the magazine 30,reaches the magazine limit switch LS-10 is actuated. The tool held by gripper 34 is now located in the empty module 87 at the magazine interchange station, the tool having been inserted during the final stages of movement of the Z' slide toward the magazine. This is represented by FIG. 17 and point 4 of the Z' path depicted in FIG. 10. Actuation of limit switch LS-10 starts a time delay of up to 2 seconds at the end of which solenoid S-12, which controls the motor 111 for advancing the tool lock pin 109 to its locking position, is de-energized to permit the locking pin to advance and lock the tool. At the end of the 2 second interval (point 4a) initiated by the actuation of limit switch LS-10 at point 4, solenoid S-12 is de-energized causing the lock pin 109 of the module 87 in which the inserted tool is located to advance into the module and lock the previously idle tool. Also at point 4a a second time delay of up to two seconds is initiated. At the end of this interval, designated point 4b, solenoid S-4, which is now de-energized causing the gripper arms 65 and 66 to grip the tool located and locked in the module 87 at the magazine interchange station, is energized to open the gripper arms. The tool which is now locked in the module 87 at the interchange station is now released by the gripper. Also at point 4b a third delay of up to 2 seconds is initiated to facilitate opening of gripper arms 65 and 66. At the end of this interval, designated point 5, solenoid S-3, which is now energized and holding standby bar 75 in the upper Z' slide non-interferring position, is de-energized, lowering the standby bar 75 into the path of the Z' slide. When the standby bar 75 is so lowered, limit switch LS-3 is actuated to cause solenoid S-2, which controls movement of the Z' slide toward the turret, to be energized and drive the Z' slide toward the turret.

The Z' slide 32 continues moving toward the turret until it reaches the standby position designated point 6 and shown in FIG. 18, wherein the Z' slide abuts the lowered standby bar 75 and actuates the limit switch LS-14 mounted on the bar. The solenoid S-97 which controls the valve in the main hydraulic line for permitting Z' motion either toward the turret or toward the magazine is de-energized, to hold the Z' slide 32 in the standby position. Solenoid S-11 controlling the module locating and locking detent 120 and solenoid S-11a controlling the module stop bar 116 are energized and de-energized, respectively, permitting the conveyor 88 to move. Actuation of limit switch LS-14 also energizes solenoid S-9 which controls the magazine drive motor 127 to initiate movement of the magazine conveyor 88. Actuation of limit switch LS-14 also energizes solenoid S-10 which places the magazine motor 127 in its high speed condition. At this point the search of the magazine 30 for a tool required in a subsequent machining operation, as determined by the numerical control program, is initiated. When the desired tool is found, in a manner to be described in detail later, a signal is produced indicating that the search is complete and successful. If the desired tool is not found, a second search of the magazine is manually initiated in a manner also to be described. If the tool is not found at the end of the second search an indicator lamp is illuminated to indicate this fact.

Assuming that a search for the desired tool in the magazine has resulted, an electrical signal indicating this fact is produced as noted above. The electrical signal occurs at point 6A in the Z' path depicted in FIG. 10. This electrical signal is effective to de-energize solenoid S-10 which controls the speed at which magazine motor 270 operates. With the solenoid S-10 de-energized, the speed of the magazine motor 127 is changed from high to low. Additionally, solenoid S-11a which controls the magazine stop bar 116 is energized, advancing the magazine stop bar. This stops the magazine when the desired tool is located at the magazine interchange station, and thereby roughly or approximately locates the desired tool at the interchange station. When the magazine abuts the magazine stop bar 116 the limit switch LS-30 mounted on the stop bar 116 is tripped by the module 87 containing the desired tool, providing a signal indicating that the desired tool is approximately or roughly positioned at the magazine interchange station. The point in the Z' path of FIG. 10 corresponding to the tripping of limit switch LS-30 is designated point 6b.

With the module containing a desired tool approximately or roughly located at the magazine interchange station the module locating and locking pin 120 is advanced to engage the module and thereby positively lock and locate the desired tool at the interchange station. Advancement of the module locking pin 120 is effected by de-energizing solenoid S-11. The point in the Z' path of FIG. 10 at which the solenoid S-11 is de-energized to extend the module locating and locking pin 120 is designated as point 6c.

When the module locking and locating pin 120 is fully extended into the module the limit switch LS-8 is actuated. The point at which limit switch LS-8 is actuated is indicated as point 6d on the Z' path of FIG. 10. With the module locating and lock pin 120 fully extended and the limit switch LS-8 actuated the solenoid S-9 which controls energization of the magazine motor 127 is de-energized, thereby terminating energization of the motor. Additionally, solenoid S-97 which controls the application of power to the Z' slide for movement toward the magazine 30 and/or turret 20 is energized. Solenoid S-2 which must be energized to permit movement of the Z' slide 32 toward the turret 20 continues to be energized at point 6d. With solenoids S-97 and S-2 both energized the Z' slide 32 is maintained at the standby position where it is urged toward the turret 20, but prevented from moving in that direction by the standby bar 75 which is in its lowered position.

At point 7 in the Z' path of FIG. 10 solenoid S-2 is de-energized, removing power from the Z' slide 32 tending to move it toward the turret. Additionally, solenoid S-96 which controls movement of the Z' slide 32 toward the magazine is energized to start movement of the Z' slide from the standby position toward the magazine. Movement of the Z' slide, although possible with solenoids S-97, and S-96 both energized, only occurs if limit switches LS-16, LS-30, and LS-8 are closed. Limit switch LS-16 is closed if the tool locking pin 109 in the module 87 at the magazine interchange station is extended to in fact lock the tool adapter in the module. Limit switch LS-30 is closed when the module containing the desired tool abuts the module stop bar 116. Limit switch LS-8 is closed when the module detent 120 is extended to locate and lock the tool module at the magazine interchange station. Assuming limit switches, LS-8, LS-16, and LS-30 are closed, the Z' slide moves toward the magazine.

The Z' slide 32 continues moving toward the magazine. Since the X' slide 33 is in its standby position the gripper 34 is in proper alignment relative to the desired tool at the magazine interchange station. Thus, as the Z' slide approaches the desired tool in the magazine, the gripper 34, which was opened at point 4b when solenoid S-4 was energized, automatically positions its arms 65 and 66 about the adapter of the desired tool located at the tool interchange station. When the Z' slide 32 reaches the magazine (FIG. 19), which occurs at point 8 of the Z' path of FIG. 10, the limit switch LS-10 is tripped. Tripping of the limit switch LS-10 initiates a delay of up to 2 seconds. At the end of this delay, designated point 8a, solenoid S-4, which is now energized and holding the gripper arm 65 and 66 in their outer or release position about the desired tool, becomes de-energized to permit the gripper arms to grip the desired tool. Additionally, solenoid S-3, which controls the standby bar 75, is energized, raising the bar and enabling the Z' slide to move through the standby position.

Closing of the gripper arms 65 and 66 initiates a second time delay of up to 2 seconds. At the end of this delay, designated point 8b, S-12, which is now de-energized holding the tool locking pin 109 in tool locking position, becomes energized, enabling the desired tool to be removed from the module when the Z' slide moves away from the magazine. When the tool locking pin 109 has retracted, designated point 9, limit switch LS-16 is de-actuated. The de-actuation of limit switch LS-16 at point 9 energizes solenoid 2, permitting the Z' slide 32 with its gripper 34 clamping the desired tool to move away from the magazine 30 towards the turret 20. Solenoid S-96 which applies power to the Z' slide to move it towards the magazine is now de-energized.

The Z' slide 32 continues moving towards the turret. When the Z' slide reaches the standby position, indicated as point 9a, the limit switch LS-14 mounted on the standby bar 75 which is in its upper position is not tripped. Hence, no action occurs at point 9a. Likewise, no action occurs at point 9b when the Z' slide leaves the standby position.

The Z' slide continues moving (FIG. 20) and when it reaches a pre-determined distance from the Z slide 17 and the turret 20, designated point 9c, limit switch LS-1 is actuated. With limit switch LS-1 actuated solenoid S-1, which controls movement of X' slide, is energized causing the X' slide to move from its outer or standby position to its inner tool change position. Thus, at this time both the X' and Z' slides are moving simultaneously along their respective axes as indicated by the arrow 42 in FIG. 21.

As was described previously the relative rate of travel of the Z' and X' slides is such that X' slide always stops movement at its inner position prior to synchronization of the Z' slide with the Z axis slide 17 so that the last increment of movement of the tool gripper 34 toward the turret 20 is along the Z' axis. Specifically, as the X' slide moves towards the turret, the stylus 43X of the cross-slide 33 engages the X' reference wing 40 and stops relative movement between the turret cross-slide 18 and the X' slide 33. Thereafter, the X' slide 33 moves along the X' axis in synchronism with movement of the turret cross-slide 18 under the control of the stylus 43X. When the X' cross-slide 33 has synchronized its movement with the X cross-slide 18, the limit switch LS-11 is actuated, reflecting this condition.

The Z' slide 32 continues moving towards the turret. When the Z' slide 32 reaches a second pre-determined distance from the Z slide and turret 20, designated point 9d, limit switch LS-1a is actuated. If the Z' slide 33 has not synchronized its movement with the X slide and tripped limit switch LS-11, the Z' slide movement terminates. If the limit switch LS-11 has been tripped, the Z' slide, when it reaches the pre-determined distance from the Z slide and trips limits switch LS-1a at point 9d, continues moving toward the turret.

When the Z' slide 32 reaches the turret, limit switch LS-17 is tripped to initiate a time delay of up to 2 seconds at the end of which solenoid S-4, which controls the gripper 34, is energized to release the desired tool 23 which was inserted into the inactive turret tool holder 48 as the Z' slide approaches the turret. At point 10a, corresponding to the termination of the 2 second delay, solenoid S-4 is energized and the tool 23 carried by the Z' slide which is now inserted in the inactive holder 48 is released to the turret (FIG. 22).

Upon energization of the solenoid S-4 which controls the gripper, a second delay of up to 2 seconds is initiated. This delay allows time for the gripper 34 to open and release the tool 23 prior to energizing solenoid S-96 and de-energizing solenoid S-2 to drive the Z' slide to the standby position. At point 11, the 2 second delay initiated by the energization of solenoid S-4 terminates. When this delay terminates, solenoid S-3 is de-energized to lower the standby bar 75 to its Z' slide locking position. Additionally, solenoid S-2 is de-energized to remove power from the Z' slide tending to drive it toward the turret. When the standby bar 75 has reached its lower position limit switch LS-3 is actuated. Actuation of limit switch LS-3 causes solenoid S-96 to become de-energized and drive the Z' slide towards the standby position.

The Z' slide moves toward the standby position, leaving the tool 23 in the turret holder 48. When the Z' slide reaches a pre-determined distance from the Z slide, designated point 11a, limit switch LS-1a is actuated to energize solenoid S-1 which controls movement of X' slide. With solenoid S-1 energized, the X' slide starts movement from its inner position to the standby or outer position. At this point the X' and Z' slides are both moving as shown by FIG. 23. When the X' slide reaches its outer position limit switch LS-12 is actuated.

The Z' slide continues moving toward the standby position (FIG. 24), until it reaches a pre-determined distance from the Z slide and turret 20, whereupon limit switch LS-1 is actuated. This point is designated point 11b. If the X' slide has not already reached its standby position and actuated limit switch 12, the Z' slide when it actuates LS-1 stops until such time as the X' slide reaches the standby position and trips the limit switch LS-12. Assuming the X' slide has already reached its standby position and actuated limit switch LS-12, the Z' slide when it actuates limit switch LS-1 continues moving beyond the point designated 11b to the standby position.

The Z' slide reaches the standby position and it abuts the standby bar 75 which is in its lower position, causing limit switch LS-14 mounted on the standby bar to be actuated. This is designated point 12. Actuation of limit switch LS-14, along with actuation of limit switch LS-12 indicating that the X' slide is in its standby position, causes the tool interchange cycle to terminate. Thus, power is removed from the Z' slide by de-energizing solenoids S-96 and S-97, and the tool transfer carriage 31 remains in the standby position.

When the tool transfer carriage 31 has reached the standby position the turret 20 is free to rotate or index to present the new tool 23 to the workpiece 14 in response to a suitable command from the numerical control program. Indexing of the turret is accomplished by energizing solenoid S-5 which unclamps the turret permitting it to index, and energizing solenoid S-6 or S-7 as the case may be, which initiates rotation of the turret through 180° (FIG. 25) to position the new tool 23 in the active or cutting position and return the previously used cutting tool 21 to the inactive tool position. When the turret has fully indexed (FIG. 26) limit switch LS-6 or LS-7 as the case may be, is tripped to indicate the completion of the indexing operation. Tripping of this limit switch energizes solenoid S-19 to clamp the cutting tool in the active tool holder of the turret. When the active tool 23 is clamped, the tool clamping and indexing operation is complete. Solenoid S-5 is now de-energized to clamp the turret 20 in the new position shown in FIG. 26.

TOOL RETRIEVAL AND INTERCHANGE CONTROL CIRCUIT

A preferred embodiment of a tool retrieval and interchange control circuit is depicted in FIGS. 27A–27D in schematic circuit diagram format. The control circuit includes a static electronic memory bank 400 having a plurality of discrete storage locations, or memory elements, 400-1, 400-2, . . . 400-N. The number of discrete memory elements 400-1, 400-2, . . . 400-N corresponds to the number of tool holders or tool holding modules 87-1, 87-2, . . . 87-N in the magazine 30. Hence, if the tool magazine 30 is capable of storing 16 tools, as is the case in a preferred form thereof, the memory bank 400 has 16 discrete memory elements, memory element 400-N being in this case memory element 400-16. Each of the memory elements 400-1, 400-2, . . . 400-N is assigned or allocated, for the purpose of any given sequence of machining operations on the workpiece 14, to a different one of the tool holders 87 of the magazine 30. Each memory element 400-1, 400-2, . . . 400-N is capable of storing, preferably in binary-coded-decimal format, an arbitrary tool identifier assigned to the tool which at any given instant is stored in the magazine tool holder to which is allocated the given memory location 400-1, 400-2, . . . 400-N. Tool identifiers are arbitrarily assigned to the tools used in a machining operation sequence and stored in the magazine 30 by the programmer who prepares the numerical control program for the particular machining operation sequence. The tool identifier may be numeric, alphabetic, alphanumeric or the like. If, as preferred, arbitrary numbers between 1 and 398 are given to tools stored in the tool magazine 30, and if the identifying numbers of the tools stored in the tool holders 87 of the magazine are to be stored in binary-coded-decimal format in the memory elements 400-1, 400-2, . . . 400-N assigned to such magazine tool holders, each memory element is susceptive of storing 10 binary bits.

Summarizing, the tool identifier memory bank 400 contains as many discrete tool identifying memory elements 400-1, 400-2, . . . 400-N as there are separate tool holders 87 in the tool magazine 30. Additionally, for any given assortment of tools in the tool storage magazine 30 for a given machining sequence, the arbitrary tool identifiers assigned to those tools for numerical control programming purposes are stored in the respective memory elements 400-1, 400-2, . . . 400-N which are allocated to the tool holders of the magazine in which the respective tools at the instant are stored. It is significant that neither the tools themselves nor the tool holders of the magazine have recorded thereon sensible indicia of any type relating to the tool identifiers arbitrarily assigned to the tools for numerical control programming purposes. Nor do the tools or magazine tool holders have recorded thereon any other sensible indicia relating to or in any manner constituting an address of a particular magazine tool holder tending to distinguish that magazine tool holder from any other magazine tool holder.

The tool identifier memory bank 400 includes a magazine load circuit 410 which facilitates, when tools are manually loaded into various ones of the tool holders of the magazine, entry into the memory elements 400-1, 400-2, . . . 400-N allocated to those tool holders so loaded the arbitrary tool identifiers assigned to the manually loaded tools. The magazine load circuit 410 preferably includes suitable decimal digital entry means, such as thumbwheels 411, 412 and 413, which can be selectively rotated to set up in decimal format the arbitrary tool identifying numbers assigned to the tools as the tools are manually loaded into empty tool holders of the magazine. In the preferred embodiment wherein the arbitrary tool identifying numbers are between 1 and 398 are possible, and wherein the identifying numbers are stored in the memory bank 400 in binary-coded-decimal format, thumbwheel 411 represents the units wheel and is capable of assuming one of 10 different positions. For any given position of the units wheel 411 a different combination of signals are provided on output lines 411-1, 411-2, 411-4 and 411-8, the particular combination depending upon the binary equivalent of the value of the units digit set into the unit wheel 411. If the units wheel 411 is set to the number 1, an output is provided on line 411-1 representing the binary equivalent of the decimal digit 1. If the units wheel 411 is set to the number 7, outputs are provided on lines 411-1, 411-2, and 411-4 collectively representing the binary equivalent of of decimal digit 7. Outputs are provided on the tens output lines 412-10, 412-20, 412-40, and 412-80 in accordance with the particular decimal digit set into the tens wheel 412. Likewise, outputs are provided on lines 413-100, 413-200, in accordance with the particular decimal digit set into the hundreds wheel 410.

The outputs 411-1, 411-2, ... 413-200 of the magazine load circuit 410 are input to the memory bank 400 via NOR gates 414–423. The outputs from the magazine load circuit 410 input to the memory bank 400 via the NOR gates 414–423 are only present when a gating signal on line 425 is present. Such a gating signal is produced by closing an Enter Data Magazine switch 426 and placing a Load Selector switch 427 in the "magazine" position, in a manner to be described later. Accordingly, absent a gating signal on line 425, no outputs are provided via NOR gates 414–423 to the memory bank 400 from the magazine load circuit 410.

The memory bank 400 is also provided with a plurality of output lines 434–443 which provide on lines 434A–443A, under certain conditions to be described, the binary-coded-decimal contents of the memory element 400-1, 400-2, ... 400-N assigned to the particular magazine tool holder located at that instant at the tool interchange station. The signals on memory bank output lines 434A–437A, when present, collectively represent the units digit, in binary format, of the arbitrary tool identifier assigned to the tool in the magazine interchange station. Similarly, the signals on memory bank output lines 438A–441A, when present, collectively represent, in binary format, the tens digit of the arbitrary identifier of the tool located at the magazine interchange station. The signals on memory bank output lines 442A and 443A, when present, collectively represent, in binary format, the hundreds digit of the arbitrary tool identifier of the tool stored at that instant in the magazine tool holder located at the interchange station. The signals on 434A–443A, therefore, collectively represent in binary-coded-decimal format, the entire arbitrary identifier of the tool stored at any given time in the tool holder at the magazine interchange station.

A visual decimal digital display 450 responsive to the signals on lines 434A–443A output from the memory bank 400 is provided. The decimal digital display 450 includes three windows 451, 452 and 453 which display, respectively, the units, tens and hundreds digit of the arbitrary identifier of the tool stored at any given instant in the tool holder at the magazine interchange station.

A memory element accessing circuit 460 is provided to selectively access the memory elements 400-1, 400-2, ... 400-N as the magazine tool holders to which the memory elements are respectively assigned pass through the interchange station of the tool storage magazine. By "accessing a memory element" as used herein is meant to select one of the memory elements 400-1, 400-2, ... 400-N for read-out, storage, clear or erase, and/or display purposes. The access circuit 460 includes N output lines $A_1, A_2, \ldots A_N$ respectively, connected to the N memory elements 400-1, 400-2, ... 400-N assigned to the N tool holders 87-1, 87-2, ... 87-N of the tool storage magazine 30. When a particular tool holder 87 of the magazine 30 is located at the interchange station, a signal is present on the output line $A_1, A_2, \ldots A_N$ of the access circuit 460 associated with the particular memory element assigned to that particular tool holder. For example, if memory element 400-1 is assigned to magazine tool holder 87-1, a signal is present on line $A_1$ output from the access circuit 460 when tool holder 87-1 is present at the magazine interchange station. Similarly, if memory element 400-2 is assigned to magazine tool holder 87-2 of the storage magazine 30, an output signal is present on line $A_2$ when that particular tool holder is located at the magazine interchange station.

To enable different successive ones of the memory elements 400-1, 400-2, ... 400-N to be selectively accessed by the access circuit 460 as the tool holders to which they are respectively assigned successively pass through the magazine interchange station as the tool conveyor 88 moves, an access circuit stepping and synchronizing circuit 462 is provided. The access circuit stepping and synchronizing circuit 462, preferably is in the form of a normally open switch 462A which momentarily closes each time a different tool holder 87 enters the magazine interchange station and a Synchronized switch 462B which closes once per revolution of the magazine. The access circuit stepping switch 462A provides successive signals to the access circuit 460 on line 463 as successive ones of the tool holders 87-1, 87-2, ... 87-N sequentially pass through the magazine interchange station. The synchronizing switch 462B provides on line 464 to the access circuit 460 a signal once per magazine revolution which resets the access circuit, causing an access signal to be output on line $A_1$ to memory element 400-1 allocated to the tool holder at the magazine interchange station when the switch 462B is closed. A synchronization lamp 462C is also illuminated at this time.

Summarizing, the access circuit 460, in combination with the access circuit stepping and synchronizing circuit 462, assures that an output signal on one of the access circuit output lines $A_1, A_2, \ldots A_N$, is input to the memory element 400-1, 400-2, ... 400-N assigned to the tool holder 87-1, 87-2, ... 87-N located at that instant at the magazine interchange station. In this manner, when a tool is manually inserted into an empty tool holder 87-1, 87-2, ... 87-N located at the magazine interchange station and the arbitrary identifier assigned to that tool is set into the magazine load circuit 410, the identifier set into the magazine load circuit is stored in the particular memory location 400-1, 400-2, ... 400-N assigned to the magazine tool holder then located at the magazine interchange station and into which the tool has been manually loaded. Additionally, the access circuit stepping and synchronizing circuits 462 and the access circuit 460 insure that, when a tool held in a tool holder 87-1, 87-2, ... 87-N of the magazine 30 is located at the magazine interchange station, its arbitrary tool identifier stored in the memory element 400-1, 400-2, . . . 400-N assigned to that tool holder is susceptive of being input to the magazine tool display 450 on memory bank output lines 434A-443A to visually display in windows 451–453 the identifier of the tool then located at the magazine interchange station. Similarly, the circuits 460 and 462 insure, when tool identifiers are stored in the memory bank as an incident to transferring a tool from the inactive side of the turret to the magazine, that the identifier of that tool is stored in the memory element allocated to the magazine tool holder into which the tool is inserted. Finally, the circuits 460 and 462 insure that, as tool holders are successively presented to the magazine interchange position as an incident to searching for a desired tool, the memory element assigned to those tool holders are successively accessed for comparison of their contents with the identifier of the desired tool, all in a manner to be described.

The control circuit also includes an inactive tool buffer memory 465. The inactive tool buffer 465 is adapted to store, in binary-coded-decimal format, the arbitrary tool identifier of the tool which at any given time is located in the tool holder 48 of the inactive turret station. Accordingly, the inactive tool buffer 465 is, in the preferred embodiment disclosed, capable of storing 10 binary bits corresponding to the binary-coded-decimal identifying numbers 1 to 398 which can arbitrarily be assigned to tools in the magazine for numerical control machining sequence purposes. To facilitate storage of 10 binary bits in the inactive tool buffer 465, 10 storage devices are provided, each responsive to a different input line 465-1, 465-2, 465-4, 465-8, 465-10, 465-20, 465-40, 465-80, 465-100, and 465-200.

To facilitate entry into the inactive tool buffer 465 of the arbitrary identifier of the tool manually loaded into the inactive tool holder 48 of the turret 20 a turret load circuit 470 is provided. The turret load circuit 470 is identical in construction to the magazine load circuit 410 and, accordingly, includes a units wheel 471, a tens wheel 472 and a hundreds wheel 473. The arbitrary number of a tool manually loaded into the inactive tool holder 48 of the turret 20 can be set up in the turret load circuit 470 by manipulating the wheels 471, 472, and 473. Output from the turret load circuit 470 are 10 output lines, 471-1, 471-2, 471-4, 471-8, 471-10, 471-20, 471-40, 471-80, 471-100, and 471-200. These output lines collectively represent the three-digit decimal tool identifying number set into wheels 471-473 in binary-coded-decimal format, the first four output lines representing in binary form the units digit of the three-digit tool identifier, the second four output lines representing in binary form the tens digit of the three-digit tool identifier, and the last two output lines representing in binary form the hundreds digit of the three-digit tool identifier.

The output lines 471-1, 471-2, . . . 471-200 of the turret load circuit 470 are connected via NOR gates 484, 493 to the input lines 465-1, 465-2, . . . 465-200 of the inactive tool buffer 465. Outputs on lines 471-1, 471-2, . . . 471-200 which collectively represent in binary-coded-decimal format the three-digit decimal number set up in the digit wheels 471, 472 and 473 are only available for input via NOR gates 484–493 to the inactive tool buffer 465 when a gating signal is present on line 494. Such a signal is present when the load switch 427 is in a Load Turret position and an Enter Data Turret switch 494A is closed. Thus, unless the gating signal is input to the turret load circuit 470 on line 494, an arbitrary identifier set up in the turret load circuit 470 assigned to a tool manually inserted into the inactive turret tool holder 48 is not available for entry in binary-coded-decimal form to the inactive tool buffer 465. Inputs to the inactive turret buffer 465 on lines 471-1, 471-2, . . . 471-200, when available are only stored after processing by NOR gates 484–493 if a signal is also present on line 465A to the store terminal of the buffer from the line 494 which is responsive to closure of the Enter Data Turret switch 494A when the Load Selector switch 427 is in the load turret position.

The input lines 465-1, 465-2, . . . 465-200 of the inactive tool buffer 465 are also connected via inverters 474–483 to the outputs of the memory bank 400 present on lines 434–443. By connecting the input lines 465-1, 465-2, . . . 465-200 of the inactive tool buffer 465 in this manner the arbitrary identifier of a tool stored in the magazine tool holder located at the magazine interchange station may be transferred from the memory element 400-1, 400-2, . . . 400-N assigned to that tool holder to the inactive tool buffer when the tool changer carriage 31 transfers a tool located in the tool holder at the magazine interchange station to the inactive tool holder 48 of the turret in the course of an automatic tool changing cycle. To facilitate such transfer of the arbitrary tool identifier of the memory 400 to the inactive tool buffer 465 in response to a transfer of a tool from the magazine to the inactive tool holder of the turret, a read signal, generated coincident with the tool transfer in a manner to be described later, is input to the read terminal of the memory bank 400 on line 711 to render available on lines 400-1, 400-2, . . . 400-200 the contents of the accessed memory element. Additionally, a store signal is input on line 465B to the inactive buffer 465 to effect storage in the buffer 465 the date available on lines 465-1, 465-2, . . . 465-N from the memory bank output lines 400-1, 400-2, . . . 400-200.

An active tool buffer memory 540 identical in construction to the inactive tool buffer memory 465 is provided. The active tool buffer 540 is adapted to store the arbitrary identifier of the tool located in the active tool holder 48 of the turret. To facilitate such storage in the preferred binary-coded-decimal format 10 storage devices are provided in the active tool buffer. Each of the storage devices is responsive to a different one of the input lines 540-1, 540-2, 540-4, 540-8, 540-10, 540-20, 540-40, 540-80, 540-100, and 540-200. These input lines to the various storage devices of the active tool buffer 540 are in turn responsive to the output lines 466-1, 466-2, 466-4, 466-8, 466-10, 466-20, 466-40, 466-80, 466-100, and 466-200 of the storage devices of the inactive tool buffer, respectively.

The arbitrary tool identifier stored in the inactive tool buffer 465 corresponding to the identity of the tool in the inactive tool holder 48 of the turret 20 is transferred to the active tool buffer 540 when the turret 20 indexes 180°. To facilitate such transfer of the contents of the inactive tool buffer 465 to the active tool buffer 540 when the turret indexes, a turret buffer shift signal from line 730-11 is provided on input line 540A to a buffer store terminal. The turret buffer shift signal is produced, in a manner to be described, when the turret completes a 180° indexing operation and the inactive tool is placed in the active tool holder of the turret.

To facilitate transfer of the contents of the active tool buffer 540 representing the arbitrary identifier of the tool in the active tool holder of the turret to the inactive tool buffer 465 when the turret rotates 180°, the output lines 541-1, 541-2, 541-4, 541-8, 541-10, 541-20, 541-40, 541-80, 541-100, and 541-200 of the active tool buffer 540 are connected via NAND gates 574–583 to input lines 514–523 of NOR gates 484–493. When the turret has shifted 180°, the turret buffer shift signal on line 730-11 is input to the gating lines 594–603 of the NAND gates 574–583, and to a store terminal 465C of buffer 465, storing the contents of the active tool buffer 540 in the inactive tool buffer 465.

Thus, whenever the turret 20 rotates 180° a turret buffer shift signal on line 730-1 is input on NAND gate lines 594–603 and on store lines 465C and 540A which functions to interchange the contents of the inactive and active tool buffers 465 and 540, that is, transfer the tool identifier stored in the active tool buffer 540 to the inactive tool buffer 465 and transfer the tool identifier stored in the inactive tool buffer to the active tool buffer.

The outputs of the active tool buffer 540 on lines 541-1, 541-2, ... 541-200 are also input to a visual decimal digital display unit 604. The display unit 604 is identical to the display unit 450 and includes three windows 605, 606 and 607 which visually indicate the units, tens and hundreds digit of the arbitrary tool identifier stored in the active tool buffer 540, thereby providing a visual display of the arbitrary identifier of the tool stored in the active side tool holder 48 of the turret 20.

The output lines 466-1, 466-2, ... 466-200 of the inactive tool buffer 465, in addition to being input to the active tool buffer 540 for transferring the contents of the inactive tool buffer to the active tool buffer when the turret rotates 180°, are also input to the memory 400. This facilitates transfer of the contents of the inactive tool buffer 465 to the memory 400 when a tool is transferred from the inactive tool holder 48 of the turret 20 to the magazine 30. Specifically, the output lines 466-1, 466-2, ... 466-200 are connected via NAND gates 614–623 to the NOR gates 414–423 whose outputs are in turn input to the memory 400. When gating signals, generated in a manner to be described, are input on lines 624–633 of NAND gates 614–623 in response to the transfer of a tool from the inactive tool holder 48 of the turret to the magazine 30, in a manner to be described, the contents of the inactive tool buffer 465 present on lines 466-1, 466-2, ... 466-200 are gated via NAND gate 614–623 to NOR gate 414– 423 and thence to the memory bank 400. The particular one of the memory elements 400-1, 400-2, ... 400-N of the memory bank 400 to which the contents of the inactive tool buffer 465 are transferred and stored as a consequence of transferring a tool from the inactive tool holder 48 of the turret 20 to the magazine 30 depends upon the particular tool holder 87-1, 87-2, ... 87-N of the magazine located at the magazine interchange station to which the tool is transferred, the memory element being that memory element assigned to the tool holder at the interchange station in which the tool transferred from the inactive side of the turret is inserted.

The control circuit further includes a desired tool buffer 640. The desired tool buffer 640 temporarily stores the identifier of a tool which is desired for use in the next phase of the numerically controlled programmed machining operation as determined by the output of a suitable numerical control program data reader 639. The desired tool buffer 640 includes an input line 641 connected to the reader 639 which may be a conventional punched paper tape reader used for reading machining operation sequences programmed on the tape. Assuming the desired tool identifier to be temporarily stored in the desired tool buffer 640 is a three digit decimal number between 1 and 398 and is to be stored in binary-coded-decimal format, the buffer 640 is capable of storing ten binary bits and accordingly contains ten individual storage elements. The 10 storage elements of the desired tool buffer 640 have individual output lines 640-1, 640-2, 640-4, 640-8, 640-10, 640-20, 640-40, 640-80, 640-100, and 640-200. The first four output lines collectively represent in binary code form the units digit of the desired tool identifier. The last two outputs of the desired tool buffer 640 collectively represent in binary the hundreds digit of the desired tool identifier. Collectively, all of the outputs of the desired tool buffer 640 represent in binary-coded-decimal format the three-digit decimal number of the desired tool.

To facilitate determining if a desired tool whose arbitrary identifying number is stored in the buffer 640 is presently in the inactive turret tool holder 48, the active turret tool holder 47, or the magazine 30, a comparator circuit 645 is provided. The comparator circuit 645 is responsive to the output lines 640-1, 640-2, ... 640-200 of the desired tool buffer 640, as well as to input lines 645-1, 645-2, ... 645-200 which alternatively are connected to the output of the memory bank 400, the inactive tool buffer 465, or the active tool buffer 540. If, as the outputs of the memory bank 400, active tool buffer 540, and inactive tool buffer 465 which represent the arbitrary tool identifiers of tools stored in the magazine 30, inactive turret tool holder 48 and active turret tool holder 47 are alternatively connected to the input lines 645-1, 645-2, ... 645-200 of the comparator 645, should a comparison result between the tool identifier contained in any one of the memory, inactive or active tool buffers and the desired tool buffer, an equal signal is provided on line 646 constituting the output of the comparator 645. An output signal on line 646 of the comparator 645 indicates that the desired tool whose identifier is stored in the desired tool buffer 640 is located in either the magazine, the inactive tool holder 48 of the turret, or the active tool holder 47 of the turret, depending upon whether the favorable comparison resulted as a consequence of comparing the identifier stored in the desired tool buffer 640 with the identifier stored in the storage element 400-1, 400-2, ... 400-N to which the memory 400 is currently accessed, the inactive tool buffer 465, or the active tool buffer 540.

To assure an orderly and sequential comparison of the contents of the inactive tool buffer 465, the active tool buffer 540, and the currently accessed one of the memory elements 400-1, 400-2, ... 400-N of memory 400 with the contents of the desired tool buffer 640, a preliminary search circuit 650 is provided. The preliminary search circuit 650 functions, when the numerical control program reader 639 provides the identifier of the tool desired for the next phase of the machining operation to the desired tool buffer 640, to first compare the contents of the inactive tool buffer 465 with those of the desired tool buffer to determine whether the desired tool is currently in the inactive tool holder 48 of the turret. If the results of such comparison are negative, the preliminary search circuit 650 functions to next compare the contents of the active tool buffer 540 with those of the desired tool buffer 640 to determine whether the desired tool is currently stored in the active tool holder 47 of the turret. If a search of the active tool buffer 540 indicates that the desired tool whose identifier is stored in the desired tool buffer 640 is not in the active tool holder 47 of the turret, the preliminary search circuit 650 then initiates a magazine search cycle. The magazine search cycle, as described earlier, includes moving the tool change carriage 31 from the standby position to the turret 20 wherein the idle tool 22 then stored in the inactive tool holder 48 of the turret is withdrawn, moving carriage to the magazine wherein the tool withdrawn from the turret is inserted into an empty tool holder located at the magazine interchange station, and returning the tool carriage thereafter to the standby position. The magazine 30 is then indexed, successively presenting the tools stored therein to the magazine interchange station. As the tools stored in the magazine are successively presented to the magazine interchange station, the memory elements 400-1, 400-2, . . . 400-N are successively accessed by the access circuit 460 in response to the actuation of stepping switch 462A. The successive accessing of the memory elements 400-1, 400-2, . . . 400-N of the memory bank 400 as the tool holders to which they are assigned pass through the magazine interchange station causes the tool identifiers stored in these memory elements to be input to the comparator circuit 645 on lines 645-1, 645-2, . . . 645-200 for comparison with the identifier of the desired tool stored in the desired tool buffer 640. When a favorable comparison is produced and an output is provided on line 646, the magazine is stopped and the desired tool now at the magazine interchange station is available for removal by the tool change carriage 31. The tool change carriage 31 then advances from the standby position to the magazine interchange station, withdraws the desired tool, moves the desired tool to the turret where it is inserted in the now empty inactive turret tool holder 48, and again returns to the standby position.

The preliminary search circuit 650 which functions to search for a desired tool first in the inactive tool buffer and thereafter in the active tool buffer, and finally in the memory bank 400, includes an enabling circuit 652, the output lines 653, 654, and 655 of which are connected to NAND gates 656, 657, and 658. The enabling circuit 652 has an input line 659 on which a signal is provided to enable NAND gates 656, 657, and 658 prior to initiating the preliminary search sequence when both a signal is present on line 660 indicating that the tool changer carriage 31 is in the standby position and a signal is present on line 662 indicating that the identifier of the desired tool now stored in the desired tool buffer 640 has been completely read from the numerical control program reader 639. To provide the signal on line 662 a bistable multivibrator or flip-flop 663 is provided. The flip-flop 663 has an input line 664 responsive to the numerical control program reader 639 and on which an input signal is provided to generate the signal on line 662 in response to receiving an end of block signal from the numerical control machine indicating that the block of data containing the identifier of the desired tool has been read. The flip-flop 663 also includes a reset line 665 for resetting the flip-flop and removing the enabling signal on line 662. The enabling circuit 652 is also responsive to one of the output lines 670-7 of an internal clocking counter 670 which is driven by a 100 cycle per second clock oscillator 672.

Assuming a start input to the enabling circuit 652 is present on line 659 indicating that the tool changer carriage 31 is in the proper position and that the desired tool identifier data has been properly read from the numerical control program reader 639, the enabling circuit provides on lines 653 and 654 enabling signals to the NAND gates 656 and 657. These enabling signals in combination with successive signals to input lines 675 and 676 from the internal clock counter 670 on output lines 670-1 and 670-2 provide successive output signals on lines 680 and 681. The output signal on line 680 after inversion by inverter 683 is input on lines 624–633 to NAND gates 614–623 for gating the contents of the inactive tool buffer 465, which represent the identifier of the tool stored in the inactive tool holder 48 of the turret, to the comparator 645 via input lines 645-1, 645-2, . . . 645-200 for comparison with the contents of the desired tool buffer 640 which represent the identifier of the desired tool. If a favorable comparison results, indicating that the desired tool is stored in the inactive tool holder 48 of the turret, an equal signal is provided on line 646 which is input to NAND gates 656, 657, and 658 for disabling these NAND gates. Disablement of NAND gates 656–658 prevents further outputs from the preliminary search circuit 650 on lines 680–682, thereby preventing searching of the active tool buffer 540 and the memory bank 400 to determine whether the desired tool is stored in the active tool holder 47 of the turret or in the magazine 30.

Should the comparison of the contents of the inactive tool buffer 465 with the contents of the desired tool buffer 640, as a consequence of the output signal on line 680, be negative, an output is provided on line 681 coincident with the signal produced on line 670-2 output from the internal clocking counter 670. The signal on line 681 after inversion by the inverter 684 provides a gating signal on lines 594–603 to NAND gates 574–583 causing the contents of the active tool buffer 540 to be gated to the comparator 645 for comparison with the contents of the desired tool buffer 640. If a favorable comparison results between the contents of the active tool buffer 540, which represents the identifier of the tool in the active tool holder 47 of the turret with the contents of the desired tool buffer 640, which represents the identifier of the desired tool, an equal signal is produced on line 646 which disables the NAND gates 656, 657, and 658. With these NAND gates disabled an output is not thereafter provided on line 682 and hence the memory bank 400 is not searched.

If a favorable comparison does not result between the contents of the active tool buffer 540 and the desired tool buffer 640 indicating that the desired tool is not stored in the active tool holder 47 of the turret, a signal is not produced on line 646. Absent a signal on line 646, NAND gate 658 is not disabled and an output is produced on line 682 coincident with the input on line 677 produced by the signal on output line 670-3 from the internal clock counter 670. The signal on line 682, in a manner to be described, initiates movement of the magazine 30 and searching of the memory bank for the desired tool.

As indicated when the desired tool number, as stored in the desired tool buffer 640 is not located in either the inactive or active tool holders 48 or 47 of the turret as a consequence of searching the inactive tool buffer 465 and the active tool buffer 540, it is necessary to search the tool magazine and memory bank 400. Search of the tool magazine and memory bank involves successively indexing the magazine tool holders 87-1, 87-2, . . . 87-N, and hence tools stored therein, through the magazine interchange station, while successively comparing the contents of the memory locations 400-1, 400-2, . . . 400-N assigned to the respective tool holders 87-1, 87-2, . . . 87-N with the contents of the desired tool buffer. When a favorable comparison results, a signal is produced on line 646 indicating that the desired tool has been found and is now located at the magazine interchange station, and that the tool changer carriage 31 can be advanced to the magazine 30, the desired tool removed therefrom, and the magazine carriage driven to the inactive tool holder 48 of the turret for transfer of the desired tool to the turret, and thereafter the tool transfer carriage returned to the standby position. However, before searching the magazine and memory bank and removing the desired tool from the magazine and inserting it in the inactive tool holder 48 of the turret, it is first necessary to remove the idle tool, if any, located in the inactive tool holder 48 of the turret and return it to the magazine where it is inserted in the empty tool holder located at the magazine. Once this has been done and the inactive tool holder 48 of the turret has been emptied of any tool contained therein, the above sequence of magazine and memory index and accessing to locate the new or desired tool can be initiated.

To accomplish the foregoing functions incident to a search of the magazine 30 and memory bank 400 including transferring the tool from the inactive side of the turret to the magazine, searching the magazine 30 for the desired tool, and thereafter transferring the desired tool from the magazine to the inactive side of the turret, and finally returning the tool transfer carriage to the standby position, a tool changer control circuit 690 is provided. The tool changer control circuit 690 has a Start input responsive to the output on line 682 from the preliminary search circuit 650. It will be recalled that an output is present on line 682 from the preliminary search circuit 650 when the desired tool, whose identifier is stored in the desired buffer 640, is not found in either the inactive tool holder 48 or the active tool holder 47 of the turret 20 as a consequence of searching the contents of the inactive and active tool buffers 465 and 540. Thus, a signal on line 682 input to the Start terminal of the tool changer control circuit 690 is only provided when it has been found necessary to search the magazine 30 for the desired tool.

The tool changer control circuit 690 controls the energization state of those solenoids which regulate movement of the Z' slide 32, the X' slide 33, the standby bar 75, and the tool gripper 34. Specifically, the tool changer control 690 provides suitable control signals on lines 690-1, 690-2, 690-3, 690-4, 690-5, 690-6, to solenoids S-97, S-2, S-96, S-1, S-3 and S-4. It will be recalled that solenoid S-97 must be energized as a condition precedent to the application of power to the Z' slide 32 to drive the slide either toward the magazine 30 or toward the turret 20. Solenoid S-2, assuming solenoid S-97 is energized, controls the application of power to the Z' slide 32 to move the Z' slide toward the turret 20. Solenoid S-96, assuming Solenoid S-97 is energized, controls the application of power to the Z' slide 32 to drive the Z' slide toward the magazine 30. Solenoid S-1 controls movement of the X' slide, the solenoid being energized and de-energized to move the X' slide toward and away from the turret, respectively. Solenoid S-3 controls movement of the standby bar 75, elevating the bar when energized. Solenoid S-4 controls operation of the tool gripper 34 mounted on the X' slide 33, opening the gripper arms 65 and 66 when energized.

The tool changer control circuit 690 is also responsive on lines 690-7 through 690-13 and 690-14 through 690-17 to the condition of a plurality of limit switches which reflect the location of the Z' slide 32, the X' slide 33, the standby bar 75, a coolant shield, and the presence of an empty tool holder at the magazine interchange station. Limit switch LS-3 is connected to input line 690-7 and indicates the position, elevated or lowered, of the standby bar 75 which in its lower condition prevents movement of the Z' slide 32 from the standby position and trips the limit switch. Limit switch LS-11 is input to the exchanger control circuit 690 on line 690-8 and is tripped when the X' slide 33 is in the turret tool interchange position and its movement is synchronized with the movement of the X slide. Limit switch LS-12 is connected to input line 690-9 and is tripped when the X' slide 33 is in its outer or standby position wherein the gripper 34 mounted thereon is aligned with the tool holder 87 at the interchange station of the magazine. Limit switch LS-14 is connected to input line 690-10. This limit switch LS-14 is mounted on the standby bar 75 and when the standby bar 75 is in its lower position is capable of being tripped by the Z' slide 32 when the slide is at the standby position to indicate this condition. Limit switch LS-1 is connected to input line 690-11 and is tripped when the Z' slide 32 is a pre-determined distance from the Z slide 17 and turret 20 to initiate movement of the X' slide 33. Limit switch LS-1a is connected to input 690-12 and is tripped when the Z' slide 32 is a second pre-determined distance from the Z slide 17 and turret 20 to prevent further movement of the Z' slide toward the turret if the X' slide 33 has not synchronized its movement with the X slide 18. Limit switch LS-17 is connected to input line 690-13 and is tripped when the Z' slide has arrived at the turret 20. Input line 690-15 is connected to limit switch LS-10 which is tripped when the Z' slide is at the magazine 30. Input line 690-16 is connected to limit switch LS-21 which is tripped when the coolant shield is properly positioned. Input line 690-17 is connected to limit switch LS-23 which is tripped when tool holder 87 is suitably locked and located in position at the magazine interchange station and adapted to have a tool inserted therein. Input line 690-14 is responsive to a magazine circuit 720, to be described, on which a signal appears indicating that the magazine has stopped following a tool retrieval cycle.

The tool changer control circuit 690 also provides a number of control signals for initiating necessary functions of other sections of the control circuit. Specifically, the tool changer control provides on line 660 an input to the preliminary search circuit 650, indicating that the tool changer carriage 31 and turret 20 are properly positioned prior to removal of a tool from inactive tool holder 48 which may become necessary if the desired tool is not located in either the active or inactive turret tool holders 47 and 48. The tool changer control circuit 690 also provides an output on line 690-18, for reasons to be described, indicating that a tool has been transferred from the inactive tool holder of the turret 20 to an empty tool holder in the magazine. This output is input to NAND gates 674–623 on lines 624–633 and to NOR gate 703 associated with a memory control circuit 700. An output line 690-19 is also provided on which a signal is present, for reasons also to be described, when a tool has been transferred from the magazine 30 to the inactive tool holder of the turret. This output is input to line 701 of a memory control circuit 700 and to the store terminal of the inactive buffer on line 465B. Finally, an output line 690-20 is provided, on which a signal is input to the magazine control circuit 720 to be described, when the desired tool is not present in the inactive or active tool holders of the turret, the tool in the inactive tool holder of the turret has been transferred to the magazine and tool changer carriage 31 returned to its standby position. The output line 690-20 is also connected to a line 713 of a memory control circuit, for reasons to be described.

The system control circuit further includes a memory control circuit 700 which facilitates entry into the memory bank 400 of the identifiers of tools when the magazine is either manually loaded or tools are inserted therein by the tool changer carriage 31, as well as facilitates the reading of the identifiers of tools stored in the memory bank as the magazine moves tools stored therein past the interchange station. Memory control circuit 700 also facilitates the transfer of tool identifiers from the memory bank 400 to the inactive tool buffer 465 when a tool is transferred from the magazine 30 to the inactive tool holder 48 of the turret.

Memory control circuit 700 includes an input line 701 connected to the output line 690-19 of the tool changer control circuit 690. An input signal is provided to the memory control circuit 700 on line 701 upon transfer of a tool from the magazine to the inactive tool holder 48 of the turret. The memory control 700 also includes an input line 702 connected to the output of a NOR gate 703 which in turn is responsive to the signal produced on line 690-18 of the tool changer control circuit 690 when a tool is transferred from the inactive side of the turret to the magazine. NOR gate 703 is also responsive to line 704 on which a signal appears when the identifier of a tool manually loaded into the magazine 30 and set-up in the magazine load circuit 410 is to be stored in memory 400, and Enter Data Magazine switch 426 is closed with Load Selector switch 427 in the load turret position.

The memory control circuit 700 further includes output lines 706, 707, and 708. The output line 706 is connected to the input line 425 of the magazine load circuit 410 and provides a gating signal to the magazine load circuit for gating the data set up by thumbwheels 411, 412, and 413 when the Enter Data Magazine switch 426 is depressed to initiate entry into the memory 400 of the identifier of a tool being loaded manually into the magazine. Output line 707 is connected to a clear input terminal of the memory bank 400. An output on line 707, which is produced in response to an input to the memory control circuit on line 701 indicating that a tool has been transferred from the magazine to the inactive tool holder of the turret, is effective to clear the currently accessed memory element assigned to the magazine tool holder from which tool inserted into the inactive tool holder of the turret has been removed.

Output line 708 of the memory control circuit 700 is connected to a store input terminal of the memory bank 400. An output signal is present on line 708 when any one of the inputs on lines 701 or 704 to NOR gate 703 are present which occurs when either a tool is being transferred from the inactive tool holder of the turret to the magazine or a tool is being manually loaded into the magazine. When a signal is present on output line 708 of the memory control circuit 700 the memory bank 400 stores in the particular memory element assigned to the tool holder then located at the magazine interchange station the tool identifier data input to the memory from either the inactive tool buffer 465 or the magazine load circuit 410, depending upon whether the tool being inserted into the magazine is being inserted by the carriage 31 from the inactive side of the turret or is being manually inserted.

The memory control circuit 700 also includes a NOR gate 710, the output on line 711 of which is connected to a read input terminal of the memory bank 400. The NOR gate 710 functions to enable readout of the memory bank 400 and the output of data on lines 434–443 when a signal is present on either line 712, indicating that a tool is being manually loaded into the magazine and its identifiers entered into the memory element allocated to the tool holder in which the tool is inserted from the magazine load circuit 410, or that a signal is present on line 713 from the tool changer control circuit indicating that the system is not in the process of searching the magazine. Thus, the capability of reading out of the memory bank 400 is not possible when the system is either searching the magazine or a tool is being manually loaded into the magazine and its identifiers stored in the memory bank 400 by the magazine load circuit 410.

The system control circuit of this invention also includes the magazine control circuit 720. The magazine control circuit includes a start search input line 720-1, a magazine index input line 720-2, and a magazine stop input line 720-3. A signal on input line 720-1 from the output line 690-20 of the tool changer control circuit 690 is present when a search of the magazine for a desired tool is indicated, the desired tool not having been found in the active or inactive positions of the turret and the tool in the inactive side of the turret as a consequence thereof been inserted into the magazine. The presence of a signal on search start line 720-1 does not necessarily initiate movement of the tool magazine. Movement of the tool magazine requires also certain other inputs from limit switches, to be described. An input is present on line 720-2 each time a manual index button 721 is closed to manually index the magazine, which occurs, for example, when it is desired to manually load tools into the magazine at the start of a machining cycle. Like input line 720-1, the mere presence of a signal on line 720-2 is not by itself sufficient to cause the magazine to be indexed. A signal is present on input line 720-3 when an equal signal is produced on line 646 indicating that a favorable comparison has been produced between the contents of the desired tool buffer 640 and the contents of the memory bank 400 as a result of successful search of the magazine for the desired tool, the identifier of which is provided by the numerical control program reader 639 and stored in the desired tool buffer 640.

The magazine control circuit 720 also includes a number of output lines 720-4 through 720-8 which are connected to various solenoids for controlling the rotation and speed of magazine movement, the tool holder or module locating and locking detent 120, the tool holder or module stopping bar 116, and the tool locking pin 109. Line 720-4 is connected to solenoid S-9 which, when energized, causes the magazine motor 127 to drive the magazine. Line 720-5 is connected to solenoid S-10, which, when energized, causes the magazine motor 127 to drive the magazine at high speed, and when de-energized causes the motor 127 to drive the magazine at a low speed. Line 720-6 is connected to solenoid S-11 which, when energized, withdraws the module locating and locking detent 120. Line 720-7 is connected to solenoid S-11a which, when energized, positions the module stopping bar 116 to stop the module containing the desired tool at the magazine interchange station. Line 720-8 is connected to solenoid S-12 which, when energized, causes the tool locking pin 109 of the module then located at the magazine interchange station to be withdrawn and the desired tool released for removal by the tool changer carriage 31 or a tool inserted into the module.

The magazine control circuit 720 is also responsive to a group of lines 720-9, 720-10, 720-11, and 720-12 which are connected to various limit switches which facilitate proper operation of the magazine. Input line 720-9 is connected to limit switch LS-8 which closes when the module locating and locking detent 120 is in its advanced position, locating and locking the module located at the interchange station properly in position to either permit insertion or removal of a tool therefrom. Line 720-10 in connected to limit switch LS-30 which is closed when the stop bar 116 is advanced to stop the magazine. Line 720-11 is connected to limit switch LS-16 which is closed when the tool lock pin 109 is advanced to lock the tool in the module located at the magazine interchange station. Line 720-12 is connected to limit switch LS-22 which is closed when the door to the magazine is closed.

The magazine control circuit 720 also includes an output line 720-13 connected to the input line 690-14 of the tool changer control circuit 690. An output signal is present on line 720-13 when the magazine has stopped following a successful search for a desired tool which is now located at the magazine interchange station.

The system control circuit further includes a turret control circuit 730 for controlling indexing of the turret and for producing signals reflecting the condition of the turret at any given time. The turret control circuit 730 includes output lines 730-1, 730-2, 730-3, 730-4, and 730-5 which are connected to various solenoids for controlling air purging of the inactive turret tool holder, clamping and indexing of the turret, as well as clamping of the tool in the active tool holder of the turret. Line 730-1 is connected to solenoid S-8 which, when energized, purges the inactive side of the turret when a tool is either inserted or removed. Input line 730-2 is connected to solenoid S-5, which, when energized, unclamps the turret permitting the tool block 45 to be indexed relative to base 46. Lines 730-3 and 730-4, are connected to solenoids S-6 and S-7 which, when energized, index the turret to the left and right, respectively. Line 730-5 is connected to solenoid S-19, which, when energized, clamps the tool in the active side of the turret.

The turret control circuit 730 is also responsive to signals on input lines 730-6 and 730-7 connected to various limit switches. Input line 730-6 is connected to limit switch LS-7 which closes when the turret has completed an indexing operation in one direction. Line 730-7 is connected to limit switch LS-6 which closes when the turret is finished an indexing operation in the other direction. The turret control circuit 730 is also responsive to a signal on an input line 730-9 which occurs when a manual turret index switch 732 is closed as, for example, when indexing of the turret is desired to facilitate manual loading of the inactive turret tool holder. The turret control circuit 730 is responsive to an input on line 730-10. Line 730-10 is connected to the numerical control program reader 639 and provides an input to the turret control circuit 730 when a turret index command is output from the numerical control program reader. An output line 730-11 is provided on which the turret transfer shift signal is output when the turret rotates, for effecting the interchange of the contents of the active and inactive buffers 540 and 465 when the turret rotates.

The detailed system circuit diagram shown in FIGS. 28–34 contain a number of specialized circuits for accomplishing various control functions. Since these control functions form no part of this invention, the circuits therefore are not depicted in the schematic block circuit diagram of FIGS. 27A–27D and are not described in detail herein. Illustrative of such a specialized circuit is an Improper Tool Identifier Circuit 736 (FIG. 32A). This circuit produces an output should the tool identifier of a desired tool, as transmitted from the numerical control program reader 639 on line 641, be erroneous as, for example would occur should the identifier be one for which the system is not adapted to respond.

The detailed system control circuit also included a Desired Tool Not Found Circuit 738 (FIGS. 20A and 30B). This circuit produces a Hold output, and illuminates a hold lamp 739, terminating further action of the tool changer and magazine should the desired tool not be found after a predetermined search interval such as two minutes. Included in the Desired Tool Not Found Circuit 738 is a search re-cycle switch 740 which, when actuated, initiates a re-searching of the tool magazine for a desired tool which failed to be located in a previous search.

The control system includes a Manual Control Circuit 742 (FIG. 29A). This circuit includes a number of manually actuatable push button switches, which, when actuated, initiate operation of various mechanical elements and mechanism in the system. For example, the Manual Control Circuit 742 includes a gripper switch 743 for controlling solenoid S-4. Also included are a locking pin switch 744 for controlling solenoid S-12, a standby bar switch 745 for controlling solenoid S-3, and Z' slide switches 746 for controlling solenoids S-2 and S-96.

A Carriage Position Enabling Circuit 753 (FIG. 28C) is provided for enabling operation of certain elements of the system control circuit only at appropriate times relative to the position of the tool transfer carriage 31, thereby preventing inadvertent operation of certain control circuit elements should spurious signals occur. The Carriage Position Enabling Circuit 753 is responsive to the condition of switches LS-10, LS-14 and LS-17 which are tripped when the tool transfer carriage LS-14 and LS-17 which are tripped when the tool transfer carriage 31 is located at the magazine, in the standby position, and at the turret 20, respectively. The times during which outputs are provided on enabling lines M-1 through M-6 of the Carriage Position Enabling Circuit 753 relative to the position of the X' slide 33 and Z' slide 32 is indicated on the Z' path and X' path plots shown in FIG. 10. Specifically, at the points in the Z' path bearing encircled designation M1, M2, M3, M4, M5 and M6, outputs on line M1, M2, M3, M4, M5 and M6 of the Carriage Position Enabling Circuit 753 respectively, are initiated, the outputs on any one line terminating upon the occurence of an output on the next highest numbered output line.

The control circuit includes a suitable power supply circuit 755 (FIG. 28B). The power supply circuit 755 supplies energization potential for the various control circuit elements.

Also included is a System Start Reset Circuit 757 (FIG. 28B). This circuit is responsive to actuation of the start switch 750 for resetting the various memories of the system at the start of a magazine and/or turret tool loading sequence.

This system also includes a Stop Tape Circuit 759 (FIG. 34) which provides an output on line 760 to the numerical control program reader 639 in response to certain potential error conditions, such as, the attempted reading of a second tool identifier by the reader should a previously read tool identifier still be the subject of a tool search.

OPERATION OF SYSTEM CONTROL CIRCUIT

Manual Loading of Tools into Magazine

To load the magazine 30 with tools required for an automatic machining sequence the ON switch 750 (FIG. 28B) is closed to energize the system control circuit. Energization of the system control circuit is effective to erase the memory bank 400 via system start reset circuit (FIG. 28B) as well as the active, inactive and desired tool buffers 540, 465 and 640. The Manual/Automatic switch 751 (FIG. 28B) is then placed in its manual position. With the Manual/Automatic switch in the manual position the magazine 30 can be indexed in step-by-step fashion by depressing the Manual Index switch 732 notwithstanding that the magazine door is open and the limit switch LS-22 in an open circuit condition. The Manual Index switch 732 is succesively momentarily actuated to successively index the magazine 30 one position at a time until the tool holder 87-1 to which memory location 400-1 is assigned is located at the magazine interchange station. When tool holder 87-1 is so located the synchronized switch 462B is closed. This causes the synchronized indicator lamp 462C to become illuminated, visually advising the operator that memory bank accessing and magazine indexing are synchronized. When the tool holder 87-1 to which memory location 400-1 is assigned is manually indexed to the magazine interchange station and the synchronized switch 462B closed, a signal is also input to the reset terminal of the memory access circuit 460, resetting the access circuit. With the access circuit 460 reset, a signal is provided on output line $A_1$, accessing the memory element 400-1 assigned to the tool holder 87-1 now located at the magazine interchange station.

The various tools required in the machining sequence are now randomly inserted into the magazine one-by-one as the magazine is manually indexed by repeated actuation of the Manual Index switch 732 to sucessively bring different ones of the tool holders 87-1, 87-2, . . . 87-N to the interchange station. As each tool is inserted into an empty tool holder 87-1, 87-2, . . . 87-N at the magazine interchange station, the arbitrary identifier assigned by the programmer for that tool is set up in the magazine load circuit 410 by adjusting the thumbwheels 411-413. The Enter-Magazine switch 426 is then momentarily depressed, the Load switch 427 having been put in the lower or Magazine Load position. Actuation of the Enter-Magazine switch 426 provides an input to the memory control circuit 700 on line 704 which produces an output on lines 706, 425 to the magazine load circuit 410 for gating the tool identifier data set-up therein to the currently accessed memory element 400-1, 400-2, . . . 400-N of the memory bank 400. The input to the memory control circuit 700 in response to actuation of Enter-Magazine switch 426 also produces an output on line 708 to the store input terminal of the memory bank 400 for storing in the then accessed memory element assigned to the tool holder located at the magazine interchange station the identifier data of the tool inserted therein which is gated to the memory from the magazine load circuit 416 via lines 411-1, 411-2, . . . 411-N and NOR gates 414-423. Since the load switch 427 is in the lower magazine load position, a signal is produced on line 712 to NOR gate 710, providing an output on line 711 to the read input terminal of the memory for inhibiting read-out of the memory.

The above process of sucessively manually indexing the magazine 30 by repeatedly actuating switch 721 to successively bring empty tool holders 87-1, 87-2, . . . 87-N into the magazine interchange station, inserting tools into the empty tool holders, setting up in the magazine load circuit 410 the identifiers assigned to the inserted tools, and actuating the enter-magazine switch with the load switch in the enter-magazine position, is repeated until all the tools desired to be stored in the magazine for a given machining sequence have been inserted and their identifiers stored in the memory elements respectively assigned to the tool holders in which the tools are inserted.

Loading Turret

If desired, a tool may be stored in the inactive side of the turret. To accomplish this, a tool is manually inserted in the inactive side of the turret and the arbitrary tool identifier assigned to such tool set-up in the turret load circuit 470 by manipulating switches 471-473. The Load switch 427 is then switched to the lower turret load position and the enter-turret switch 494A momentarily operated to provide an input on line 494 to the turret load circuit 470 and to the stored terminal of the inactive buffer 465 on line 465A. The input to the turret load circuit 470 on line 494 gates the identifier assigned to the tool manually inserted into the inactive side of the turret which is set-up in circuit 470, to the inactive buffer 465 via lines 471-1, 471-2, . . . 471-200, NOR gates 484-493, and input lines 465-1, 465-2, . . . 465-200. The signal on line 465A effects storage in the buffer 465 of this date gated from the turret load circuit 470. The tool now in the inactive side of the turret is placed in the active side of the turret by pressing the manual turret index switch 732. This produces a signal on line 730-9 to the turret control circuit 730, indexing the turret. The tool is now in the active side of the turret. When the turret indexes, a shift signal is output from the turret control circuit on line 730-11 to the NAND gates 543-554 on lines 564-573 gating the contents of the inactive tool buffer 465 to the active tool buffer 540. The shift signal output on line 730-11 is also input to the store terminal of the active buffer 540 on line 540A to effect storage in the active buffer of the identifier of the tool now in the active side of the turret.

AUTOMATIC TOOL RETRIEVAL AND INTERCHANGE OPERATION

To facilitate automatic retrieval and interchange of tools between the magazine and the active and inactive positions, of the turret, as is necessary to accomplish a machining operation on the workpiece 14 involving a multiplicity of different machine tools stored in the magazine, the Manual/Automatic switch 751 (FIG. 28B) is placed in the automatic position. With switch 751 in the automatic position and assuming the numerical control program reader 639 is operative, the programming commands for the retrieval and interchange of tools from the magazine are input to the system control circuit. Specifically, the identifier of the first tool to be used in the machining sequence on the workpiece 14 is input to the desired tool buffer 640 from reader 639 and temporarily stored therein. Following storage in the desired tool buffer 640 of the identifier of the first tool of the machining operation, an end of block signal is received from the numerical control program reader 639 and input to the flip-flop 663 of the preliminary search circuit 650 on line 664 placing this flip-flop in its set state. Assuming the tool changer 31 is in its standby position, a signal is also input to the preliminary search circuit 650 on line 660 from the changer control circuit 690. The coincidence of signals on lines 664 and 660 of the preliminary search circuit 650 produces an output on line 659 to the start input of the enable circuit 652. The output on line 659 to the enable circuit 652, in a manner described previously, causes the contents of the inactive tool buffer 465, which represents the identifier of the tool stored in the inactive side of the turret, to be compared with the contents of the desired tool buffer 640, which represents the identifier of the desired tool read from the numerical control program. If a favorable comparison results an equal signal is output on line 646 from the comparator 645 to the NAND gates 656, 657, and 658, terminating the cycle of the preliminary search circuit 650.

If the desired tool is not located in the inactive side of the turret, as indicated by a negative comparison of the contents of the inactive tool buffer 465 with the contents of the desired tool buffer 640, the sequencing of the preliminary search circuit 650 continues and an output is produced on line 681, causing the contents of the active tool buffer 540, which represent the identifier of the tool stored in the active side of the turret, to be compared with the contents of the desired tool buffer 640. If a favorable comparison results, a signal is produced on line 646 which disables NAND gates 656-658 ending the cycle of the preliminary search circuit 650.

If a favorable comparison does not result from comparing the contents of the active tool buffer 540 and the desired tool buffer 640, the enable circuit 652 provides an output on line 682 to the changer control circuit 690. The output on line 682 to the changer control circuit 690 causes the tool changer carriage 31 to advance from the standby position to the turret, grip the tool in the inactive side of the turret, move to the magazine and insert the gripped tool into an empty tool holder at the magazine, and return the carriage to the standby position, all in a manner described previously. Simultaneously with the transfer of the tool from the inactive side of the turret to the magazine, the contents of the inactive tool buffer 465 which represent the identifier of the tool transferred from the turret to the magazine are transferred to the tool identifier memory element 400-1, 400-2, . . . 400-N assigned to the tool holder located at the magazine interchange station and into which the tool previously located in the inactive side of the turret was inserted. Such transfer is facilitated by the signal on lines 690-19 input to the memory control circuit 700 on line 701 and the NAND gates 614-623 on lines 624-633. The input to the NAND gates 614-623 on lines 624-633 gates the identifier of the tool removed from the inactive side of the turret and inserted into the magazine from the inactive buffer 465 to the memory bank 400 via lines 411-1, 411-2, . . . 411-N. The input to the memory control circuit on line 701 produces an input on line 708 to the memory bank store terminal to effect storage of the identifier of the tool inserted into the magazine now input to the memory bank on lines 411-1, 411-2, . . . 411-N.

With the inactive side of the turret now empty, and the tool change carriage 31 at the standby position, an output is provided on line 690-20 from the tool changer control 690 to the start-search input 720-1 of the magazine control circuit 720. The magazine, in a manner described previously, begins rotating, successively presenting to the magazine interchange station the various tool holders 87-1, 87-2, . . . 87-N. As each tool holder 87-1, 87-2, . . . 87-N is brought into the magazine interchange station, the memory elements 400-1, 400-2, . . . 400-N assigned to that tool holder is accessed by the access circuit 460 and the identifier stored therein compared with the contents of the desired tool buffer 640. The input to the NOR 710 gate at this time on line 713 from tool changer control circuit output line 690-20 provides an output to the read terminal of the memory bank 400, and enables readout from the memory. When a favorable comparison results, an equal signal is produced on line 646 which is input to the magazine control circuit 720-3. The magazine 720 stops, locating the desired tool at the magazine interhcange station.

With the desired tool at the magazine interchange station, the tool changer carriage 31 proceeds from the standby position to the magazine and the gripper 34 grips the desired tool 23. The tool changer carriage 31 now advances through the standby position to the turret 20, inserting the desired tool 23 into the inactive position of the turret whereafter the tool changer carriage returns to the standby position where it remains. Transfer of the desired tool 23 from the magazine to the inactive side of the turret produces an output signal from the tool changer control circuit 690 on line 690-19. The output signal on line 790-19 is input to the store terminal of the inactive buffer 465 to effect storage of the contents of the currently accessed memory element in the inactive buffer 465, as well as is input to the memory control circuit 700 on line 701 producing a signal on line 707 to the memory bank to clear terminal to clear the currently accessed memory element. At this point tool identifier memory element 400-1, 400-2, . . . 400-N assigned to the empty tool holder 87-1, 87-2, . . . 87-N at the magazine interchange station is now erased, indicating the empty status of this tool holder, and the inactive tool buffer 465, which previously was empty, now contains the identifier of the tool inserted into the inactive side of the turret.

Machining of the workpiece with the tool now in the active side of the turret continues until an index turret signal is received from the numerical control program reader 639. When such a signal is received, an input is provided on line 730-10 to the turret control circuit 730. This input to the turret control circuit 730, in a manner described previously, causes the turret to index 180°. The previously retrieved tool 23 is now in the active side of the turret in cooperation with the workpiece 14, and the tool which previously was machining the workpiece is in the inactive side of the turret. When the turret rotation is complete the turret is again clamped. Additionally, the tool in the active side of the turret is clamped in the turret and the tool now in the inactive side of the turret is unclamped, permitting it to be withdrawn should the next machining cycle require a tool other than that located in the inactive side of the turret.

Rotation of the turret is also effective to produce a turret buffer shift signal output on line 730-11 from the turret control circuit 730 to the NAND gates 574-583 on lines 591-603 and to the store terminals of the buffers 465 and 540 on lines 465C and 540A to gate the contents of the active tool buffer to the inactive tool buffer where they are stored and store the contents of the inactive tool buffer available on lines 466-1, 466-2, . . . 466-200 in the active tool buffer. Thus, the contents of the active and inactive tool buffers are interchanged to properly reflect in these buffers the identifiers of the tool now in the active and inactive turret positions.

The next command from the numerical control program reader 639 may be either a command to retrieve a new tool from the magazine or rotate the turret. If the next tool to operate on the workpiece is not already in the inactive side of the turret then the numerical control program reader 639 provides on line 641 to the desired tool buffer the number of a new tool and provide to the preliminary search circuit 650 on line 646 an end of block signal which after a preliminary search of the active and inactive tool buffers, ultimately starts the magazine search operation for the new tool. If, instead, the next machining operation is to be done with the tool now in the inactive side of the turret, the numerical control program reader 639 provides a turret index signal to the turret control circuit 730 on line 730-10. This, in a manner described previously, causes the turret to index 180° interchanging the tools in the active and inactive tool station of the turret as well as the contents of the active and inactive buffers.

A detailed circuit diagram capable of performing the necessary logical functions of the schematic block diagram of FIGS. 27A-27D is disclosed in FIGS. 28-34. The circuit of FIGS. 28-34 has been successfully operated and tested in connection with demonstrating the principles of the invention, and is comprised of conventional logic circuits commercially available and operating in accordance with well known and established principles for carrying out their respective logical functions. The logical and functional counterparts of the various block diagram circuit components depicted in FIG. 27 bear identical reference numerals where they appear in FIGS. 28-34, thereby correlating the circuit components of FIG. 27 depicted in block diagram format and the actual circuit components depicted in FIGS. 28-34.

FIG. 35 contains a detailed circuit diagram of a variable oscillator which is depicted in FIG. 28A, and which forms a part of the oscillator circuit 672. The oscillator of FIG. 35 is a self-starting, free running, astable multivibrator providing variable frequency single and multi-phase square waves over the frequency range of 100 Hz to 5MHz. Vernier control of the oscillator frequency of a ± 15 percent minimum range is provided by a potentiometer. A trigger network to the oscillator allows it to be synchronized from an external square wave or pulse source. The oscillator output is coupled through a gate which supplies the "clock output" from the oscillator circuit 672 at the oscillator frequency.

FIG. 36 is a schematic circuit diagram of a DC set/reset flip-flop with an auxiliary common reset line. Such a flip-flop constitutes one stage of the ten-position desired tool buffer 640 (FIG. 32A). The flip-flop depicted in FIG. 36 is provided with 1 and 0 outputs and independent set ($S_O$) and reset ($R_O$) inputs. Inputs $S_O$ and $R_O$ are enabled with logical 0 (0 volts) input levels. The common reset input is enabled at logic 1 (+3 volts) input level.

FIG. 37A discloses a set of six independent JK flip-flops, each with clock and set/reset gate inputs. Each flip-flop provides normal and complement outputs, and has clock, set gate and reset gate inputs. Two stages (F3 and F6) have dual set gate inputs for use in feedback counting. Each stage has one DC set input and all stages have a common reset input. The flip-flops are general purpose and can be used individually as a clocked storage stage with set/reset control applied to the $G_S/G_R$ inputs. These stages may also be individually set using DC set inputs. Parallel transfer in storage buffer or input/output registers is obtained by applying a gated clock to all stages with data present to $G_S$ inputs and its complement to $G_R$ inputs. Operation and connection of the flip-flops of FIG. 37A in counter, set/reset, and gated clock modes are shown in FIG. 37B.

To clarify the interconnection and operation of the JK flip-flops shown in FIGS. 28-34 each flip-flop is provided with an alpha-numeric designation. Flip-flops having the same alpha-numeric designation are on the same six flip-flop circuit card of the type shown in FIG. 37A. For example, the four JK flip-flops of FIG. 34 designated A-12 constitute four individual JK flip-flops physically mounted on a single circuit card containing six such flip-flops connected for common reset as shown in FIG. 37A. To ascertain which one of the four JK flip-flops designated A-12 of FIG. 34 corresponds to a specific one of the six JK flip-flops on the commercially available six flip-flop circuit board of FIG. 37A, it is only necessary to compare the terminal designations of the JK flip-flop of FIG. 34 in question with those of the six JK flip-flop circuit board of FIG. 37A. Flip-flop A-12 of FIG. 34 having input terminals K and H corresponds to flip-flop F-5 of FIG. 37A; flip-flop A-12 of FIG. 34 having input terminals D, E, and F corresponds to flip-flop F-4 of FIG. 37A; etc.

Figure 33A:
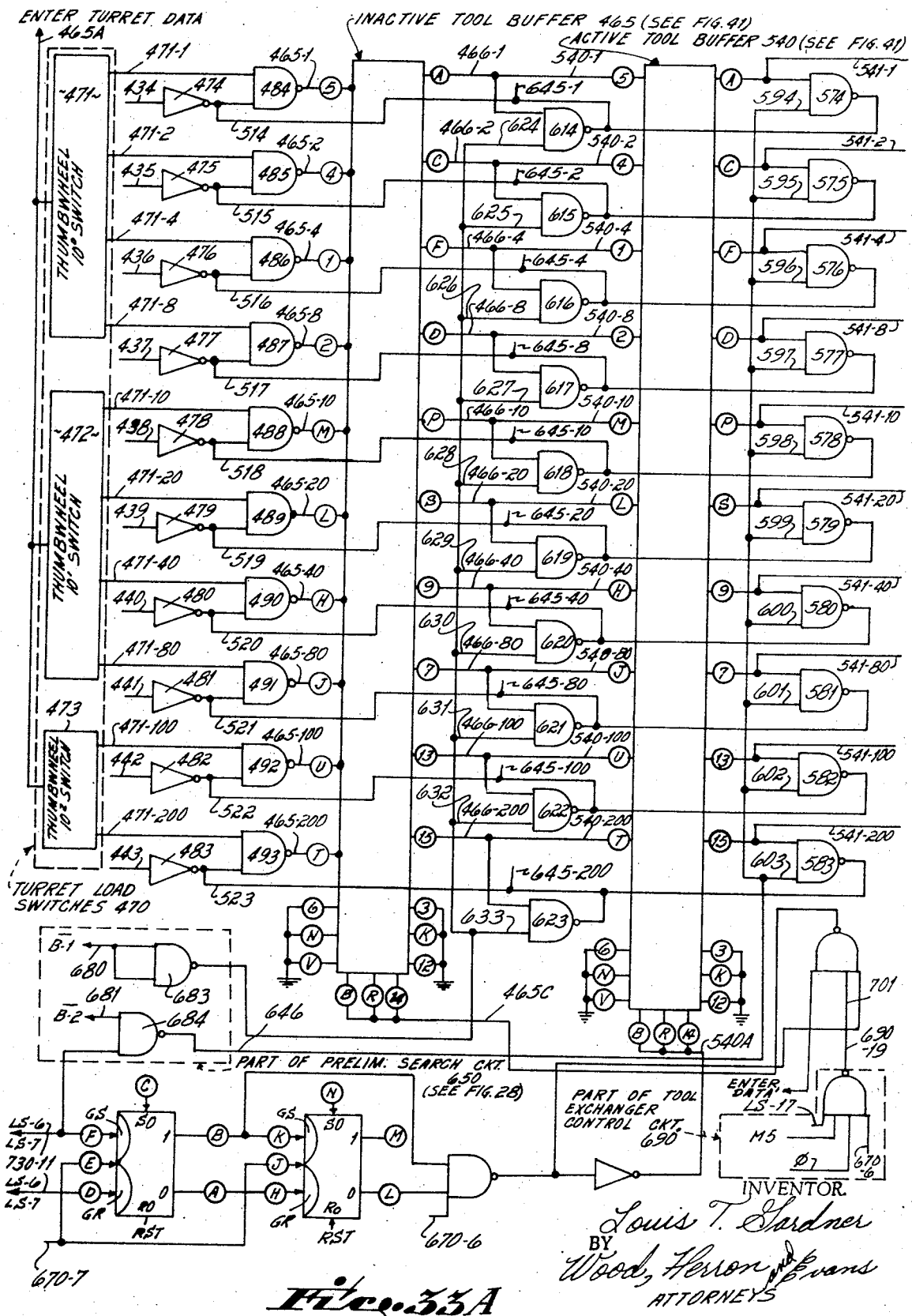
Figure 33B:
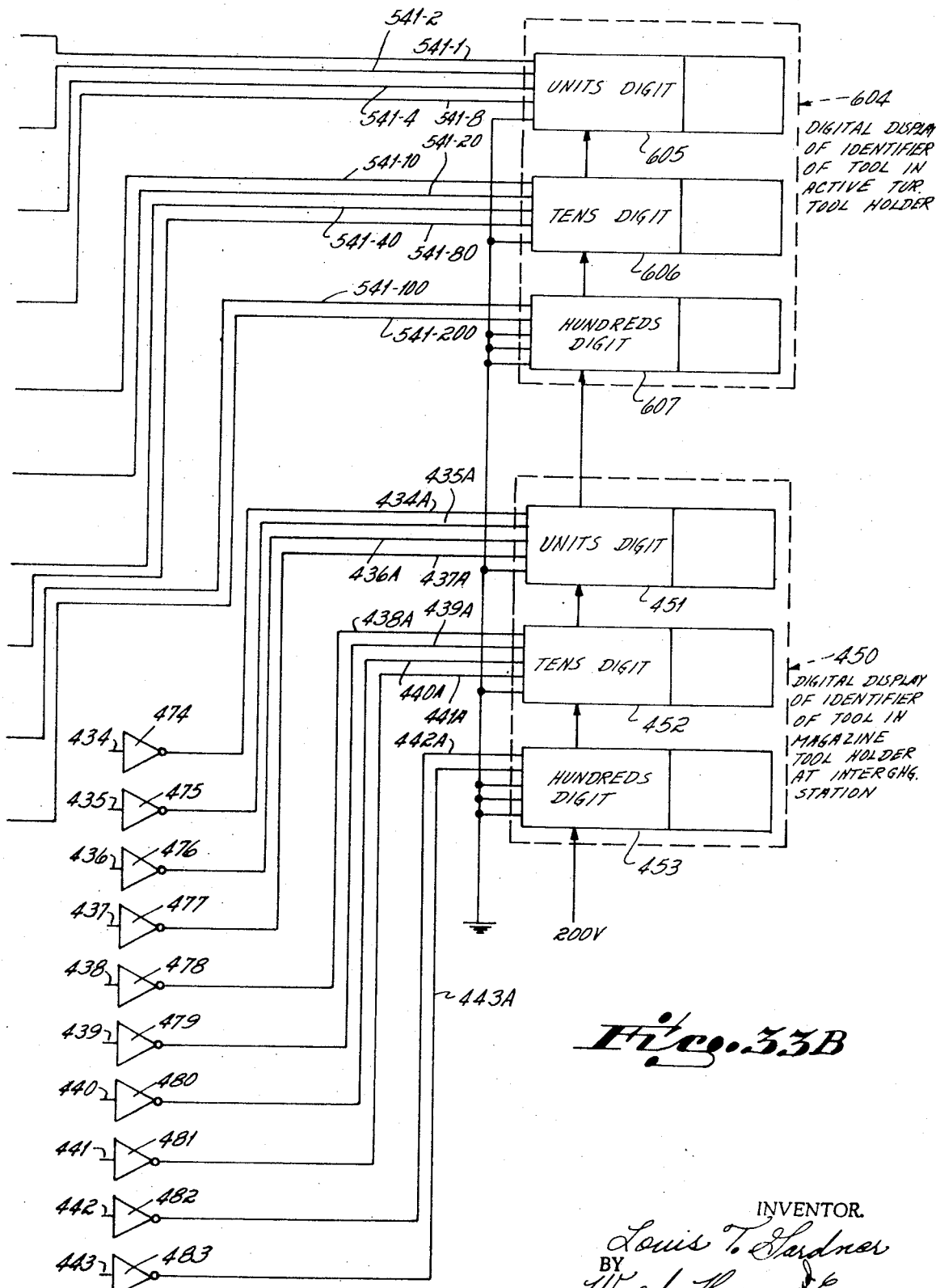
Figure 41:
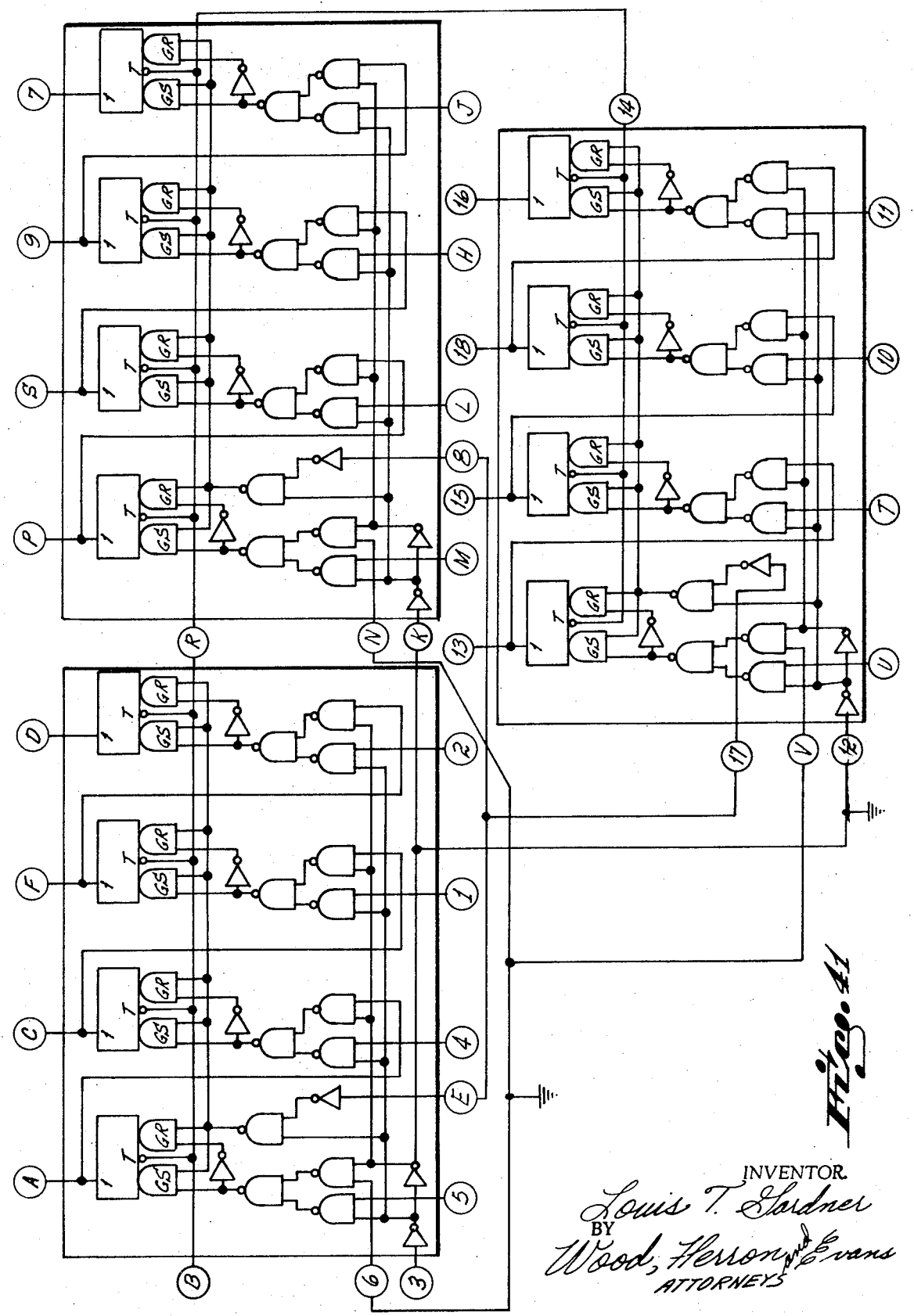

FIG. 41 shows a detailed logic circuit diagram of a 12-stage shift register of the type used for the inactive tool buffer 465 and the active tool buffer 540 (FIG. 33A). The data input lines of the shift register are single ended input data lines which condition their associated register after a negative clock transition. Parallel entry of data is controlled by application of a logical 1 (+3 volts) at the load input and simultaneous application of a logical 0 (0 volts) at the shift input. Data transfer occurs on the trailing (negative) edge of the clock.

Figure 1:
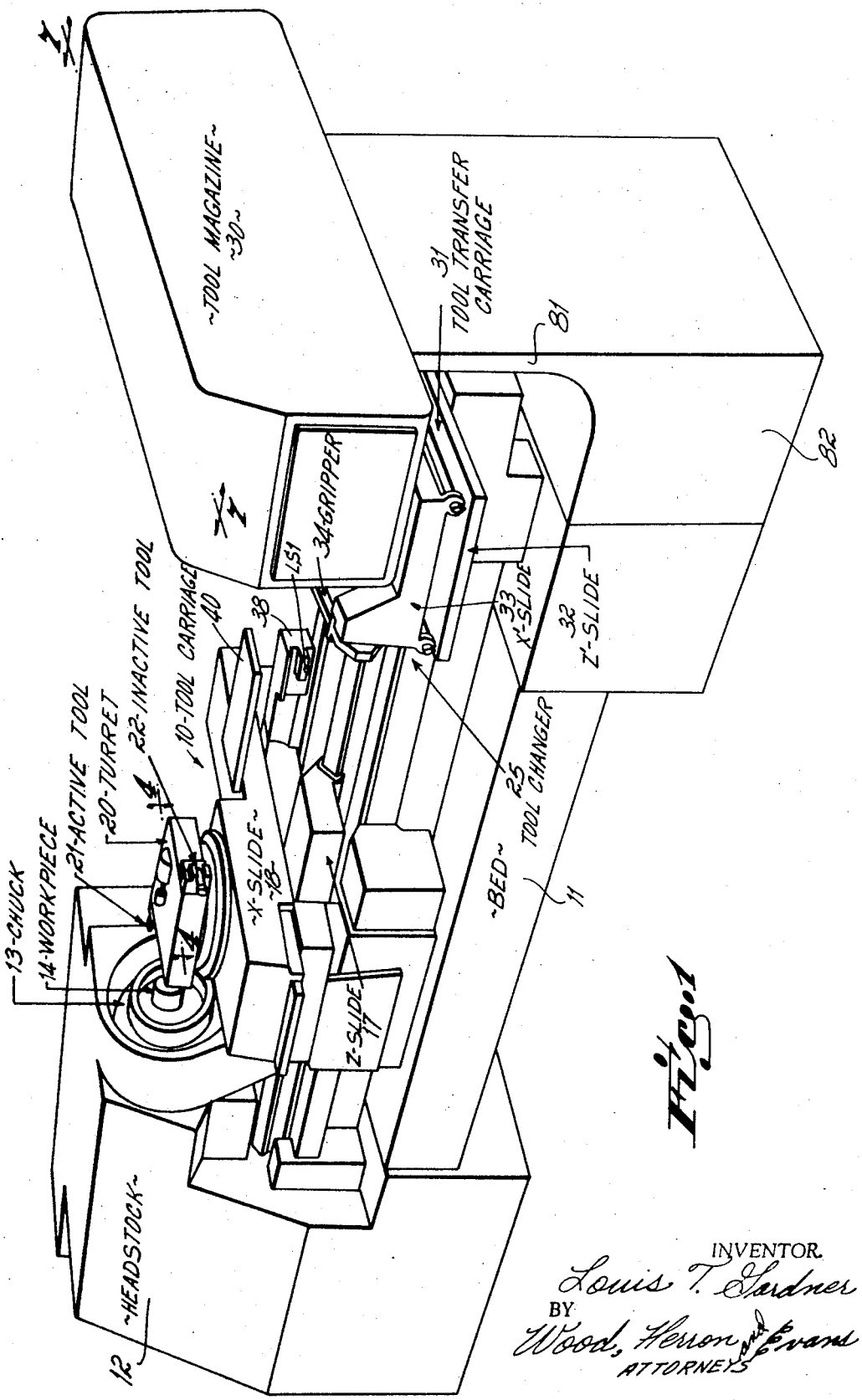
Figure 2:
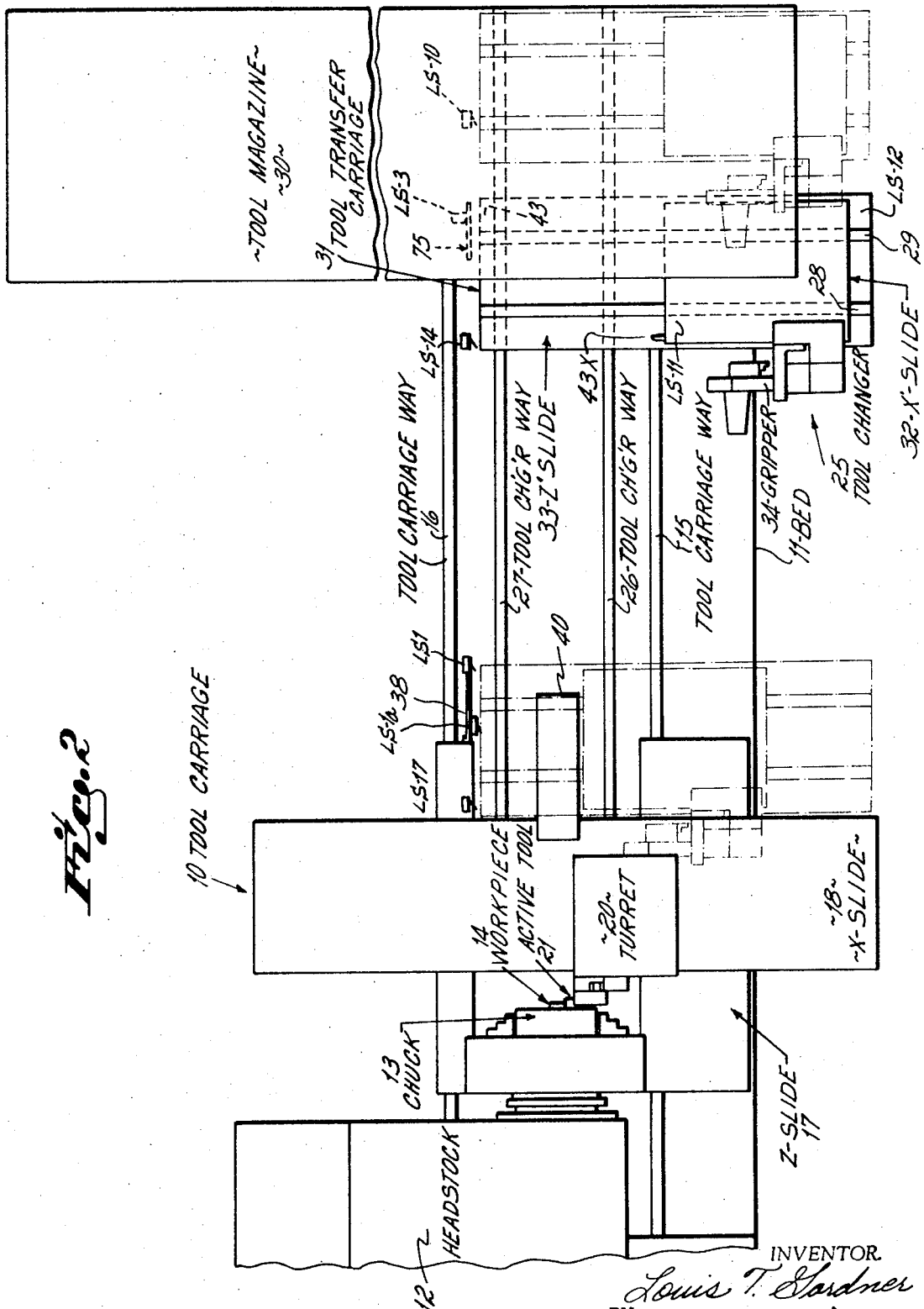
Figure 3:
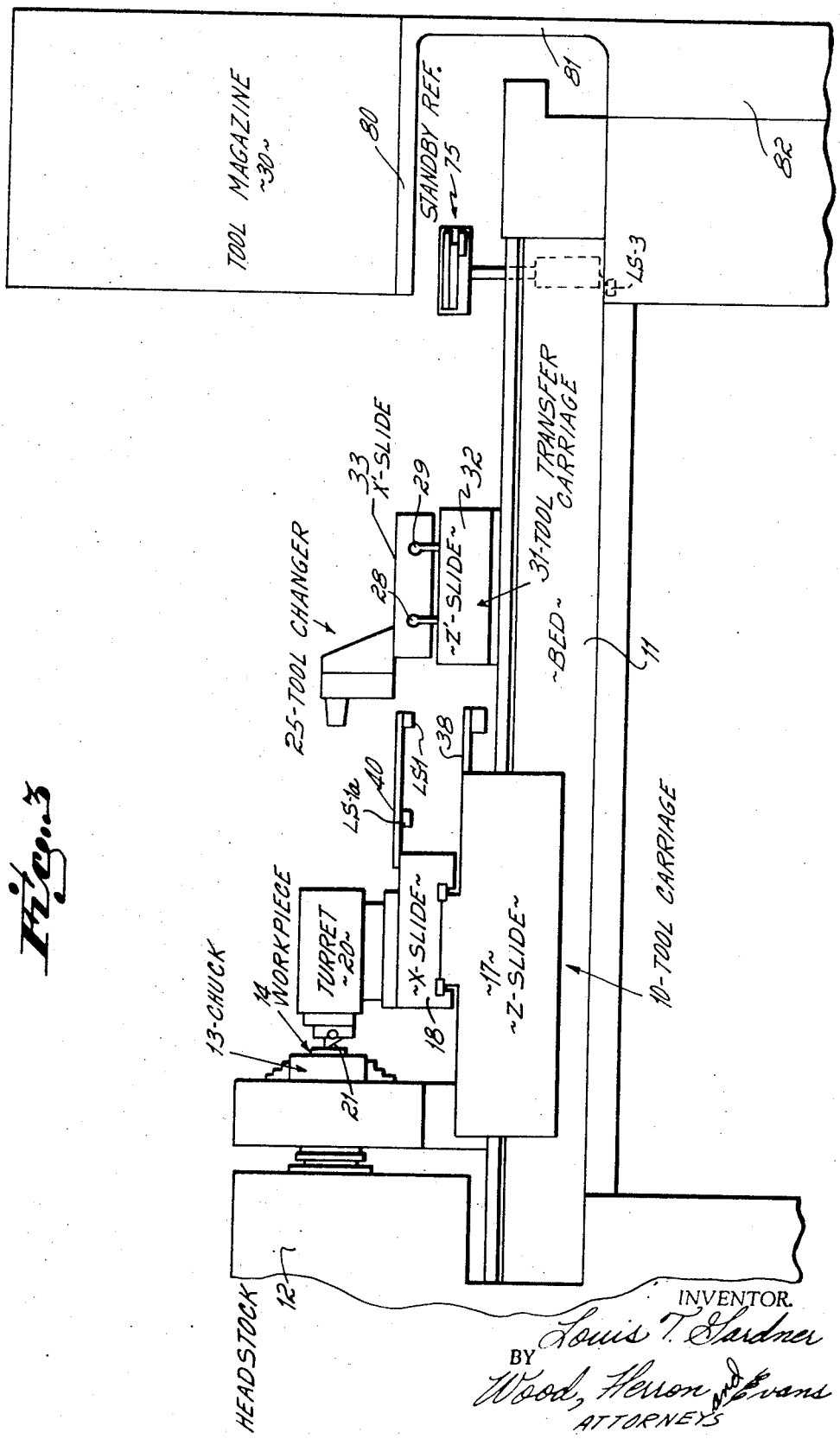
Figure 4:
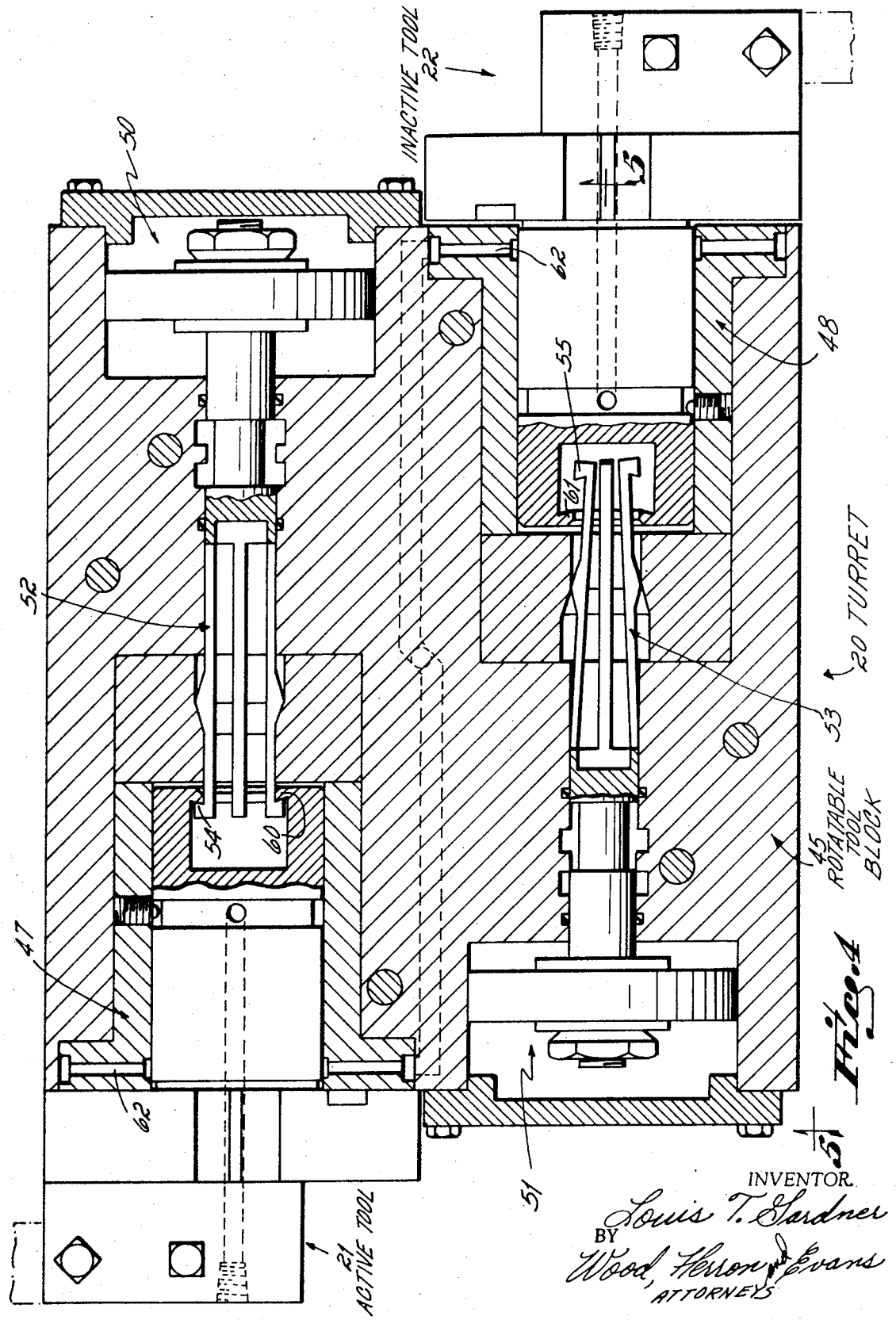
Figure 5:
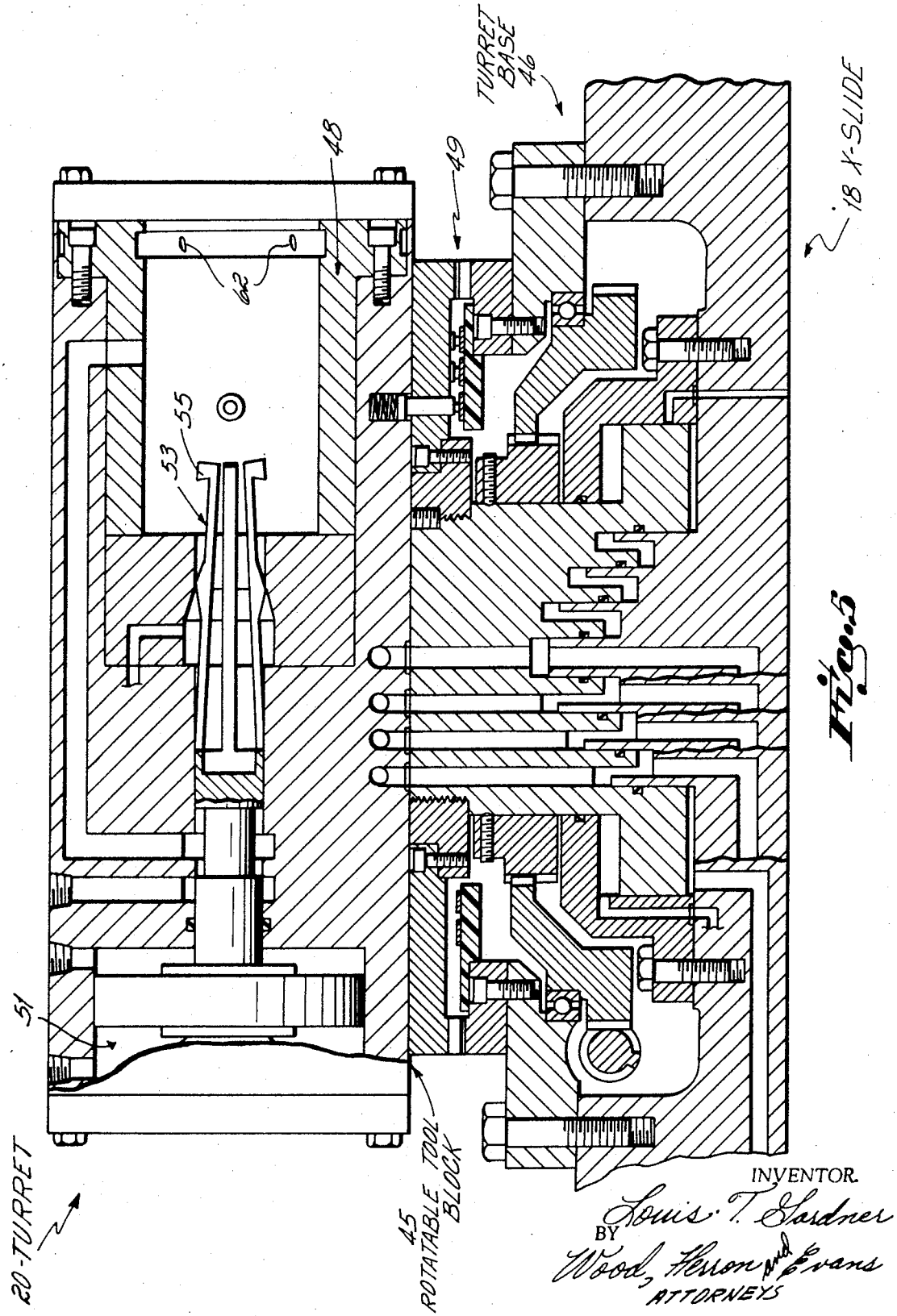
Figure 6:
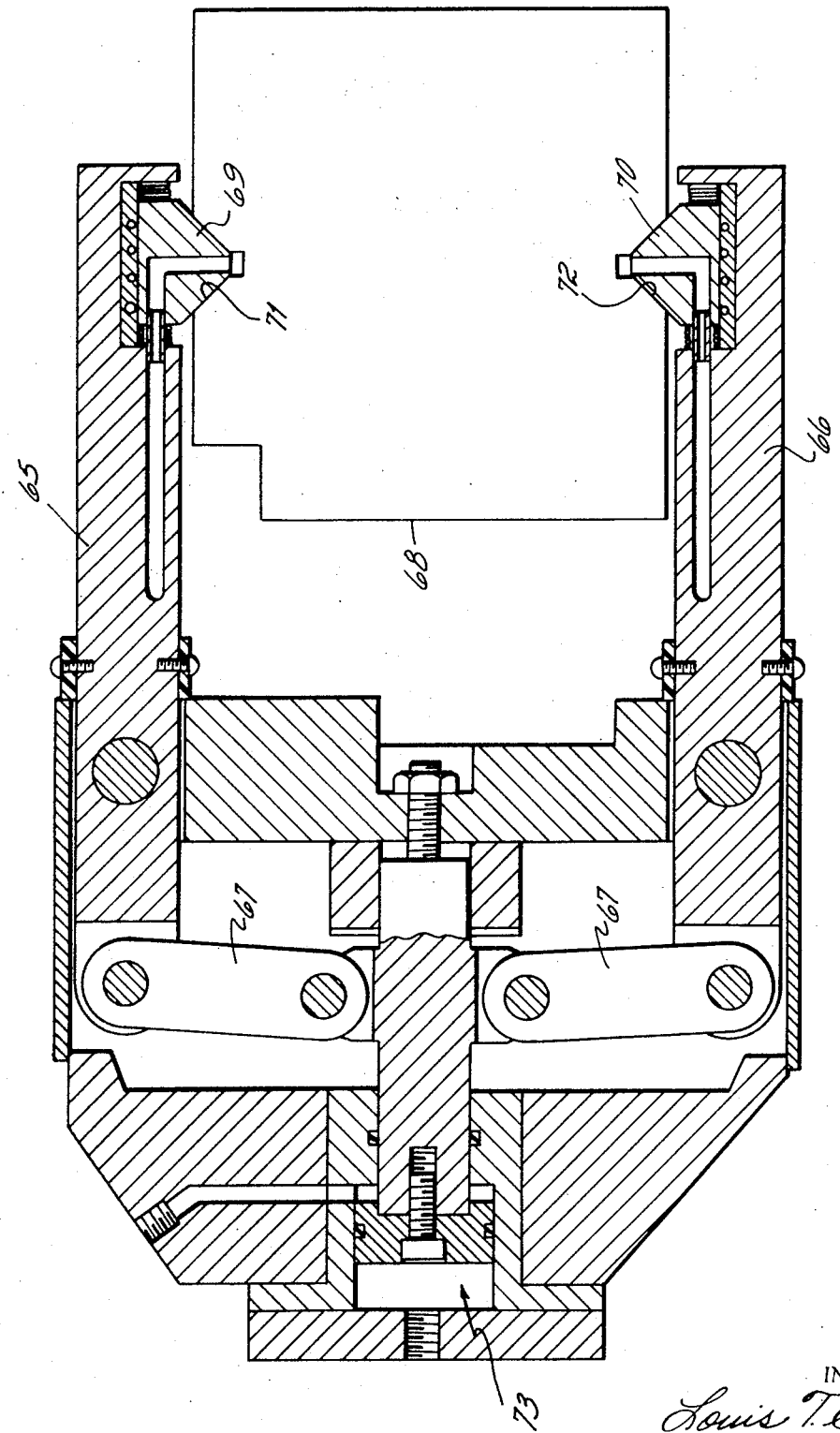
Figure 7:
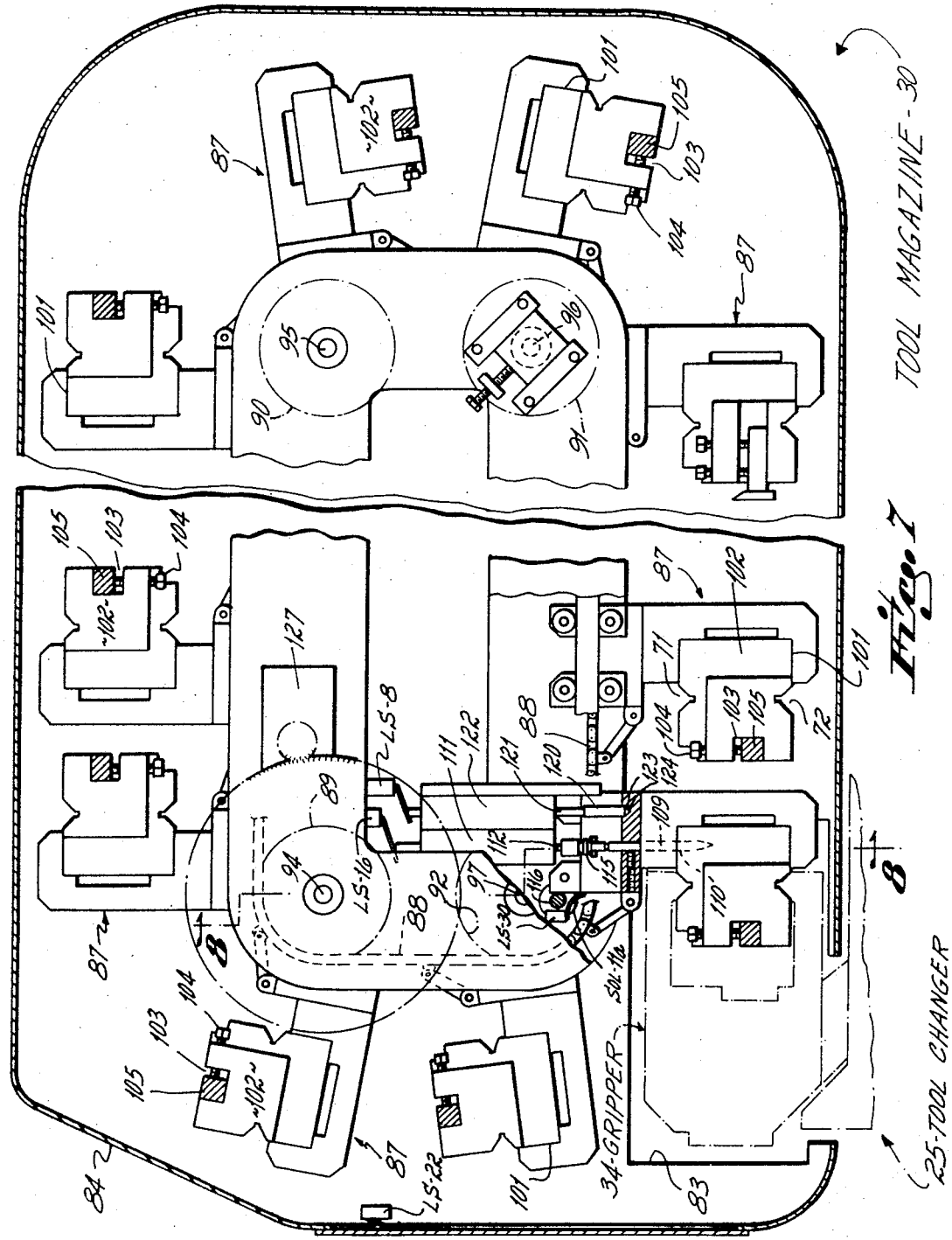
Figure 10:
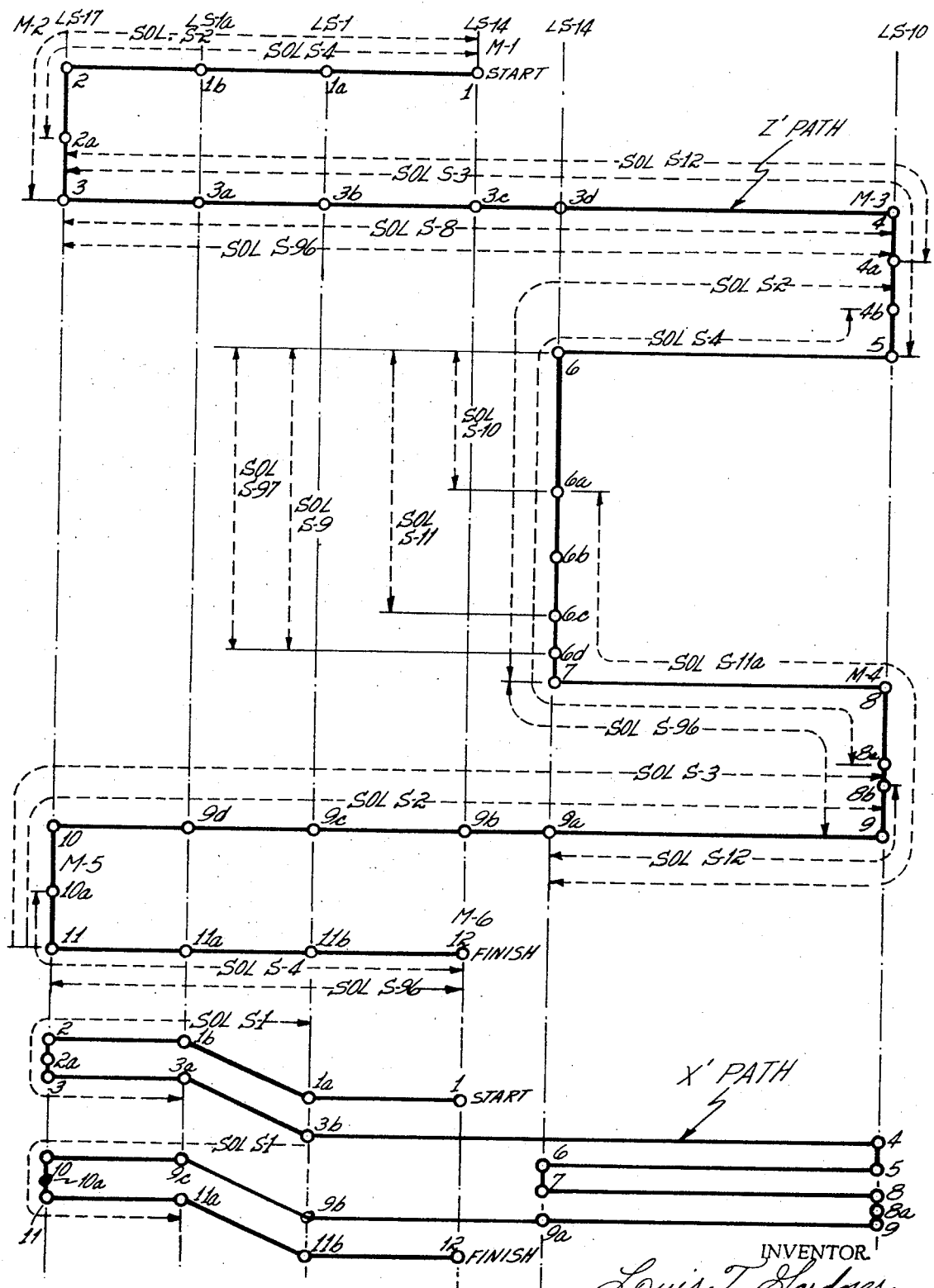
Figure 27:
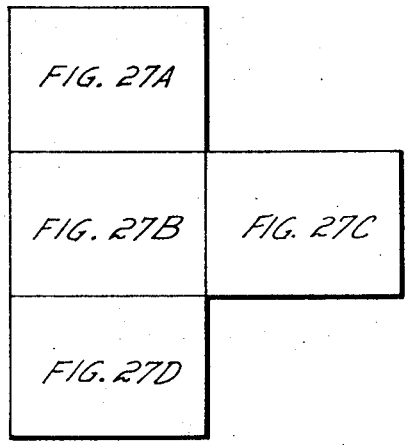
Figure 29:
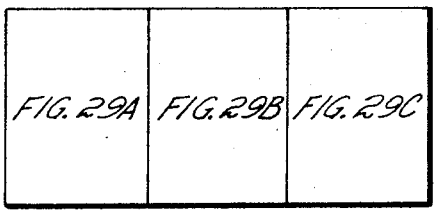
Figure 30:
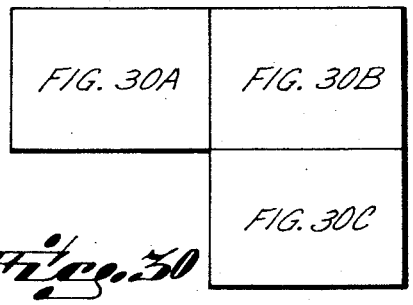
Figure 31:
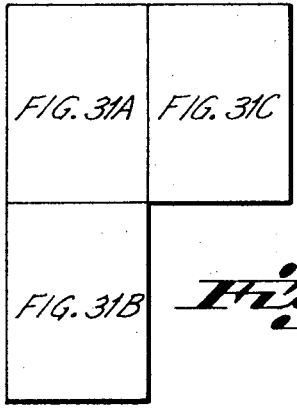
Figure 32:
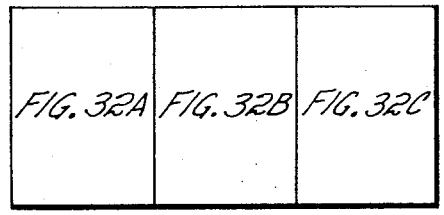
Figure 33:
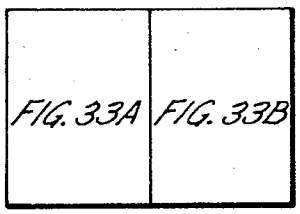
Figure 27B:
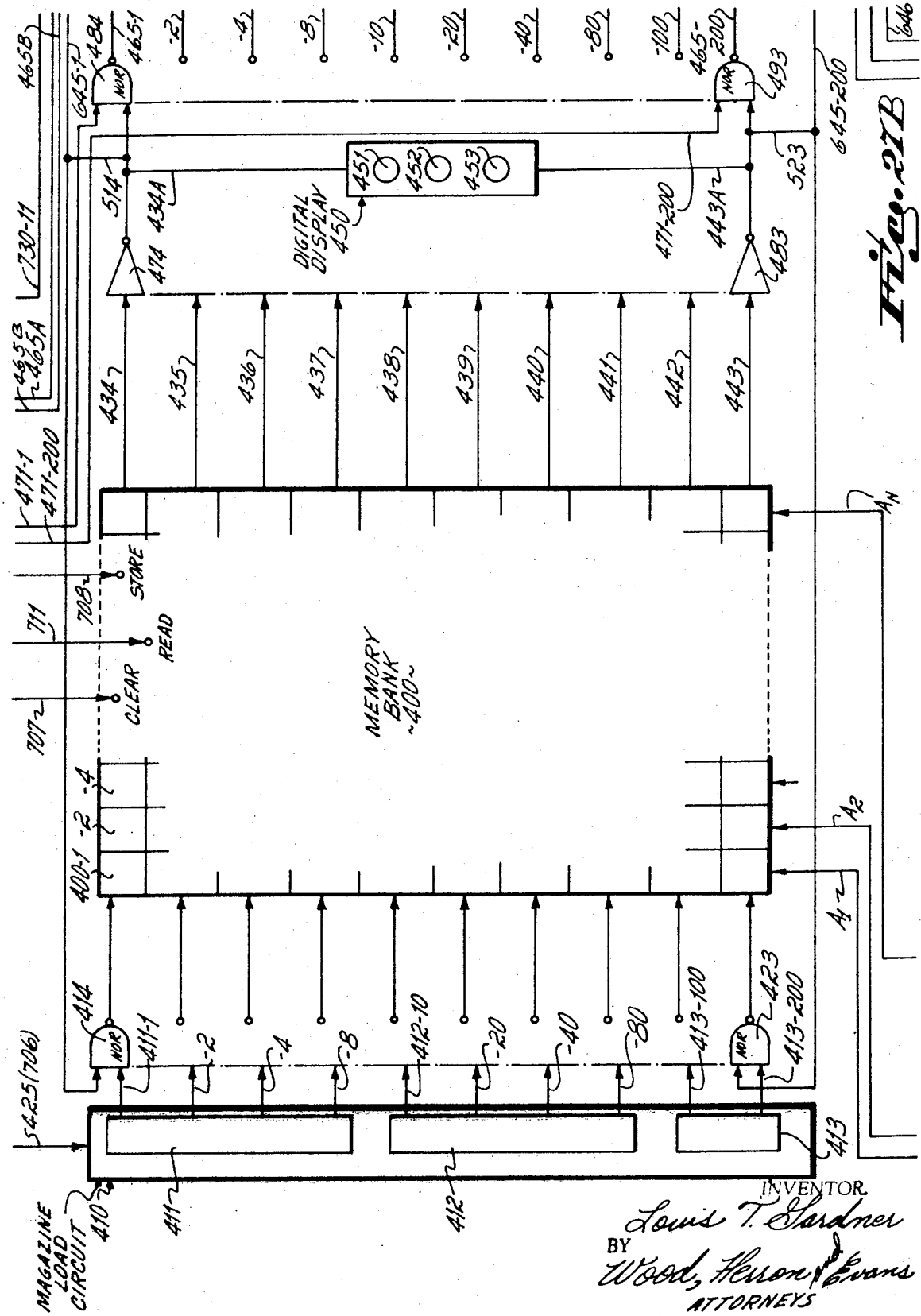

FIGS. 42–50 disclose various conventional symbols utilized in the schematic block diagram circuit of FIG. 27 and the detailed circuits of FIGS. 28–34.

Figure 42:

FIG. 42 represents a conventional 2-input driver circuit capable, in addition to functioning as a driver circuit, of functioning as a logical NAND gate.

Figure 43:
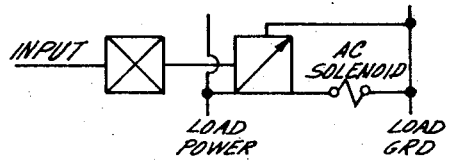

FIG. 43 depicts the symbol for a conventional AC solenoid driver. Such drivers are designed to drive AC solenoids at voltages up to 115 volts AC and at currents up to 5 amperes in response to low voltage DC control signals provided on their input lines.

Figure 38:
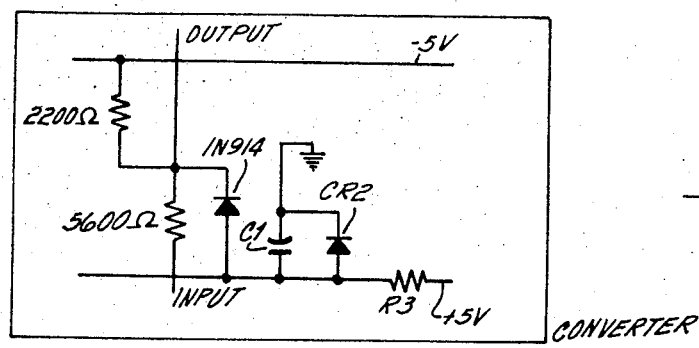
FIG. 38 is a detailed circuit diagram of a signal converter utilized throughout the detailed circuit of FIGS. 28–34, in which latter figures the signal converter is represented by the symbol shown in FIG. 44. The signal converter of FIG. 38 functions to provide at its output terminal a signal level compatible with the various circuit components with which it cooperates.
Figure 44:
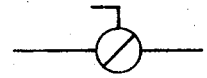

FIG. 44 is a symbol utilized in the circuit drawings of FIGS. 28–34 to represent a signal converter of the type already described in connection with FIG. 38.

Figure 45:
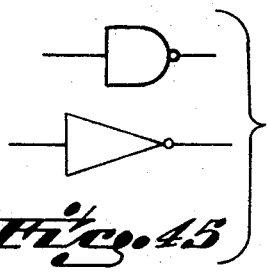

FIG. 45 is a symbol for a conventional inverter circuit, and is used throughout FIGS. 27–34 to represent the logic inversion function.

Figure 46:
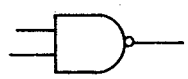
Figure 47:
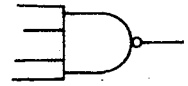
Figure 48:
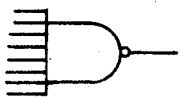

FIGS. 46, 47 and 48 are the conventional symbols for NAND gates having 2, 4 and 8 inputs, and are used throughout the circuit of FIGS. 27–34 to represent the logical NAND function.

Figure 28:
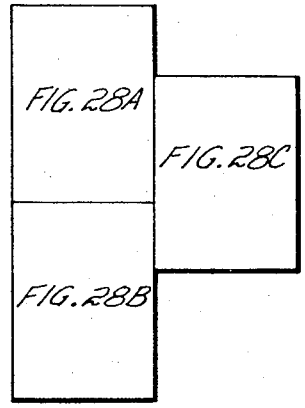
Figure 28B:
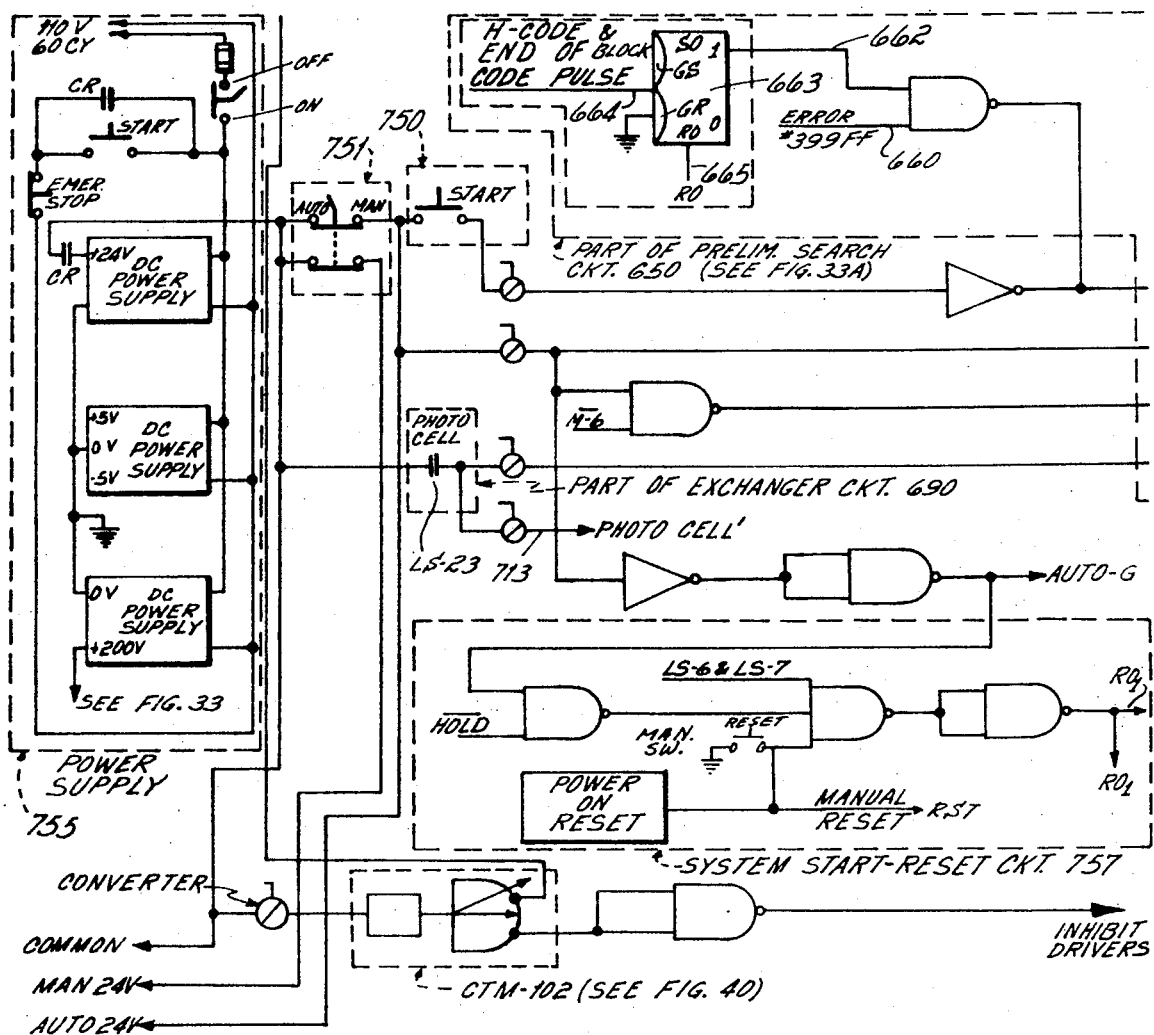
Figure 28C:
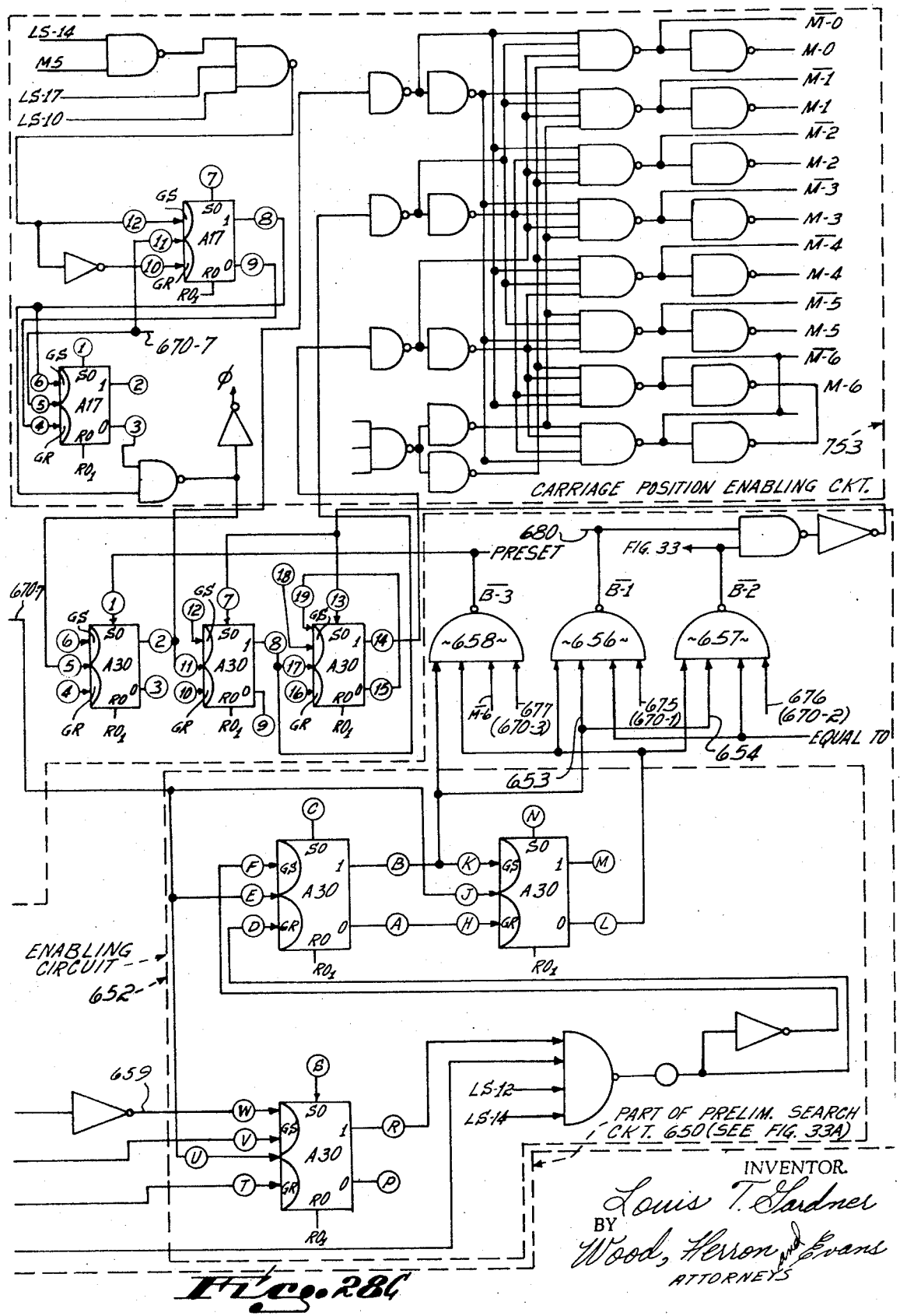
Figure 29A:
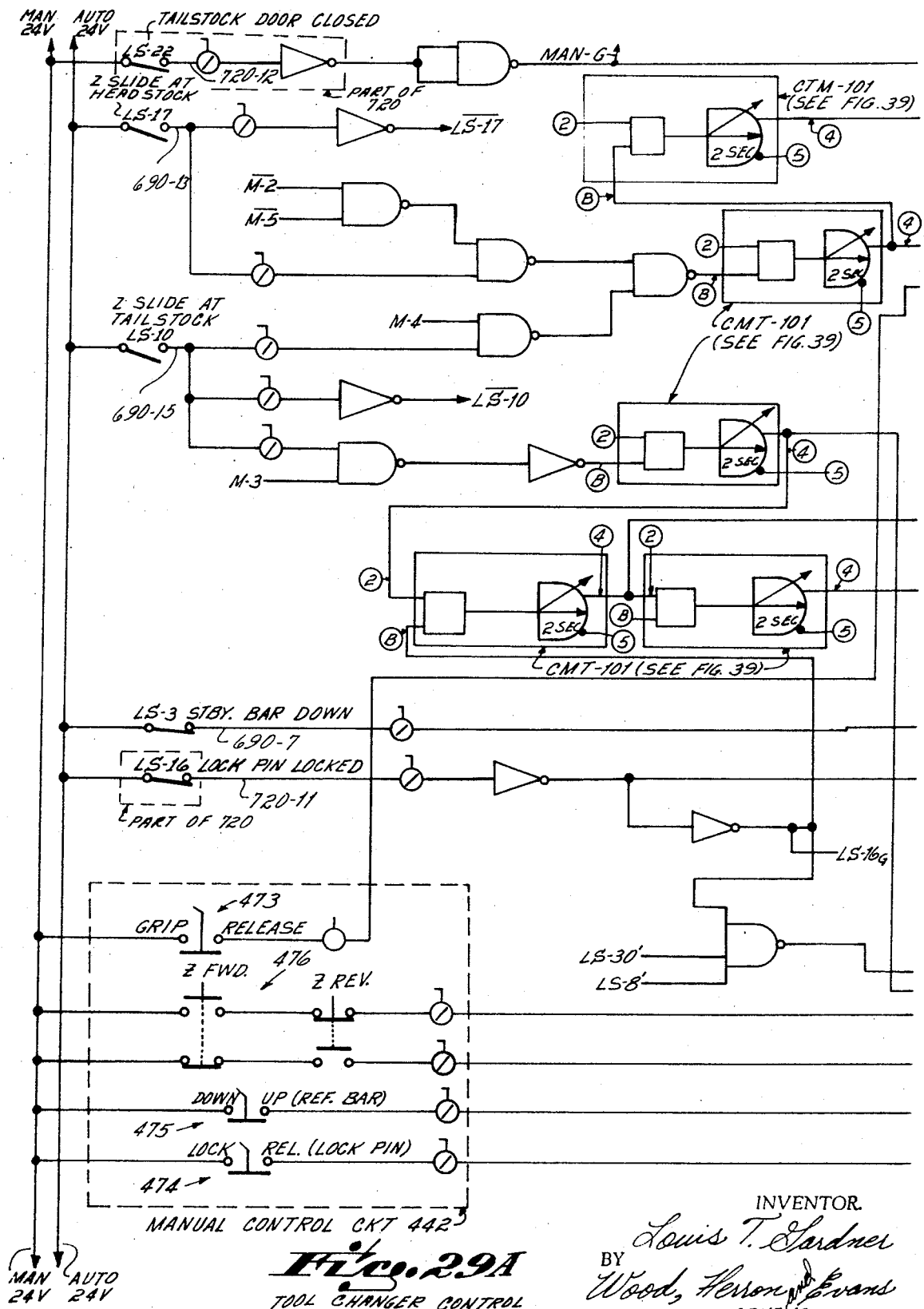
Figure 29C:
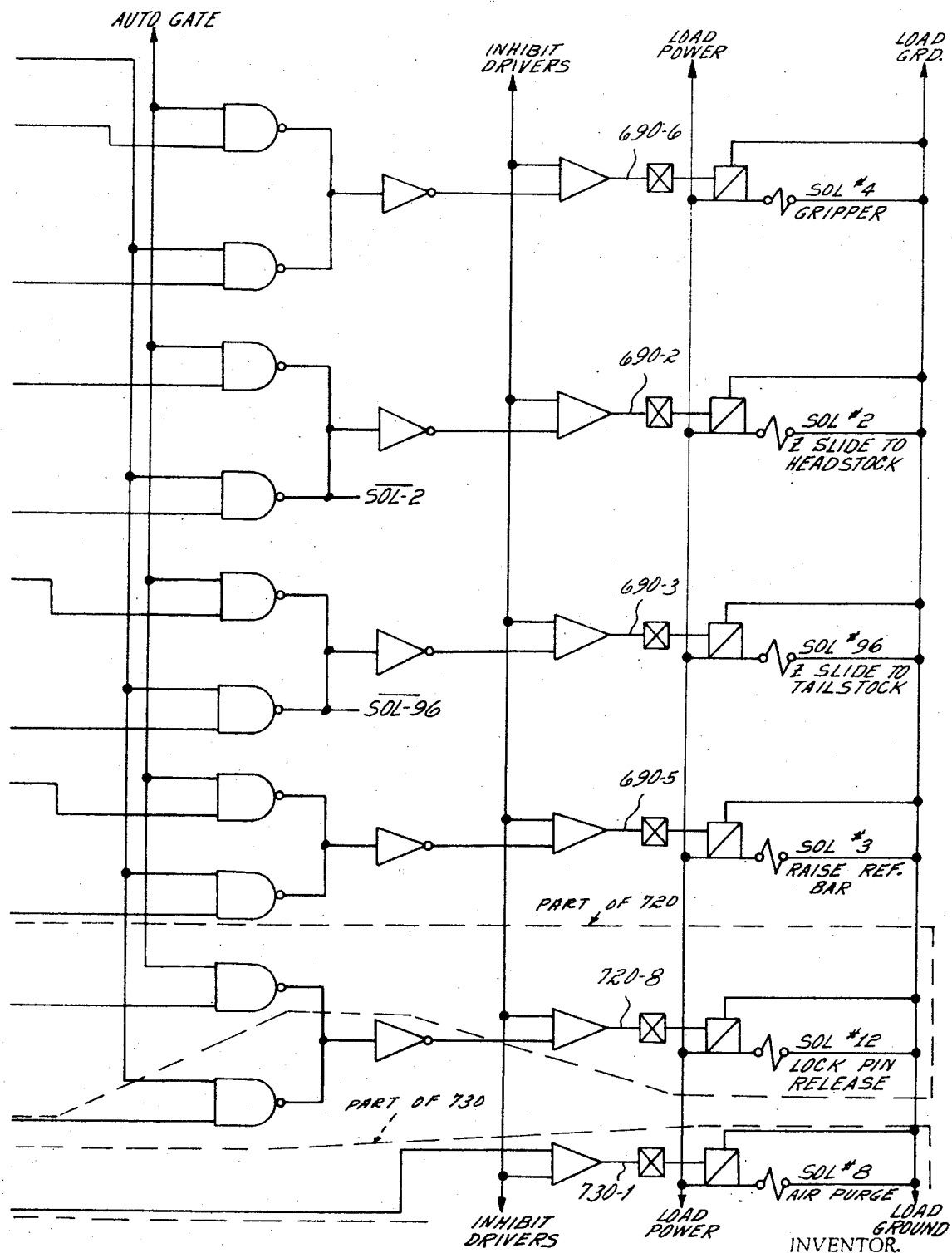
Figure 30B:
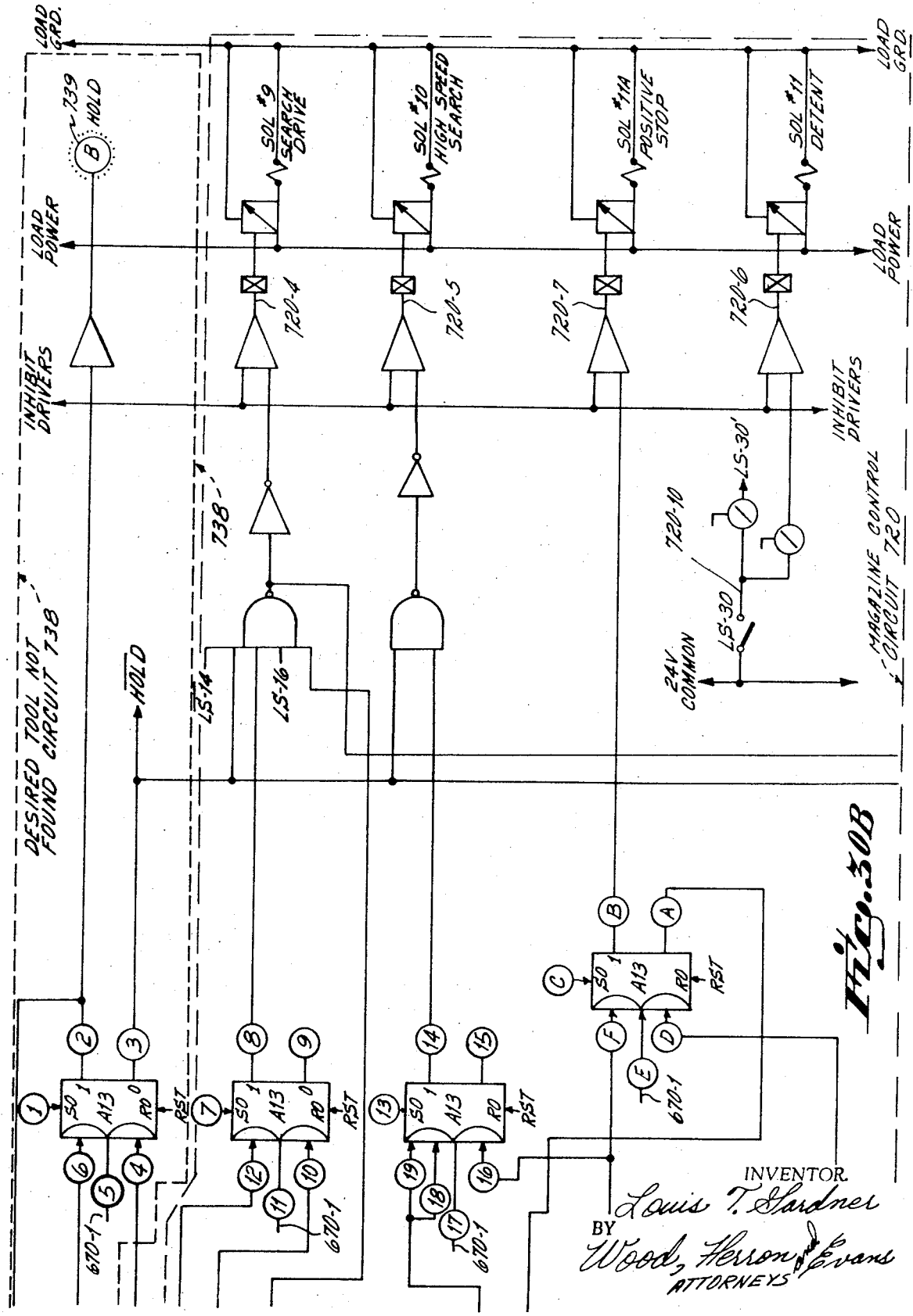
Figure 39:
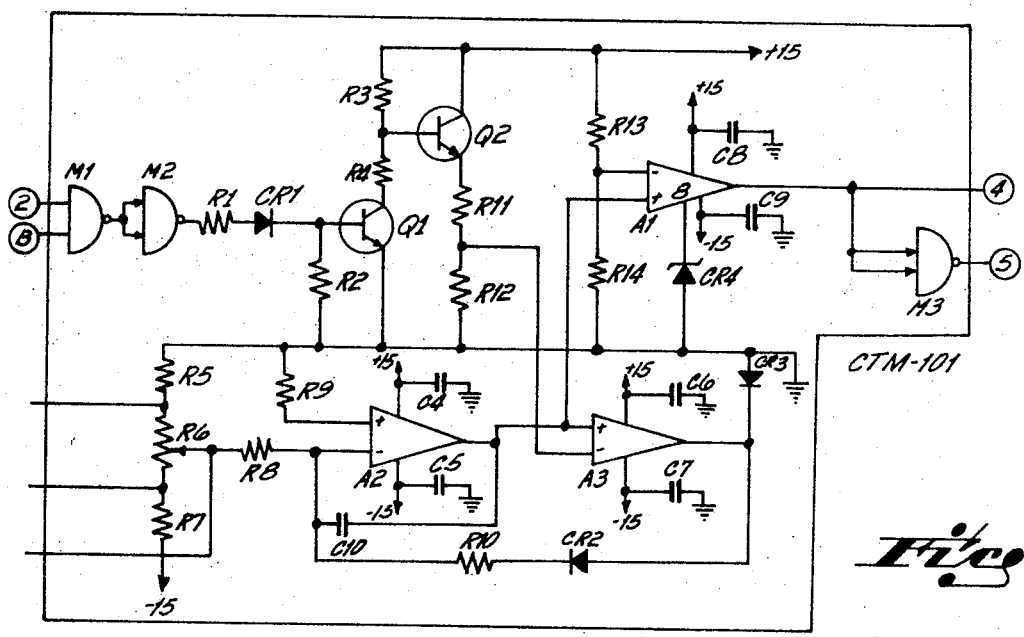
FIG. 39 is a detailed circuit diagram of a delay circuit of the type used in FIG. 29A, in which latter figure the delay circuit is represented by the symbol shown in FIG. 49. The delay circuit of FIG. 39 is capable of providing variable delays including delays of 2 seconds.
Figure 40:
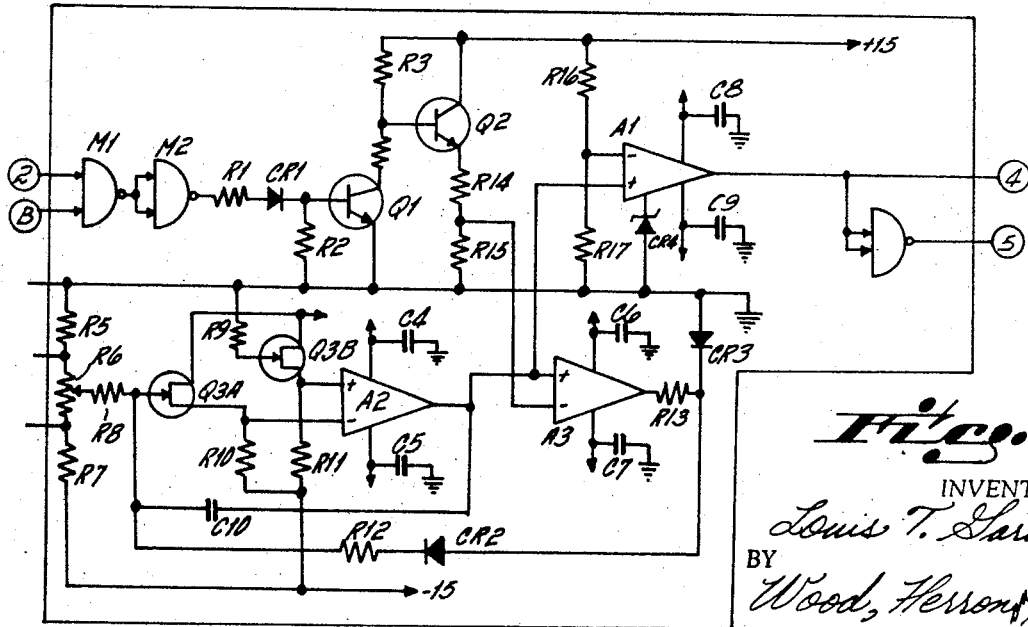
FIG. 40 is a detailed circuit diagram of a delay circuit of the type used in FIGS. 28B and 30A, in which latter figure the delay circuit is also represented by the symbol shown in FIG. 49. The delay circuit of FIG. 40 is capable of providing variable delays, including delays of 1 minute and 2 minutes.
Figure 49:

FIG. 49 depicts the conventional symbol for a variable delay circuit. This symbol is used in FIGS. 28B and 30A to represent delay circuits of the type described earlier in connection with FIG. 40, and in FIG. 29A to represent delay circuits of the type described in connection with FIG. 39.

Figure 35:
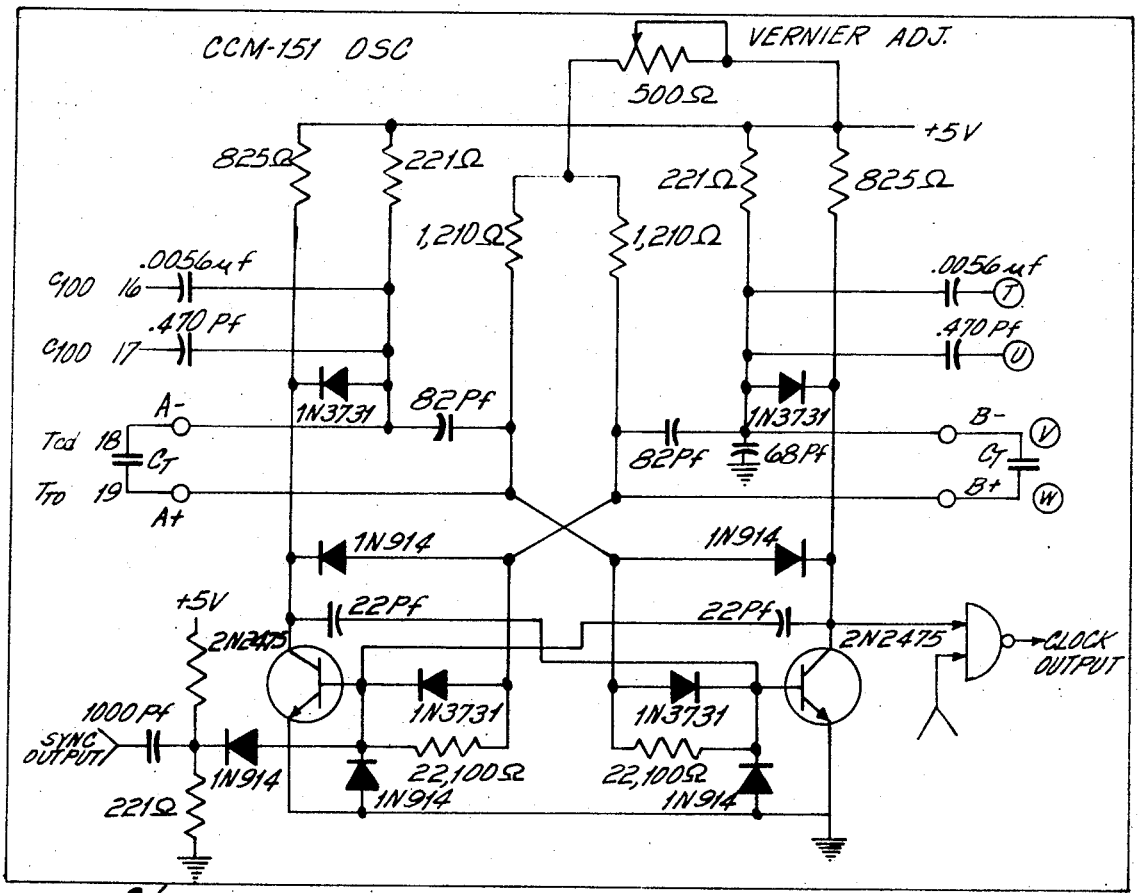
Figure 36:
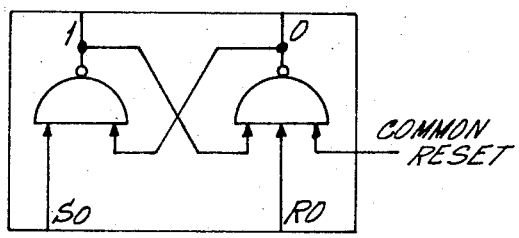
Figure 50:
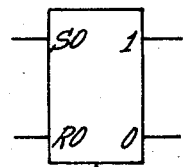

FIG. 50 depicts the conventional DC set/reset flip-flop having a common reset of the type described in connection with FIG. 35.

The accessing circuit 460 has, in accordance with the preferred embodiment, 16 outputs designated $A_1$, $A_2$ ... $A_N$ where N equals 16. Each of the output lines $A_1$, $A_2$ ... $A_{16}$ is input to a different one of the 10-bit memory elements 400-1, 400-2...400-16 of the memory bank 400. The accessing circuit 400, with its output lines $A_1$, $A_2$,...$A_{16}$ connected to the memory bank 400 in the manner indicated, functions to successively access different ones of the memory elements 400-1, 400-2...400-16 in synchronism with the presence at the magazine tool interchange station of the tool holders 87 to which the various memory elements are assigned, thereby facilitating search and/or storage in the memory elements in synchronism with the movement of their respectively assigned tool holders past the tool interchange station.

Figure 31A:
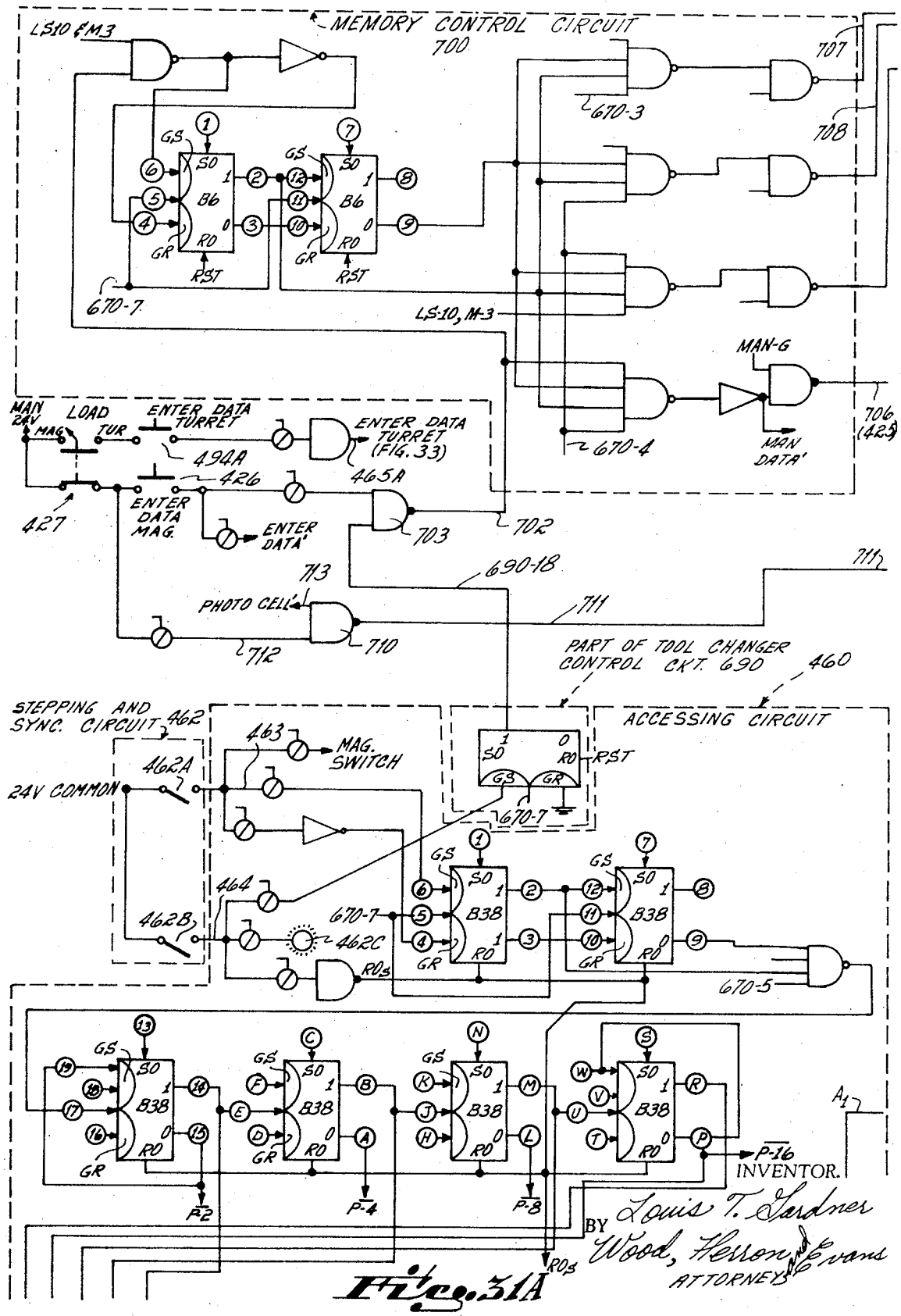
Figure 31B:
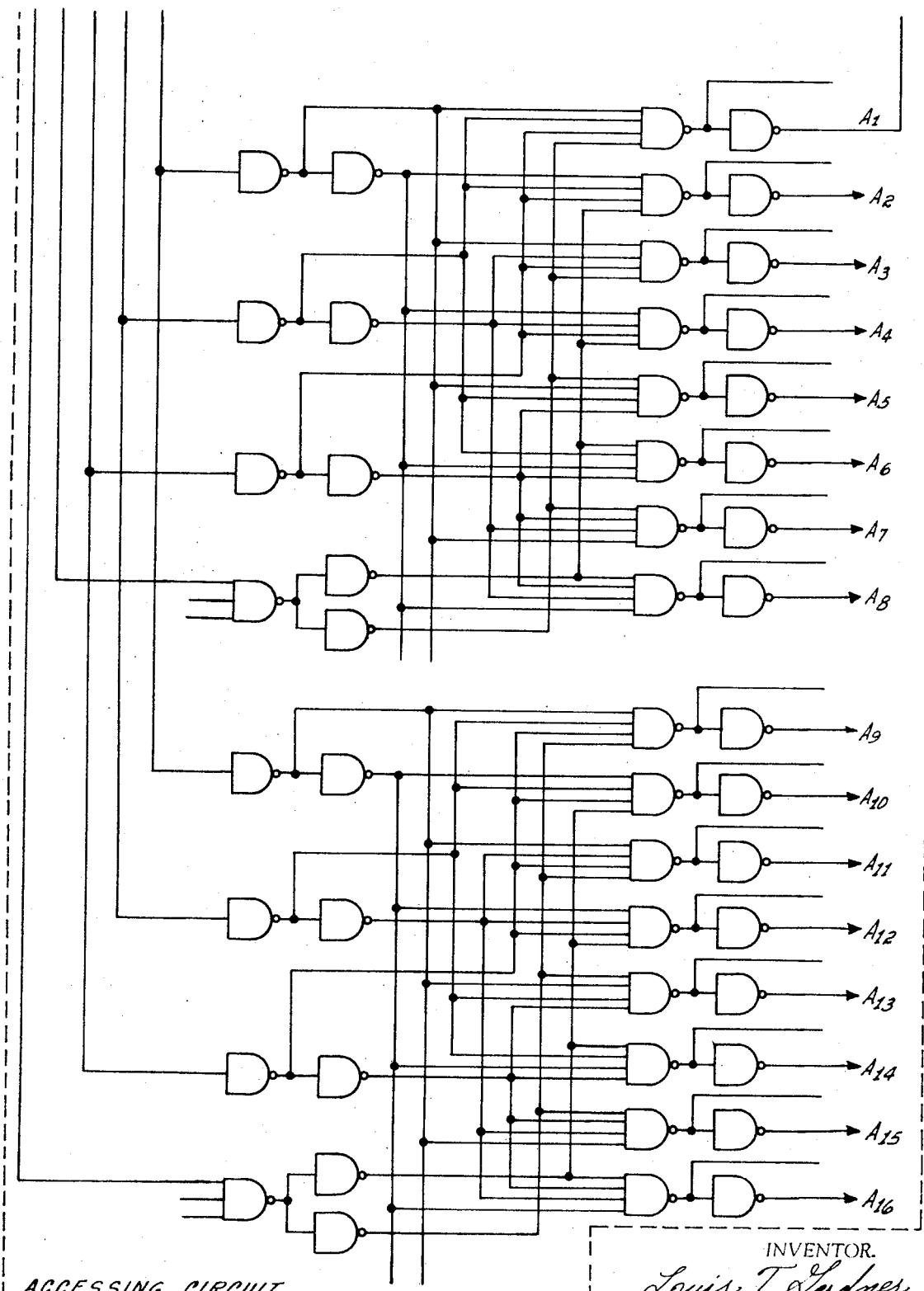
Figure 31C:
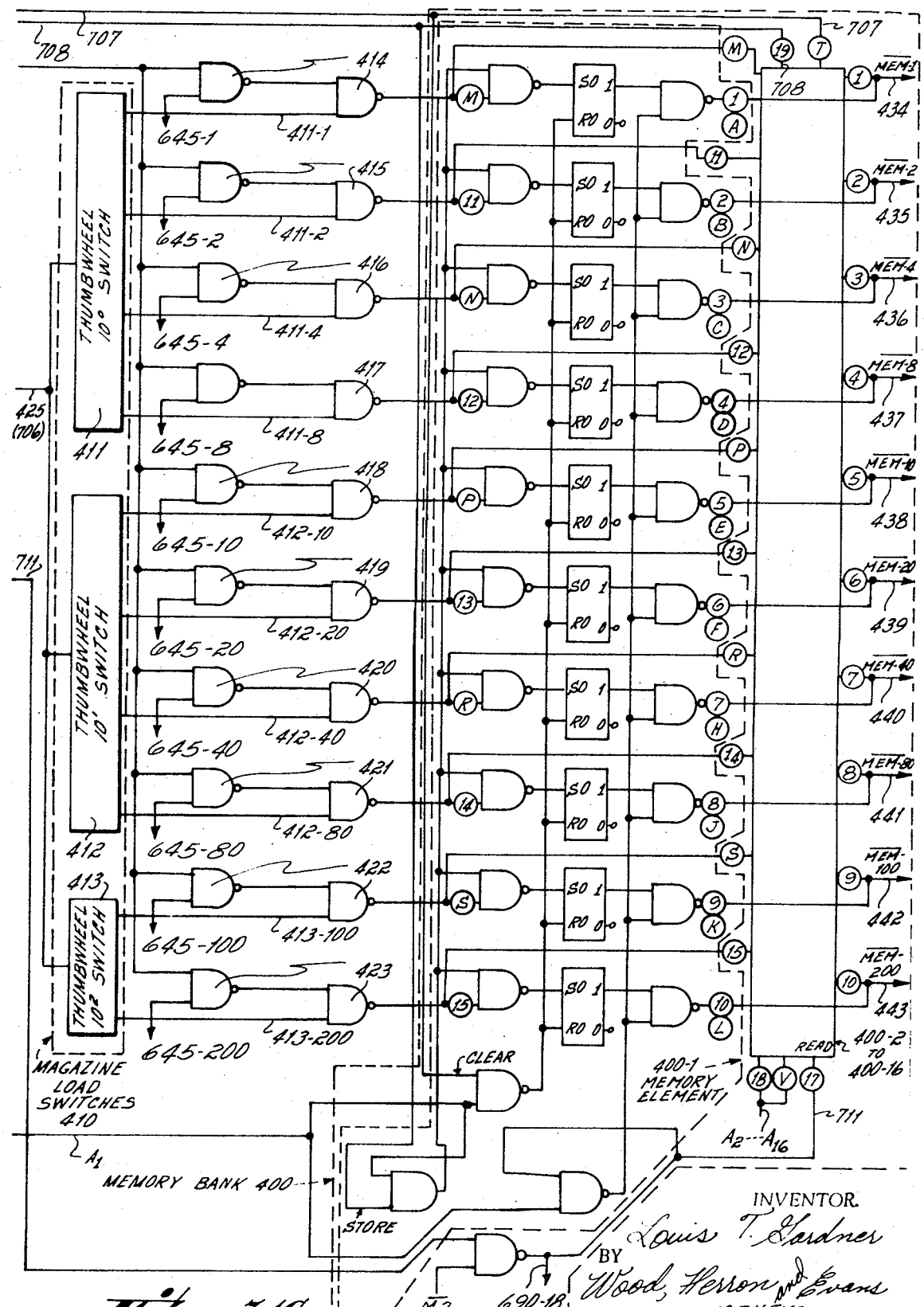
Figure 32A:
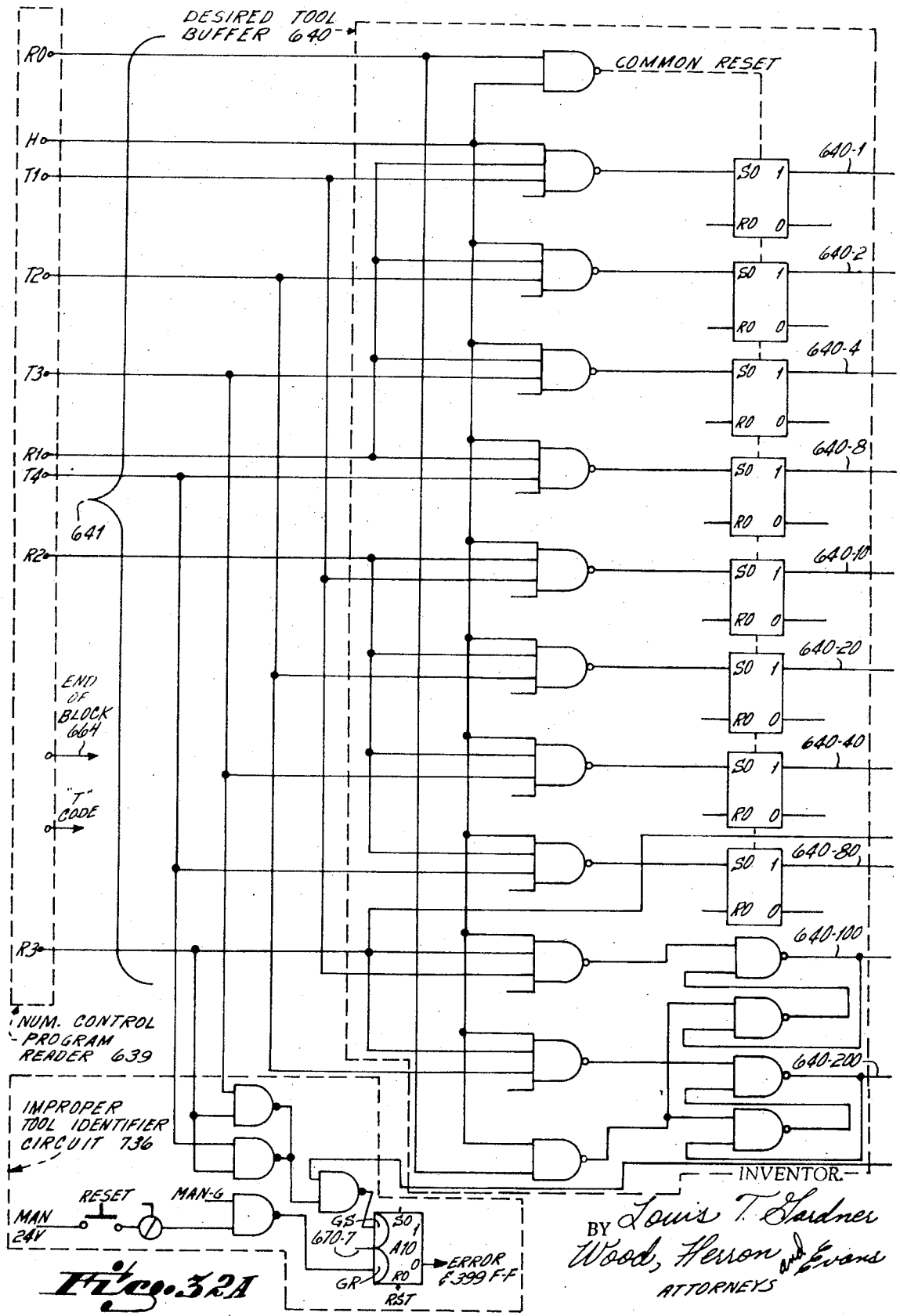
Figure 32B:
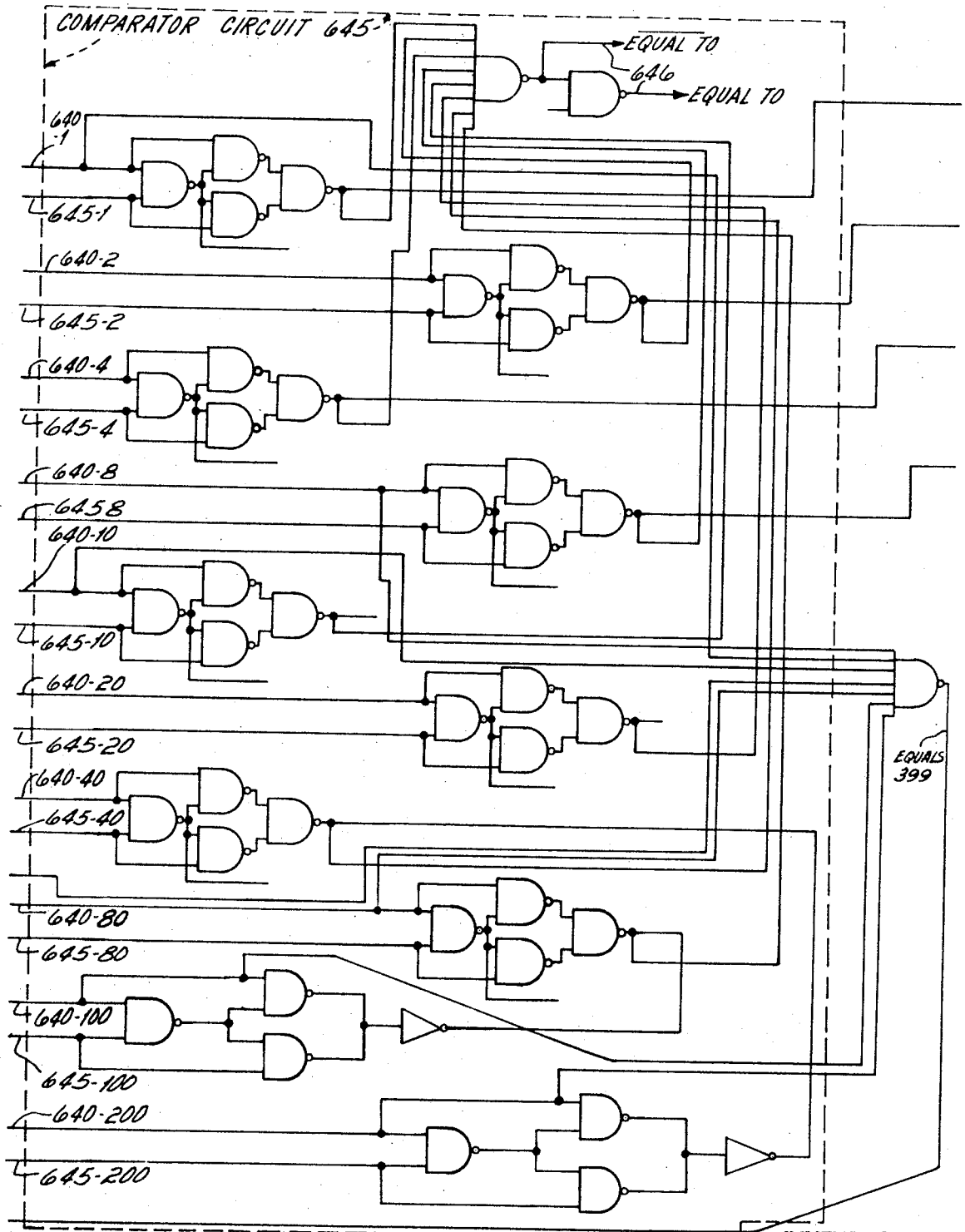
Figure 32G:
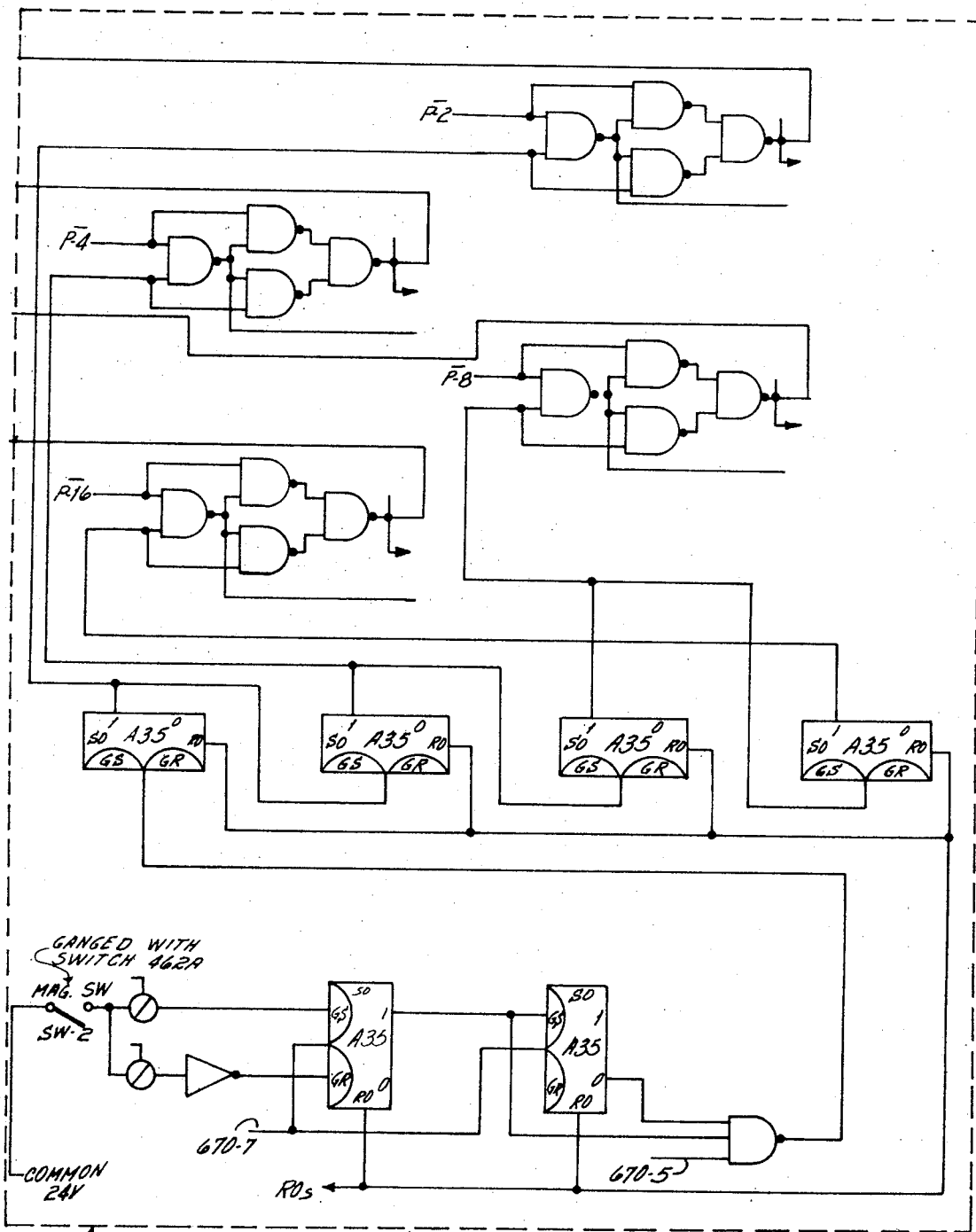

In accordance with the preferred embodiment the accessing circuit 460 includes, as shown in FIG. 31B, a six stage JK flip-flop counter and two binary to octal/decimal decoders such as are commercially available from Control Logic, Inc. designated models CFF-112 and COC-111, respectively. The counter and decoders, when connected as shown in FIGS. 31A and 31B, function in a manner similar to a sixteen position ring counter. The JK flip-flop counter and the binary to octal/decimal decoders of the accessing circuit 460 are responsive to the output on lines 463 of the stepping and synchronism circuit 462 (FIG. 27D), and function to successively provide the desired accessing outputs on lines $A_1$, $A_2$,...$A_{16}$ as is necessary to synchronously access the memory elements as the tool holders to which they are respectively assigned move through the tool interchange station.

As indicated earlier in connection with the description of the structure and operation of the accessing circuit 460, when the control system is first energized all tool identifiers stored in the memory bank 400 are erased and before tools can be loaded into the magazine tool holders and their identifiers stored in the memory element 400-1, 400-2...400-16 assigned to the respective tool holders, it is necessary to manually index the tool magazine by successively momentarily actuating the manual advance switch 721, each actuation of the switch advancing a new tool holder into the magazine tool interchange position. It was also noted that when the tool holder to which memory element 400-1 is assigned is at the interchange station, the synchronism switch 462B is momentarily tripped, producing output on line $A_1$ of the accessing circuit 460 for accessing memory element 400-1. With the magazine tool holder to which memory bank 400-1 is assigned at the magazine tool interchange station and memory element 400-1 accessed by an output on line $A_1$ of the accessing circuit 460 proper correspondence between the memory elements 400-1, 400-2...400-16 and the respective tool holders 86 to which these memory elements are assigned is produced. With such correspondence present, as the tool magazine is successively incremented to present different tool holders at the magazine tool interchange station and the magazine stepping switch 462A is successively momentarily closed, signals are produced on access circuit output lines $A_1$, $A_2$,...$A_{16}$ in synchronism with the presence at the magazine interchange station of those tool holders to which memory elements 400-1, 400-2...400-16 are assigned, memory elements 400-1, 400-2...400-16 being those accessed by the successive outputs on access circuit output lines $A_1$, $A_2$,...$A_{16}$.

In the preferred embodiment, to insure that when the control circuit is initially energized prior to loading tools into the magazine, it is essential that the tool magazine be manually indexed in the manner described above until the synchronism switch 462B has been momentarily closed. Only in this manner is it possible to insure that the memory elements 400-1, 400-2...400-16 and the tool holders 87 to which they are assigned will be accessed by the circuit 460 in synchronism. Such is the case because the accessing circuit 460, being a volatile circuit, does not remember, when the system is again energized prior to loading of the magazine, which of its output lines $A_1, A_2...A_{16}$ was energized when the control circuit was de-energized at the completion of the last machining operation. While de-energization of the control circuit at the end of the last machining operation and subsequent re-energization prior to again loading the tool magazine in anticipation of the next machining operation does not change or alter the particular magazine tool holder located at the magazine interchange station, the same tool holder being at the magazine interchange station prior to the beginning of the new machining operation as was there at the termination of the preceding operation, de-energization and subsequent re-energization of the control circuit does alter the particular one of the output lines $A_1, A_2...A_{16}$ of the accessing circuit 460 which is energized.

Specially, assuming the tool holder 87 to which memory element 400-5 is assigned was located at the tool interchange station upon completion of the previous machining operation, when the system is de-energized and again energized prior to again loading the magazine in anticipation of the next machining operation, the magazine tool holder to which memory element 400-5 is assigned will still be at the magazine interchange station. However, accessing line $A_5$, which was energized to access memory element 400-5 assigned to the tool holder at the magazine interchange station at the end of the last machining operation, will not, upon re-energization of the control circuit, be energized to access the memory element assigned to the tool holder then present at the interchange station. This absence of the desired accessing circuit output is attributable to the inherently volatile nature of the JK flip-flops used as the storage elements in the preferred embodiment of the accessing circuit 460 which prevents the 16 JK flip-flop storage positions of the ring counter type accessing circuit from remembering their respective conditions of energization or de-energization, as the case may be, when the accessing circuit 460 is again energized upon initiation of a new magazine loading and machining operation.

To avoid the need, following de-energization of the control circuit and subsequent re-energization in the anticipation of a new machining operation, to manually index the magazine until the synchronization switch 462B has been momentarily tripped, the accessing circuit 460 may be designed in accordance with an alternative embodiment of the invention (not shown). In accordance with this alternative embodiment, the various stages or positions of the accessing circuit counter 460, on whose respective output lines $A_1, A_2...A_N$ the accessing signals are provided, are comprised of circuitry of the non-volatile type. Specifically, each of the N positions or stages of the accessing circuit counter comprise bistable magnetic storage devices which retain their magnetic storage state notwithstanding de-energization of the control circuit. For example, each position of the accessing circuit counter may comprise a bistable magnetic core storage device. The magnetic core storage devices of the accessing circuit are connected in ring counter configuration such that when the stepping switch 462A momentarily closes as different magazine tool holders pass through the magazine tool interchange station, a successive and different one of the magnetic cores is switched to a logical 1 (or 0) state. When the control circuit is subsequently de-energized at the completion of a machining operation, the information, i.e. the logical 1 (or 0), stored in the magnetic core storage device providing the accessing output to the memory element 400-1, 400-2...400-N assigned to the magazine tool holder then located at the magazine interchange station would not be lost. Thus, when the control circuit is again reenergized prior to loading the magazine with tools in anticipation of the next machining operation, an output is provided on the accessing line $A_1, A_2...A_N$ corresponding to the magnetic core in which is stored the logical 1 (or 0) and which, prior to deenergization of the control circuit, accessed the memory element 400-1, 400-2...400-N assigned to the tool holder which was located in the magazine interchange station at that time.

Thus, by substituting for the volatile JK flip-flop accessing circuit counter components depicted in FIG. 31A, non-volatile accessing circuits counter components in the form of bistable magnetic storage devices, such as magnetic cores, which retain the information stored therein through cycles of control circuit energization and de-energization, an accessing circuit is provided which, upon re-energization of the control circuit, accesses the memory element 400-1, 400-2...400-N assigned to the magazine tool storage device which was located at the tool interchange position when the system was de-energized and which is still located at the magazine tool interchange station when the system is subsequently re-energized in anticipation of the next magazine loading and machining operation.

I claim:

1. For use in combination with a machine tool having tools assigned identifiers for retrieval purposes, the tool retrieval system comprising:
   a plurality of tool holders sequentially movable past a reference station,
   a memory bank having a plurality of memory elements which are stationary and independently mounted relative to said movable tool holders, each of said memory elements being allocated to a different one of said tool holders for storing therein the arbitrary identifier assigned to a tool held by the tool holder to which said memory element is allocated,
   reading means for reading said memory elements,
   means for synchronizing the reading of said memory elements and said sequential movement of said tool holders, and
   means responsive to said reading means to develop an output in response to reading a memory element containing the identifier of a desired tool for locating said desired tool at said reference station.

2. For use in combination with a machine tool having tools assigned arbitrary identifiers for retrieval purposes, a tool retrieval system comprising:
   a plurality of tool holders for holding individual tools,
   a reference station,
   drive means for relatively moving said reference station and successive ones of said tool holders,
   a memory bank mounted independent of said tool holders and having a plurality of memory elements each assignable to a tool holder, said memory elements storing the identifiers assigned to tools held by tool holders to which said memory elements are assigned, accessing means for successively accessing said memory elements assigned to said successive ones of said tool holders while said reference station and said successive ones of said tool holders move relative to each other, and control means for generating an output in response to accessing a memory element containing the identifier of a desired tool held by one of said tool holders for locating said desired tool relative to said reference station.

3. For use in combination with a machine tool having tools assigned arbitrary identifiers for retrieval purposes and at least one tool holder positionable in operative relation to a workpiece, the tool retrieval and interchange system comprising:

a plurality of tool storing devices successively movable past a tool interchange station, each of said tool storing devices being operative to temporarily store a tool, a first set of memory elements for storing the identifiers of tools stored in said tool storing devices, said memory elements being mounted stationarily and independently relative to said movable tool storing devices, at least one tool holder memory element for storing the identifier of a tool located in said tool holder, said tool holder memory element being mounted stationarily and independently relative to said tool holder and tool storing devices, means for reading successive ones of said memory elements of said first set in synchronism with the successive movement of said tool storage devices past said interchange station, transfer means for transferring a tool between said tool holder and said magazine, and control means responsive to said reading means for actuating said transfer means to transfer a desired tool whose identifier has been read by said reading means to said tool holder and for storing in said tool holder memory element the identifier of said transferred tool.

4. The system of claim 3 including at least two tool holders alternatively positionable in operative relation to said workpiece, at least two tool holder memory elements for storing the identifiers of tools located in said tool holders, and means for up-dating said tool holder memories to reflect an interchange of the tool holder operatively positioned relative to said workpiece.

5. In a machine tool having tools assigned identifiers for retrieval purposes, a source of programming data supplying the identifiers of desired tools, a toolholder cooperable with a work piece, a tool storage magazine for storing tools in individual tool storage devices, and a tool transfer means for transferring tools between said magazine and said tool holder, the improvement comprising:

a magazine tool storage memory element allocated to each magazine tool storage device for storing the identifiers of stored tools, a tool holder memory element for storing the identifier of a tool stored in said toolholder, control means responsive to said data source for first searching said tool holder memory element for the identifier of a desired tool and if the identifier of said desired tool is not found therein thereafter searching said magazine memory elements, and memory element up-dating means for up-dating the contents of said memory elements to reflect the transfer of a tool between said magazine and said tool holder.

6. In a machine tool having tools assigned identifiers for retrieval purposes, a source of programming data supplying the identifiers of desired tools, a tool holder cooperable with a workpiece, a tool storage magazine for storing tools in individual tool storage devices movable past an interchange station, and tool transfer means for transferring tools between said magazine and said tool holder, the improvement comprising:

a memory bank having a plurality of stationary memory elements, said memory elements being allocated to different ones of said storage devices for storing therein the arbitrary identifier assigned to a tool stored by the respective storage device to which said memory element is allocated, at least one tool holder memory element for storing the identifier of a tool located in said storage device, means for comparing the identifiers stored in said magazine memory elements with the identifier of a desired tool in synchronism with the movement of said tool storage devices past said interchange station, means responsive to said comparison means for actuating said transfer means to effect transfer of said desired tool from said magazine to said tool holder, and means for storing in said tool holder memory element the identifier of said transferred tool and erasing the contents of the memory element assigned to the tool storage device from which said transferred tool was withdrawn.

7. In a machine tool having a tool storage magazine with a plurality of tool storage devices movable past an interchange station and storing tools assigned identifiers for retrieval purposes, the improvement comprising:

an individual memory element allocated to each of said tool storage devices and being mounted stationarily and independent of said movable tool storage devices, means for accessing said memory elements in synchronsim with the movement of said tool storage devices, means for comparing the tool identifier stored in said accessed memory elements with the identifier of a desired tool, and means responsive to said comparison means for terminating tool storage device movement and thereby positioning at said station the storage device to which is allocated the memory element containing the identifier of the desired tool.

8. In a machine tool having a tool storage magazine with a plurality of tool storage devices movable past an interchange station and storing tools assigned identifiers for retrieval purposes, the improvement comprising:

an individual memory element allocated to each of said tool storage devices and being mounted stationarily and independent of said movable tool storage devices, means for providing successive outputs in synchronism with the movement of successive tool storage devices past said interchange station, and means responsive to said successive outputs for accessing successive ones of said memory elements in synchronism with the successive movement of the tool storage devices to which said successively accessed memory elements are allocated.

9. The improvement of claim 8 further including means for terminating tool storage device movement for positioning at said interchange station the storage device to which is allocated the accessed memory element containing the identifier of a desired tool.

10. A method of processing tools comprising the steps of:

indexing tool holders relative to a tool transfer station, assigning arbitrary tool identifiers to tools to be stored in said tool holders, inserting tools into said indexed tool holders when said tool holders are located at said transfer station, accessing, in synchronsim with the indexing of the movable tool holders, memory elements which are allocated to different ones of said tool holders and which are stationary relative to said movable tool holders, entering into the accessed elements allocated to tool holders into which tools are inserted the identifiers assigned to tools inserted in the respective tool holders, reading the identifiers entered in memory elements in synchronism with said tool holder indexing, comparing the read identifiers with the identifier of a tool to be retrieved, generating a control signal in response to a favorable comparison, and utilizing said control signal to locate the tool to be retrieved at said transfer station.

11. The method of claim 10 including the further steps of:

transferring the tool to be retrieved to a utilization station, and storing the identifier of said transferred tool in a first stationary memory element allocated to said utilization station and erasing the contents of the stationary memory element allocated to the tool holder from which said transferred tool was removed.

12. The method of claim 10 including the further steps of:

transferring the tool to be retrieved to an inactive turret tool holder mounted on a rotatable turret also having an active tool holder, storing the identifier of said transferred tool in a first stationary memory element allocated to said inactive turret tool holder and erasing the contents of the stationary memory element allocated to the magazine tool holder from which said transferred tool was removed, and rotating said turret to position the tool transferred to said turret to an active turret tool holder position, and effectively interchanging the contents of the stationary memory element allocated to said inactive turret tool holder and a stationary memory element allocated to said active turret tool holder, thereby updating the turret tool holder memory elements to reflect the interchange of tools occasioned by rotation of said turret.

* * * * *